(12) United States Patent
Courchay et al.

(10) Patent No.: US 11,473,040 B2
(45) Date of Patent: Oct. 18, 2022

(54) WATER-SOLUBLE FILMS, WATER-SOLUBLE UNIT DOSE ARTICLES, AND METHODS OF MAKING AND USING THE SAME

(71) Applicant: MONOSOL, LLC, Merrillville, IN (US)

(72) Inventors: Florence Catherine Courchay, Strombeek-bever (BE); Steven G. Friedrich, Merrillville, IN (US); Regine Labeque, Strombeek-bever (BE); Shigeng Li, Merrillville, IN (US); Luca Vitiello, Strombeek-bever (BE)

(73) Assignee: MONOSOL, LLC, Merrillville, IN (US)

( * ) Notice: Subject to any disclaimer, the term of this patent is extended or adjusted under 35 U.S.C. 154(b) by 0 days.

(21) Appl. No.: 17/552,315

(22) Filed: Dec. 15, 2021

(65) Prior Publication Data
US 2022/0186158 A1    Jun. 16, 2022

(30) Foreign Application Priority Data
Dec. 15, 2020  (EP) ..................................... 20214222

(51) Int. Cl.
*C11D 17/04* (2006.01)
*B65D 81/32* (2006.01)
*B65D 65/46* (2006.01)
*C08F 222/06* (2006.01)
*C08F 216/06* (2006.01)
*C08F 218/08* (2006.01)
*C08F 116/06* (2006.01)

(52) U.S. Cl.
CPC ............ *C11D 17/045* (2013.01); *B65D 65/46* (2013.01); *B65D 81/3261* (2013.01); *C08F 116/06* (2013.01); *C08F 216/06* (2013.01); *C08F 218/08* (2013.01); *C08F 222/06* (2013.01)

(58) Field of Classification Search
CPC .. C11D 17/045; B65D 81/3261; B65D 65/46; C08F 222/16; C08F 216/06; C08F 218/08; C08F 116/06
USPC ....................................................... 510/296
See application file for complete search history.

(56) References Cited

U.S. PATENT DOCUMENTS

| | | |
|---|---|---|
| 3,580,390 A | 5/1971 | Shull, Jr. |
| RE29,059 E | 12/1976 | Kack et al. |
| 4,466,431 A | 8/1984 | Tharrat et al. |
| 4,681,228 A | 7/1987 | Kerry et al. |
| 5,558,228 A | 9/1996 | Jackisch et al. |
| 6,204,223 B1 | 3/2001 | Holmes et al. |
| 7,476,325 B2 | 1/2009 | Tufano et al. |
| 7,964,549 B2 | 6/2011 | Boutoille et al. |
| 8,163,104 B2 | 4/2012 | Swidersky et al. |
| 8,333,033 B2 | 12/2012 | Bell |
| 8,662,880 B2 | 3/2014 | Fowler et al. |
| 8,728,593 B2 | 5/2014 | Vicari et al. |
| 10,619,042 B2 | 4/2020 | Labeque et al. |
| 10,745,655 B2 * | 8/2020 | Courchay ............ C11D 17/045 |
| 2004/0144682 A1 | 7/2004 | Altmayer |
| 2006/0081176 A1 | 4/2006 | Boyle et al. |
| 2006/0172910 A1 | 8/2006 | Brooker et al. |
| 2006/0173430 A1 | 8/2006 | Lee et al. |
| 2007/0003719 A1 | 1/2007 | Balchin |
| 2008/0185347 A1 | 8/2008 | Tufano et al. |
| 2011/0054111 A1 | 3/2011 | McLachlan et al. |
| 2013/0240388 A1 | 9/2013 | Koch et al. |
| 2014/0110301 A1 | 4/2014 | Carrier et al. |
| 2014/0124454 A1 | 5/2014 | Nichols et al. |
| 2017/0298216 A1 * | 10/2017 | Labeque ............ B65D 81/3261 |
| 2017/0369822 A1 * | 12/2017 | Souter ............... B29C 66/7352 |
| 2018/0290774 A1 | 10/2018 | Fowler et al. |
| 2020/0308515 A1 * | 10/2020 | Vitiello ................. B32B 27/306 |
| 2020/0308516 A1 * | 10/2020 | Vitiello ................. C11D 17/045 |

FOREIGN PATENT DOCUMENTS

EP        0989803 A1    4/2000

OTHER PUBLICATIONS

European Search Report from EP Application No. 20214222.0 dated May 25, 2021.
European Patent Application No. 20214142.0, Extended European Search Report, dated May 25, 2021.
European Patent Application No. 20214392.1, Extended European Search Report, dated May 25, 2021.
European Patent Application No. 20214147.9, Extended European Search Report, dated May 25, 2021.
European Patent Application No. 21214591.6, Extended European Search Report, dated May 11, 2022.
International Application No. PCT/US2021/063427, International Search Report and Written Opinion, dated Mar. 21, 2022.
European Patent Application No. 21214734.2, Extended European Search Report, dated May 11, 2022.

* cited by examiner

*Primary Examiner* — Michael M. Bernshteyn
(74) *Attorney, Agent, or Firm* — Marshall, Gerstein & Borun LLP

(57) ABSTRACT

Water-soluble films, water-soluble unit dose articles, and related methods of making and using the same.

29 Claims, 1 Drawing Sheet

WATER-SOLUBLE FILMS, WATER-SOLUBLE UNIT DOSE ARTICLES, AND METHODS OF MAKING AND USING THE SAME

FIELD OF THE INVENTION

Water-soluble films, water-soluble unit dose articles, and methods of their manufacture and use.

BACKGROUND OF THE INVENTION

Water-soluble unit dose articles are liked by consumers as they are convenient and efficient to use. Such water-soluble unit dose articles often comprise detergent compositions. Without wishing to be bound by theory, when the water-soluble unit dose article is added to water, the film dissolves/disintegrates releasing the internal contents into the surrounding water to create a wash liquor. The water soluble film used must meet the dual criteria of providing sufficient strength such that the film does not rip or tear resulting in premature rupture of the water-soluble unit dose article during storage and transport, but also adequately dissolves during the wash cycle to minimise unwanted film residues at the end of the wash operation. Films comprised of polyvinyl alcohol have been used to meet these needs. A preferred method of making such unit dose articles is to deform a first water-soluble film into a mould to create an open cavity, fill the open cavity with a detergent composition, then close the open cavity with a second water-soluble film and seal the first and second water-soluble films together to create the water-soluble unit dose article.

There is an increasing desire to wash fabrics under more environmentally friendly conditions, such as shorter wash cycles and cooler wash temperatures. Under such conditions, unit dose articles made using traditional water-soluble films (which primarily comprise polyvinyl alcohol homopolymers), can suffer from incomplete dissolution during the wash cycle, resulting in undissolved film material remaining and depositing onto articles to be washed.

Efforts have previously been made to overcome this issue. U.S. Pat. No. 10,619,042 describes a water-soluble unit dose article comprising a water-soluble film comprising a polyvinyl alcohol (PVOH) resin blend comprising: a first PVOH polymer comprising carboxylated anionic monomer units, vinyl alcohol monomer units and optionally vinyl acetate monomer units, wherein the carboxylated anionic monomer unit is present in the first PVOH polymer in an amount of from about 3 mol. % to about 6 mol. %, a second PVOH polymer consisting essentially of vinyl alcohol monomer units and optionally vinyl acetate monomer units, wherein the first PVOH polymer is present in an amount in a range from about 10 wt. % to about 70 wt. % of total PVOH polymers in the film. Such water-soluble unit dose articles provide both excellent dissolution yet also acceptable film structural integrity, yet as described below are subject to additional improvement.

SUMMARY

A first aspect includes a water-soluble unit dose article comprising at least two compartments and optionally containing a composition housed in at least one of the compartments, wherein the unit dose article comprises;
a. a first water-soluble film, wherein the first water-soluble film has a first side and a second side, and wherein the first water soluble film comprises a first PVOH resin wherein the first polyvinyl alcohol resin comprises;
  i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
  ii. a second PVOH polymer wherein the second PVOH polymer is a homopolymer wherein the homopolymer consists of vinyl alcohol monomer units and optionally vinyl acetate monomer units;
b. a second water-soluble film, wherein the second water-soluble film has a first side and a second side, and wherein the second water-soluble film comprises a second polyvinyl alcohol resin wherein the second polyvinyl alcohol resin comprises;
  i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
  ii. about 85% to about 100% by weight of the second polyvinyl alcohol resin of a polyvinyl alcohol homopolymer or a homopolymer blend, wherein the homopolymers consist of vinyl alcohol monomer units and optionally vinyl acetate monomer units;
  wherein the second polyvinyl alcohol resin has an average viscosity of less than 12 mPa·s measured as a 4% polyvinyl alcohol polymer solution in deionized water at 20° C.;
c. a third water-soluble film wherein the third water-soluble film has a first side and a second side, and wherein the third water soluble film comprises a third polyvinyl alcohol resin, wherein the third polyvinyl alcohol resin optionally comprises:
  i. a first PVOH polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
  ii. a second PVOH polymer wherein the second PVOH polymer is a homopolymer wherein the homopolymer consists of vinyl alcohol monomer units and optionally vinyl acetate monomer units;
  wherein the first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment;
  provided that when the a composition is housed in at least one of the compartments then the composition is not a household care composition.

A second aspect is a process of making a water-soluble unit dose article according to the disclosure herein, comprising the steps of;
a. deforming the first water-soluble film to create an open cavity;
b. filling the open cavity with a composition;
c. separately deforming the third water-soluble film to create at least one open cavity;
d. filling the at least one open cavity from step (c) with a composition;
e. closing the open filled cavity from step (d) with the second water-soluble film;
f. sealing the second water-soluble film to the third water-soluble film to create a closed intermediate;
g. closing the open filled cavity from step (b) with the closed intermediate from step (f); and
h. sealing the first water-soluble film to the second water-soluble film to create the water-soluble unit dose article.

For the compositions and methods described herein, optional features, including but not limited to components, compositional ranges thereof, substituents, conditions, and steps, are contemplated to be selected from the various aspects, embodiments, and examples provided herein.

Further aspects and advantages will be apparent to those of ordinary skill in the art from a review of the following detailed description, taken in conjunction with the drawings. While the films, unit dose articles, and methods described herein are susceptible of embodiments in various forms, the description hereafter includes specific embodiments with the understanding that the disclosure is illustrative, and is not intended to limit the invention to the specific embodiments described herein.

DETAILED DESCRIPTION

Figure 1:
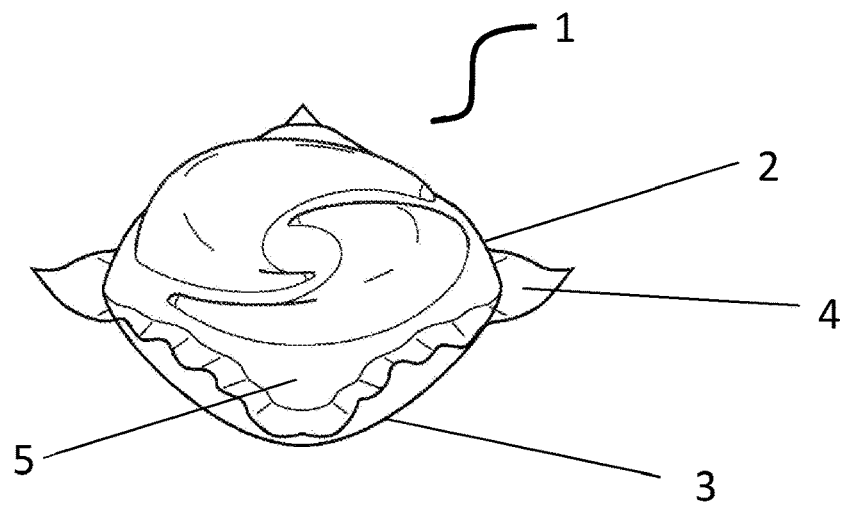
FIG. 1 is a water-soluble unit dose article according to the present invention.

As mentioned above, U.S. Pat. No. 10,619,042 describes a water-soluble unit dose article comprising a water-soluble film comprising a PVOH resin blend comprising: a first PVOH polymer comprising carboxylated anionic monomer units, vinyl alcohol monomer units and optionally vinyl acetate monomer units, wherein the carboxylated anionic monomer unit is present in the first PVOH polymer in an amount of from about 3 mol. % to about 6 mol. %, a second PVOH polymer consisting essentially of vinyl alcohol monomer units and optionally vinyl acetate monomer units, wherein the first PVOH polymer is present in an amount in a range from about 10 wt. % to about 70 wt. % of total PVOH polymers in the film. However, an issue was discovered with such unit dose articles, specifically that rather than a failure in the structural integrity of the film itself, failures can occur in the seal between the first and second water-soluble films. Such seal failure can result in premature rupture of the water-soluble unit dose article.

Therefore, there is a need in the art for a water-soluble unit dose article that provides reduced seal failures as compared to U.S. Pat. No. 10,619,042 yet also maintains structural integrity of the film itself and dissolution profiles comparable with those of U.S. Pat. No. 10,619,042.

It was surprisingly found that a water-soluble unit dose article describe below achieved this. This is even more surprising considering that the second water-soluble film comprises a higher degree of polyvinyl alcohol homopolymer, which the skilled person would expect to result in reduced dissolution under short and cold wash cycles.

In addition, wherein the films according to the prior art are sealed via solvent sealing, it was discovered there is a tendency for the solvent sealing solution to not deposit homogeneously on the water-soluble film prior to sealing. Without wishing to be bound by theory, wherein two films are intended to be sealed together, the solvent sealing solution needs to be applied to at least one of the films. If the solvent sealing solution does not provide a homogeneous layer on the film that it is applied to then this can result in weaker seals between the two films leading to seal failure and premature rupture of the water-soluble unit dose article. It was surprisingly found that in the unit dose articles described below, a more uniform/homogeneous layer of solvent sealing solution was obtained between the water-soluble films to be sealed, resulting in reduced seal failures.

The water-soluble films, unit dose articles, and methods are contemplated to include embodiments including any combination of one or more of the elements, features, and steps further described below (including those shown in the figures), unless stated otherwise.

Water-Soluble Unit Dose Article

A first aspect of the present invention is a water-soluble unit dose article. The water-soluble unit dose article comprises at least a first compartment and optionally a composition housed in the compartment. Suitable compositions are described in more detail below. The water-soluble unit dose article comprises a first water-soluble film and a second water-soluble film and optionally a third water-soluble film. The first water-soluble film, the second water-soluble film and the optional third water-soluble films are described in more detail below.

The final water-soluble unit dose article comprises water-soluble film shaped such that the unit-dose article comprises at least one internal compartment surrounded by the water-soluble film. An intermediate construct contemplated as an aspect of the disclosure herein can include elements of the article or portions of the article in an unsealed state, e.g. to allow for provision of a composition into the intermediate construction prior to final filling. The water-soluble unit dose article is constructed such that the composition does not leak out of the compartment during storage. However, upon contact of the water-soluble unit dose article with water, the water-soluble film dissolves and releases the contents of the internal compartment, e.g. into a wash liquor, bulk water, or other environment (e.g. onto soil in the case of an agricultural composition).

A compartment of the final unit dose article should be understood as meaning a closed internal space within the unit dose article, which holds the composition when present. In practice, a compartment can be devoid of a composition, or devoid of a solid or liquid type composition disposed therein, e.g. containing only air to provide an article which has a degree of buoyancy for a period of time prior to dissolution.

The first water-soluble film has a first side and a second side. The second water-soluble film has a first side and a second side. The optional third water-soluble film has a first side and a second side.

The first side of the first water-soluble film is sealed to the second side of the second water-soluble film to create a first compartment between the first water-soluble film and the second water-soluble film. Optionally, the first side of the second water-soluble film is sealed to the second side of the third water-soluble film to create at least a second compartment between the second water-soluble film and the third water-soluble film, and optionally wherein the second compartment is positioned above the first compartment.

The first water-soluble film and the second water-soluble film can be sealed via any suitable method, e.g. solvent sealing, heat sealing or a mixture thereof, for example via solvent sealing. The solvent sealing solution optionally comprises an aqueous solvent, a non-aqueous solvent or a mixture thereof. The solvent sealing solution can comprise water or consist of water. The solvent sealing solution optionally comprises at least 95%, or at least 98%, or at least 99%, or 100% by weight of the solvent sealing solution of water. The solvent sealing solution can be applied to a film by any suitable method, including contact and/or non-contact methods. For example, the solvent solution can be applied in a contact transfer process, e.g. using a contact member comprising a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. In another type of embodiment the sealing solution can be applied using a contact member comprising an absorbent material, for example natural felt, synthetic felt, porous plastic, foam, sponge, microfiber, cotton, polyester, extruded polyester fibers, nonwoven webs and the like, e.g. in pad or roller form. As another option, the sealing solution can be applied via a dosing nozzle or a spraying nozzle. Combinations of any of the foregoing methods and apparatus are contemplated. In one type of embodiment, a contact transfer method using an absorbent material is contemplated; and optionally in a continuous process, e.g. using a felt roll applicator. In one type of embodiment, the solvent sealing solution is applied to the second side of the second water-soluble film, the second side of the second water soluble film facing the first side of the first water-soluble film.

The second water-soluble film and the optional third water-soluble film can be sealed via solvent sealing, heat sealing or a mixture thereof, e.g. via solvent sealing. The solvent sealing solution can comprise an aqueous solvent, a non-aqueous solvent or a mixture thereof. For example, the solvent sealing solution can comprise water, or can consist of water. The solvent sealing solution can comprise at least 95%, or at least 98%, or at least 99%, or 100% by weight of the solvent sealing solution of water. The solvent sealing solution can be applied by any suitable method, including contact and/or non-contact methods. For example, the solvent solution can be applied in a contact transfer process, e.g. using a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. In another type of embodiment the sealing solution can be applied using an absorbent material, for example natural felt, synthetic felt, porous plastic, foam, sponge, microfiber, cotton, polyester, extruded polyester fibers, nonwoven webs and the like, e.g. in pad or roller form. As another option, the sealing solution can be applied via a dosing nozzle or a spraying nozzle. Combinations of any of the foregoing methods and apparatus are contemplated. In one type of embodiment, a contact transfer method using an absorbent material is contemplated; and optionally in a continuous process, e.g. using a felt roll applicator. The solvent sealing solution can be applied to the first side of the second water-soluble film, the first side of the second water soluble film facing the second side of the third water-soluble film.

Without wishing to be bound by theory, it is believed that addition of the solvent sealing solution onto a water-soluble film can create a thin foam layer. It is believed that this thin foam layer interferes with optimal sealing of the two films, e.g. as a result of a non-homogeneous layer of the solvent sealing solution being present on the water-soluble film. The thus-modified seals are relatively weak in whole or in part, resulting in premature seal failure, e.g. under conditions of stress. It was surprisingly found that addition of a solvent sealing solution to the second water-soluble film according to the present invention resulted in reduction or even absence of the foam layer, and as such reduction in instances of seal failure.

Optionally, the unit dose article comprises at least a third compartment, optionally at least a third and a fourth compartment between the second water-soluble film and the third water-soluble film. The second compartment and the third compartment, optionally the second compartment, the third compartment and the fourth compartments can be positioned side-by-side to one another, further optionally the second compartment and the third compartment, e.g. the second compartment, the third compartment and the fourth compartment can be positioned above the first compartment. In one type of embodiment, the second and third compartments, or the second, third and fourth compartments can be smaller than the first compartment. The second and third compartments, or the second, third and fourth compartments can be the same size as one another or can be different sizes. Some of the compartments can be the same size and some can be different sizes.

As mentioned above, one class of embodiments of the water-soluble unit dose article includes at least two compartments. This type of embodiment is further described below. The water-soluble unit dose article comprises at least two compartments and optionally a composition housed in one or more of the compartments. Suitable compositions are described in more detail below. The water-soluble unit dose article comprises a first water-soluble film, a second water-soluble film and a third water-soluble film. The first water-soluble film, the second water-soluble film and the third water-soluble films are described in more detail below.

The final water-soluble unit dose article comprises water-soluble film shaped such that the unit-dose article comprises at least two internal compartments surrounded by the water-soluble film. Intermediate constructions contemplated as aspects of the disclosure herein can include elements of the article or portions of the article in an unsealed state, e.g. to allow for provision of a composition into the intermediate construction prior to final filling of each of the compartments. Thus, for example, an intermediate construction can include a first sealed compartment and a second, partially open compartment ready for filling. The water-soluble unit dose article is constructed such that the two or more compositions does not leak out of the two or more compartments during storage. However, upon addition of the water-soluble unit dose article to water, the water-soluble film dissolves and releases the contents of the internal compartment, e.g. into a wash liquor, bulk water, or other environment.

A compartment of the final unit dose article should be understood as meaning a closed internal space within the unit dose article, which holds the composition when present. In practice, one or more compartments can be devoid of a composition disposed therein, e.g. to provide an article which has a degree of buoyancy for a period of time prior to dissolution.

The first water-soluble film has a first side and a second side. The second water-soluble film has a first side and a second side. The third water-soluble film has a first side and a second side.

The first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment.

The first water-soluble film and the second water-soluble film can be sealed via any suitable method, e.g. solvent sealing, heat sealing or a mixture thereof, for example via solvent sealing. The solvent sealing solution optionally comprises an aqueous solvent, a non-aqueous solvent or a mixture thereof. In embodiments, the solvent sealing solution can comprise water or consist of water. The solvent sealing solution optionally comprises at least 95%, or at least 98%, or at least 99%, or 100% by weight of the solvent sealing solution of water. The solvent sealing solution can be applied by any suitable method, including contact and/or non-contact methods. For example, the solvent solution can be applied in a contact transfer process, e.g. using a contact member comprising a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. In another type of embodiment the sealing solution can be applied using a contact member comprising an absorbent material, for example natural felt, synthetic felt, porous plastic, foam, sponge, microfiber, cotton, polyester, extruded polyester fibers, nonwoven webs and the like, e.g. in pad or roller form. As another option, the sealing solution can be applied via a dosing nozzle or a spraying nozzle. Combinations of any of the foregoing methods and apparatus are contemplated. In one type of embodiment, a contact transfer method using an absorbent material is contemplated; and optionally in a continuous process, e.g. using a felt roll applicator. The solvent sealing solution can be applied to the second side of the second water-soluble film, the second side of the second water soluble film facing the first side of the first water-soluble film.

The second water-soluble film and the third water-soluble film can be sealed via any suitable method, e.g. solvent sealing, heat sealing or a mixture thereof, for example via solvent sealing. The solvent sealing solution optionally comprises an aqueous solvent, a non-aqueous solvent or a mixture thereof. In embodiments, the solvent sealing solution can comprise water. The solvent sealing solution optionally comprises at least 95%, or even at least 98%, or even at least 99%, or even 100% by weight of the solvent sealing solution of water. The solvent sealing solution can be applied by any suitable method, including contact and/or non-contact methods. For example, the solvent solution can be applied in a contact transfer process, e.g. using a contact member comprising a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. In another type of embodiment the sealing solution can be applied using a contact member comprising an absorbent material, for example natural felt, synthetic felt, porous plastic, foam, sponge, microfiber, cotton, polyester, extruded polyester fibers, nonwoven webs and the like, e.g. in pad or roller form. As another option, the sealing solution can be applied via a dosing nozzle or a spraying nozzle. Combinations of any of the foregoing methods and apparatus are contemplated. In one type of embodiment, a contact transfer method using an absorbent material is contemplated; and optionally in a continuous process, e.g. using a felt roll applicator. The solvent sealing solution can be applied to the first side of the second water-soluble film, the first side of the second water soluble film facing the second side of the third water-soluble film.

Optionally, the unit dose article comprises at least a third compartment, optionally at least a third and a fourth compartment between the second water-soluble film and the third water-soluble film. The second compartment and the third compartment, optionally the second compartment, the third compartment and the fourth compartments can be positioned side-by-side to one another, further optionally the second compartment and the third compartment, e.g. the second compartment, the third compartment and the fourth compartment can be positioned above the first compartment. In one type of embodiment, the second and third compartments, or the second, third and fourth compartments can be smaller than the first compartment. The second and third compartments, or the second, third and fourth compartments can be the same size as one another or can be different sizes. Some of the compartments can be the same size and some can be different sizes.

A composition according to the present invention can be comprised in at least one of the compartments. It can for example be comprised in just one compartment, or can be comprised in two compartments, or even in three compartments, or even in four compartments.

Each compartment can comprise the same or different compositions. The different compositions could all be in the same form, or they may be in different forms, e.g. solid, powder, gel, paste, liquid, etc.

FIG. 1 discloses a water-soluble unit dose article (1) according to the present invention. Shown are the first water-soluble film (2) and the third water-soluble film (3) which are sealed together at a seal region (4). Not shown is the second water-soluble film which is positioned between the first water-soluble (2) and the third water-soluble film (3). A composition (5) is comprised within the water-soluble soluble unit dose article (1).

The water-soluble unit dose article can be coated with a lubricating agent. The lubricating agent can be selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures of any of the foregoing, for example.

First Water-Soluble Film

The water-soluble unit dose article comprises a first water-soluble film. The first water-soluble film of the present invention is soluble or dispersible in water. The first water-soluble film can have an average thickness, prior to any deformation, in a range of about 20 to about 150 micron, or about 35 to about 125 micron, or about 50 to about 110 micron, or about 76 micron. The first water-soluble film has a first side and a second side.

The first water-soluble film can have a water-solubility of at least 50%, or at least 75% or at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The first water-soluble film can be obtained by casting, blow-moulding, extrusion or blown extrusion of the polymeric material, as known in the art and described further below. The first water-soluble film can be a solvent casted water-soluble film.

The first water soluble film comprises a first PVOH resin wherein the first polyvinyl alcohol resin comprises a polyvinyl alcohol consisting of a polyvinyl alcohol homopolymer, an anionic polyvinyl alcohol copolymer, or a blend thereof.

In one aspect, the first water-soluble film can comprise a blend of polyvinyl alcohol homopolymers and/or anionic polyvinyl alcohol copolymers. For example, the first water-soluble film can comprise a blend of a polyvinyl alcohol homopolymer and an anionic polyvinyl alcohol copolymer, wherein the polyvinyl alcohol homopolymer and the anionic polyvinyl alcohol copolymer are present in a relative weight ratio of 90/10 to 10/90, or 80/20 to 20/80, or 70/30 to 50/50.

The first water-soluble film can comprise an anionic polyvinyl alcohol copolymer comprising an anionic monomer unit, optionally wherein the anionic monomer unit is present in the anionic polyvinyl alcohol copolymer in an average amount in a range of about 1 mol. % to about 10 mol. %, or about 2 mol. % to about 5 mol %. The anionic polyvinyl alcohol copolymer can be selected from sulphonated and carboxylated anionic polyvinyl alcohol copolymers, e.g. carboxylated anionic polyvinyl alcohol copolymers.

The first water-soluble film can comprise a blend of a polyvinyl alcohol homopolymer and a carboxylated anionic polyvinyl alcohol copolymer, optionally wherein the carboxylate is selected from an acrylate, a methacrylate, a maleate, or a mixture thereof, and a maleate is particularly contemplated. The carboxylated anionic monomer unit in the first water-soluble film can be derived from a monoalkyl maleate unit optionally selected from the group consisting of monomethyl maleate, salts, e.g. alkali metal salts, thereof, and combinations thereof. Without wishing to be bound by theory polyvinyl alcohol polymer comprising carboxylated anionic monomer units, vinyl alcohol monomer units and optionally vinyl acetate monomer units is an anionic polyvinyl alcohol copolymer. Each carboxylated anionic monomer unit can be present in the carboxylated anionic polyvinyl alcohol copolymer in an average amount in a range of about 3 mol. % to about 6 mol. %, or about 3 mol. % to about 5 mol. %, or about 3.5 mol. % to about 4.5 mol. %, or about 4 mol. % to about 4.5 mol. %.

Without wishing to be bound by theory, the term "homopolymer" generally includes polymers having a single type of monomeric repeating unit (e.g., a polymeric chain comprising or consisting of a single monomeric repeating unit). For the particular case of polyvinyl alcohol polymer, the term "homopolymer" further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinyl alcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinyl alcohol polymer, the term "copolymer" (or "polyvinyl alcohol copolymer") can include copolymers having a distribution of vinyl alcohol monomer units and vinyl acetate monomer units, depending on the degree of hydrolysis, as well as at least one other type of monomeric repeating unit (e.g., a ter-(or higher) polymeric chain comprising or consisting of vinyl alcohol monomer units, vinyl acetate monomer units, and one or more other monomer units, for example anionic monomer units). In the case of 100% hydrolysis, a polyvinyl alcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). Anionic monomers may include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof.

The first polyvinyl alcohol resin optionally can be present in a range of about 50% to about 95%, or in a range of about 50% to about 80%, or about 60% to about 75%, by weight of the first water-soluble film.

The first polyvinyl alcohol resin optionally can comprise:
  i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. a second PVOH polymer wherein the second PVOH polymer is a homopolymer wherein the homopolymer consists of vinyl alcohol monomer units and optionally vinyl acetate monomer units.

The first polyvinyl alcohol polymer in the first water-soluble film optionally can be characterized by;
  a. an average 4% aqueous solution viscosity (in deionized water) at 20° C. of in a range of about 10 mPa·s to about 40 mPa·s, or in a range of about 10 mPa·s to about 30 mPa·s, or in a range of about 12 mPa·s to about 25 mPa·s, or in a range of 14 mPa·s to about 20 mPa·s, or
  b. an average degree of hydrolysis of in a range of about 60% to about 99%, in a range of 80% to about 98%, or in a range of about 83% to about 95%, or in a range of about 85% to about 92%, or
  c. a combination thereof.

The second polyvinyl alcohol polymer in the first water-soluble film optionally can be characterized by:
  a. an average 4% aqueous solution viscosity (in deionized water) at 20° C. in a range of about 3 mPa·s to about 30 mPa·s, or in a range of about 7 mPa·s to about 30 mPa·s, or in a range of about 10 mPa·s to about 30 mPa·s, or in a range of about 12 mPa·s to about 25 mPa·s; or
  b. an average degree of hydrolysis of in a range of about 60% to about 99%, or in a range of about 80% to about 98%, or in a range of about 85% to about 95%, or in a range of about 87% to about 92%; or
  c. a combination thereof.

The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions (in deionized water) at 20° C.

In the first water-soluble film, the relative weight ratio of the first PVOH polymer and second PVOH polymer optionally can be in a range of about 90/10 to about 10/90, or in a range of about 80/20 to about 20/80, or in a range of about 70/30 to about 50/50.

The water-soluble films, including the first, second, and optional third, if present, water-soluble films can be characterized by or tested for tensile stress according to the Modulus (MOD) Test as follows. The procedure includes the determination of modulus at 10% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. One inch wide (2.54 cm) samples of a single film sheet having a thickness of 75 μm are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 100% modulus (i.e., stress required to achieve 100% film elongation).

The first water-soluble film can be characterized by 100% modulus value of at least about 20 N/mm$^2$ as measured by the MOD Test at 35% RH. Generally, higher MOD values are desirable because they correspond to pouches having a greater stiffness and a lower likelihood of deforming and sticking to each other when loaded on top of each other during production or in final consumer packaging. Further, MOD values at 10% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. In various embodiments, the first water-soluble film has a MOD value of at least about 20, 21, 22, 23, 24, 25, or 27 N/mm$^2$ and/or up to about 24, 25, 27, 28, 29, or 30 N/mm$^2$ (e.g., about 20 N/mm$^2$ to about 30 N/mm$^2$, or about 20 N/mm$^2$ to about 28 N/mm$^2$, or about 22 N/mm$^2$ to about 25 N/mm$^2$).

The first water-soluble film optionally can comprise a surfactant content in a range of about 0.1% to about 3.5%, or about 0.1% to about 2.5%, or in a range of about 1% to about 2%, or in a range of about 0.5% to about 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

The first water-soluble film optionally can have a residual moisture content of at least 4%, or in a range of about 4% to about 15%, or about 5% to about 10% by weight of the first water-soluble film as measured by Karl Fischer titration.

The first water-soluble film optionally can comprise one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

The first water-soluble film optionally can comprise one or more plasticizers in an amount in a range of about 5% to about 50%, or about 10% to about 40%, or about 20% to about 30% by weight of the first water-soluble film. The plasticiser in the first water-soluble film optionally can be selected from polyols, sugar alcohols, or a mixture thereof, e.g. wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof. The plasticizer optionally can be selected from the group consisting of sorbitol, glycerol, dipropyleneglycol, polyethyleneglycol, trimethylolpropane, and mixtures thereof.

The first water-soluble film according to the invention optionally can comprise lubricants/release agents. Suitable lubricants/release agents can include, but are not limited to, fatty acids and their salts, fatty alcohols, fatty esters, fatty amines, fatty amine acetates and fatty amides. Lubricants/release agents can be selected from fatty acids, fatty acid salts, and fatty amine acetates. The amount of lubricant/release agent in the first water-soluble film optionally is in a range of about 0.02% to about 1.5%, or about 0.1% to about 1% by weight of the first water-soluble film.

The first water-soluble film optionally can comprise fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Starches, modified starches, silica, and mixtures thereof are particularly contemplated. The amount of filler, extender, antiblocking agent, detackifying agent or mixture thereof in the first water-soluble film optionally can be in a range of about 0.1% to about 25%, or about 1% to about 10%, or about 2% to about 8%, or about 3% to about 5% by weight of the first water-soluble film. In the absence of starch, a suitable filler, extender, antiblocking agent, detackifying agent or mixture thereof optionally can be present in a range of about 0.1% to about 1%, or about 4%, or about 6%, or about 1% to about 4%, or about 1% to about 2.5%, by weight of the first water-soluble film. The first water-soluble film can comprise a printed area. The area of print can be achieved using standard techniques, e.g. flexographic printing or inkjet printing.

The first water-soluble film can comprise an aversive agent, for example a bittering agent. Suitable bittering agents include, but are not limited to, naringin, sucrose octaacetate, quinine hydrochloride, denatonium benzoate, and mixtures thereof. Any suitable level of aversive agent may be used in the film. Suitable levels include, but are not limited to, about 1 ppm to about 5000 ppm, or about 100 ppm to about 2500 ppm, or about 250 ppm to about 2000 ppm.

The first water-soluble film, and each individual component thereof, independently can comprise 0 ppm to about 20 ppm, or 0 ppm to about 15 ppm, or 0 ppm to about 10 ppm, or 0 ppm to about 5 ppm, or 0 ppm to about 1 ppm, or 0 ppb to about 100 ppb, or 0 ppb dioxane. Those skilled in the art will be aware of known methods and techniques to determine the dioxane level within water-soluble films and ingredients thereof.

A subtype of the general first water-soluble film described above will now be provided. This type of first water-soluble film is specifically contemplated for use with every other water-soluble film described herein, including the second water-soluble films, and third water-soluble films, as well as with each composition described herein and each method described herein.

This first water-soluble film can have an average thickness, prior to any deformation, in a range of about 20 to about 150 micron, or about 35 to about 125 micron, or about 50 to about 110 micron, or about 76 micron. The first water-soluble film has a first side and a second side.

The first water-soluble film can have a water-solubility of at least 50%, or at least 75% or at least 95%, as measured by the method described above using a glass-filter with a maximum pore size of 20 microns.

The first water-soluble film can be obtained by casting, blow-moulding, extrusion or blown extrusion of the polymeric material, as known in the art and described further below. The first water-soluble film can be a solvent casted water-soluble film.

This first water-soluble film comprises a first PVOH resin wherein the first polyvinyl alcohol resin comprises;
  i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
  ii. a second PVOH polymer wherein the second PVOH polymer is a homopolymer wherein the homopolymer consists of vinyl alcohol monomer units and optionally vinyl acetate monomer units.

The first polyvinyl alcohol resin optionally can be present in a range of about 50% to about 95%, or in a range of about 50% to about 80%, or about 60% to about 75%, by weight of this first water-soluble film.

The carboxylated anionic monomer unit in this first water-soluble film optionally can be derived from a monoalkyl maleate unit, e.g. selected from the group consisting of monomethyl maleate, salts, e.g. alkali metal salts, thereof, and combinations thereof. Without wishing to be bound by theory a polyvinyl alcohol polymer comprising carboxylated anionic monomer units, vinyl alcohol monomer units and optionally vinyl acetate monomer units is an anionic polyvinyl alcohol copolymer. Each carboxylated anionic monomer unit optionally can be present in the first polyvinyl alcohol polymer in an average amount in a range of about 3 mol. % to about 6 mol. %, or in a range of about 3 mol. % to about 5 mol. %, or in a range of about 3.5 mol. % to about 4.5 mol. %, or in a range of about 4 mol. % to about 4.5 mol. %.

General classes of anionic monomer units include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). Anionic monomers may include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof.

The first polyvinyl alcohol polymer in the first water-soluble resin optionally is characterized by:
a. an average viscosity in a range of about 10 mPa·s to about 40 mPa·s, or in a range of about 10 mPa·s to about 30 mPa·s, or in a range of about 12 mPa·s to about 25 mPa·s, or in a range of about 14 mPa·s to about 20 mPa·s, measured as a 4% polyvinyl alcohol polymer solution in deionized water at 20° C. or
b. an average degree of hydrolysis of about 60% to about 99%, or about 80% to about 98%, or about 83% to about 95%, or about 85% to about 92%, or
c. a combination thereof.

The second polyvinyl alcohol polymer in the first water-soluble resin optionally is characterized by;
a. an average viscosity in a range of about 3 mPa·s to about 30 mPa·s, or in a range of about 7 mPa·s to about 30 mPa·s, or in a range of about 10 mPa·s to about 30 mPa·s, or in a range of about 12 mPa·s to about 25 mPa·s, measured as a 4% polyvinyl alcohol polymer solution in deionized water at 20° C., or
b. an average degree of hydrolysis in a range of about 60% to about 99%, or about 80% to about 98%, or about 85% to about 95%, or about 87% to about 92%, or
c. a combination thereof.

In the first water-soluble resin, the relative weight ratio of the first PVOH polymer and second PVOH polymer optionally can be in a range of about 90/10 to about 10/90, or about 80/20 to about 20/80, or about 70/30 to about 50/50.

In one type of embodiment, e.g. when used with laundry and automatic dishwashing compositions, or with fabric and homecare compositions generally, a first polyvinyl alcohol resin can have at least 65 wt. % of the first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof. Optionally, the amount of such first polyvinyl alcohol polymer can be in a range of about 65 wt. % to about 95 wt. %, or 65 wt. % to about 90 wt. %, or in a range of greater than 65 wt. % to about 95%, or greater than 65 wt. % to about 90 wt. %, or greater than 65 wt. % to about 85 wt. %, or about 70 wt. % to about 90 wt. % based on the weight of the first polyvinyl alcohol resin.

The first water-soluble film can be characterized by 100% modulus value of at least about 20 N/mm² as measured by the MOD Test at 35% RH. Generally, higher MOD values are desirable because they correspond to pouches having a greater stiffness and a lower likelihood of deforming and sticking to each other when loaded on top of each other during production or in final consumer packaging. Further, MOD values at 10% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. In various embodiments, the first water-soluble film has a MOD value of at least about 20, 21, 22, 23, 24, 25, or 27 N/mm² and/or up to about 24, 25, 27, 28, 29, or 30 N/mm² (e.g., about 20 N/mm² to about 30 N/mm², or about 20 N/mm² to about 28 N/mm², or about 22 N/mm² to about 25 N/mm²).

The first water-soluble film optionally can comprise a surfactant content in a range of about 0.1% to about 3.5%, or about 0.1% to about 2.5%, or in a range of about 1% to about 2%, or in a range of about 0.5% to about 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

The first water-soluble film optionally can have a residual moisture content of at least 4%, or in a range of about 4% to about 15%, or in a range of about 5% to about 10% by weight of the first water-soluble film as measured by Karl Fischer titration.

The first water-soluble film can comprise one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

The first water-soluble film can comprise one or more plasticizers in an amount in a range of about 5% to about 50%, or about 10% to about 40%, or about 20% to about 30% by weight of the first water-soluble film. The plasticiser in the first water-soluble film optionally can be selected from polyols, sugar alcohols, or a mixture thereof, e.g. wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols can include sugar alcohols selected from the group consisting of isomalt, maltitol, sorbitol, xylitol, erythritol, adonitol, dulcitol, pentaerythritol and mannitol, or a mixture thereof. The plasticizer can be selected from the group consisting of sorbitol, glycerol, dipropyleneglycol, polyethyleneglycol, trimethylolpropane, and mixtures thereof.

The first water-soluble film optionally can comprise lubricants/release agents. Suitable lubricants/release agents can include, but are not limited to, fatty acids and their salts, fatty alcohols, fatty esters, fatty amines, fatty amine acetates and fatty amides. Lubricants/release agents can be selected from fatty acids, fatty acid salts, and fatty amine acetates. The amount of lubricant/release agent in the first water-soluble film optionally can be in a range in a range of about 0.02% to about 1.5%, or about 0.1% to about 1% by weight of the first water-soluble film.

The first water-soluble film optionally can comprise fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Starches, modified starches, silica, and mixtures thereof are particularly contemplated. The amount of filler, extender, antiblocking agent, detackifying agent or mixture thereof in the first water-soluble film optionally can be in a range of about 0.1% to about 25%, or about 1% to about 10%, or about 2% to about 8%, or about 3% to about 5% by weight of the first water-soluble film. In the absence of starch, a suitable filler, extender, antiblocking agent, detackifying agent or mixture thereof optionally can be present in a range of about 0.1% to about 1%, or about 4%, or about 6%, or about 1% to about 4%, or about 1% to about 2.5%, by weight of the first water-soluble film.

The first water-soluble film can comprise a printed area. The area of print can be achieved using standard techniques, e.g. flexographic printing or inkjet printing.

The first water-soluble film can comprise an aversive agent, for example a bittering agent. Suitable bittering agents include, but are not limited to, naringin, sucrose octaacetate, quinine hydrochloride, denatonium benzoate, and mixtures thereof. Any suitable level of aversive agent may be used in the film. Suitable levels include, but are not limited to, about 1 ppm to about 5000 ppm, or about 100 ppm to about 2500 ppm, or about 250 ppm to about 2000 ppm.

The first water-soluble film, and each individual component thereof, independently can comprise 0 ppm to about 20 ppm, or 0 ppm to about 15 ppm, or 0 ppm to about 10 ppm, or 0 ppm to about 5 ppm, or 0 ppm to about 1 ppm, or 0 ppb to about 100 ppb, or 0 ppb dioxane. Those skilled in the art will be aware of known methods and techniques to determine the dioxane level within water-soluble films and ingredients thereof.

Second Water-Soluble Film

The water-soluble unit dose article comprises a second water-soluble film. The second water-soluble film has a first side and a second side. The second water-soluble film comprises a second polyvinyl alcohol resin.

The second water-soluble film of the present invention is soluble or dispersible in water. The second water-soluble film can have an average thickness, prior to any deformation, in a range of about 20 to about 150 micron, or about 35 to about 125 micron, or about 50 to about 110 micron, or about 76 micron.

The second water-soluble film can have a water-solubility of at least 50%, or at least 75% or at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The second water-soluble film can be obtained by casting, blow-moulding, extrusion or blown extrusion of the polymeric material, as known in the art and described further below. The second water-soluble film can be a solvent casted water-soluble film.

The second water-soluble film comprises a polyvinyl alcohol resin. The polyvinyl alcohol resin optionally can be present in a range of about 50% to about 95%, or in a range of about 50% to about 80%, or about 60% to about 75%, by weight of the second water-soluble film . . . .

The second polyvinyl alcohol resin comprises less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof. The polyvinyl alcohol polymer comprising carboxylated anionic monomer units can be present in the second polyvinyl alcohol resin in a range of about 1 wt. % to less than 15 wt %, or about 1 wt % to about 10 wt %, or about 1 wt % to about 5 wt %, or about 5 wt % to about 15 wt % or about 5 wt % to about 10 wt % of the second polyvinyl alcohol resin, for example. Without wishing to be bound by theory, a polyvinyl alcohol polymer comprising carboxylated anionic monomer units, vinyl alcohol monomer units and optionally vinyl acetate monomer units is an anionic polyvinyl alcohol copolymer. The second polyvinyl alcohol resin also can comprise about 85% to about 100% by weight of the second polyvinyl alcohol resin of a polyvinyl alcohol homopolymer or a polyvinyl alcohol homopolymer blend, wherein the polyvinyl alcohol homopolymers consist of vinyl alcohol monomer units and optionally vinyl acetate monomer units. In one type of embodiment, the second polyvinyl alcohol resin can comprise the first polyvinyl alcohol polymer (anionic copolymer) in an amount described herein and the balance can be the second polyvinyl alcohol polymer (polyvinyl alcohol homopolymer or a polyvinyl alcohol homopolymer blend).

If present, the carboxylated anionic monomer unit optionally can be present in the polyvinyl alcohol polymer comprising a carboxylated anionic monomer unit in an average amount of at least 3 mol. %, or in a range of about 3 mol. % to about 6 mol. %, or about 3 mol. % to about 5 mol. %, or about 3.5 mol. % to about 4.5 mol. %, or about 4 mol. % to about 4.5 mol. %. The polyvinyl alcohol polymer comprising carboxylated anionic monomer units, vinyl alcohol monomer units and optionally vinyl acetate monomer units in the polyvinyl alcohol resin of the second water-soluble film, if present, optionally can be characterized by an average 4% aqueous solution viscosity (in deionized water) at 20° C. in a range of about 10 mPa·s to about 40 mPa·s, or about 10 mPa·s to about 30 mPa·s, or about 12 mPa·s to about 25 mPas, or about 14 mPa·s to about 20 mPa·s, or by an average degree of hydrolysis in a range of about 60% to about 99%, or about 80% to about 98%, or about 83% to about 95%, or about 85% to about 92%, or a combination of such a viscosity and average degree of hydrolysis.

The carboxylated anionic unit can be derived from maleic acid, monoalkyl maleate, dialkyl maleate, monomethyl maleate, dimethyl maleate, maleic anhydride, or mixtures thereof. The maleate unit can be derived from a monoalkyl maleate unit optionally selected from the group consisting of monomethyl maleate, salts, e.g. alkali metal salts, thereof, and combinations thereof.

The second polyvinyl alcohol resin also can comprise a polyvinyl alcohol homopolymer or a polyvinyl alcohol homopolymer blend in a range of about 85% to about 100% by weight of the polyvinyl alcohol resin, wherein the polyvinyl alcohol homopolymer or polyvinyl alcohol homopolymer blend consists of vinyl alcohol monomer units and optionally vinyl acetate monomer units. The second water-soluble film can comprise the polyvinyl alcohol homopolymer or a polyvinyl alcohol homopolymer blend in a range of about 90% to about 100%, e.g. 100% by weight of the second polyvinyl alcohol resin.

The polyvinyl alcohol resin of the second water-soluble film can comprise a polyvinyl alcohol homopolymer or a blend of a first polyvinyl alcohol homopolymer and a second polyvinyl alcohol homopolymer, the homopolymer or blend of the first and second polyvinyl alcohol homopolymers having an average viscosity in a range of about 8 mPa·s or more and less than 12 mPa·s, or about 8.5 mPa·s or more and less than 12 mPa·s, or about 9 mPa·s or more and less than 12 mPa·s, or about 9.5 mPa·s or more and less than 12 mPa·s, or about 10 mPa·s or more and less than 12 mPa·s, or about 10.5 mPa·s or more and less than 12 mPa·s, measured as a 4% polyvinyl alcohol solution in deionized water at 20° C., optionally wherein blend of first polyvinyl alcohol homopolymer and second polyvinyl alcohol homopolymer are present in a relative weight ratio in a range of about 90/10 to about 10/90, or about 80/20 to about 20/80, or about 70/30 to about 50/50. In other embodiments, the polyvinyl alcohol homopolymer or blend of the first and second polyvinyl alcohol homopolymers can have an average viscosity in a range of about 8 mPa·s to about 11.5 mPa·s, or about 8.5 mPa·s to about 11.5 mPa·s, or about 9 mPa·s to about 11.5 mPa·s, or about 9.5 mPa·s to about 11.5 mPa·s, or about 10 mPa·s to about 11.5 mPa·s, or about 10.5 mPa·s to about 11.5 mPa·s, or about 8 mPa·s to about 11 mPa·s, or about 8 mPa·s to about 10 mPa·s, measured as a 4% polyvinyl alcohol solution in deionized water at 20° C., optionally wherein the first polyvinyl alcohol homopolymer and second polyvinyl alcohol homopolymer are present in a relative weight ratio in a range of about 90/10 to about 10/90, or about 80/20 to about 20/80, or about 70/30 to about 50/50. Herein, the first polyvinyl alcohol homopolymer optionally can have an average viscosity in a range of about 11 mPa·s to about 20 mPa·s, of about 11 mPa·s to about 18 mPa·s, or about 11 mPa·s to about 15 mPa·s, measured as a 4% polyvinyl alcohol polymer solution in deionized water at 20° C.; and the second polyvinyl alcohol homopolymer can have an average viscosity in a range of about 1 mPa·s to about 10 mPa·s, optionally in a range of about 5 mPa·s to about 10 mPa·s, optionally in a range of about 6 mPa·s to about 10 mPa·s, optionally in a range of about 7 mPa·s to about 10 mPa·s, optionally in a range of about 8 mPa·s to about 10 mPa·s, measured as a 4% polyvinyl alcohol polymer solution in deionized water at 20° C. Optionally, the difference in average viscosity between the first polyvinyl alcohol polymer and the second polyvinyl alcohol homopolymer is at least about 1 mPa·s, or in a range of about 2 to about 10 mPa·s, or in a range of about 3 to about 8 mPa·s, measured as a 4% polyvinyl alcohol polymer solution in deionized water at 20° C. In any types of embodiments, the first and the second polyvinyl alcohol homopolymers independently can have an average degree of hydrolysis in a range of about 75% to about 99%, or in a range of about 80% to about 95%, or in a range of about 85% to about 95%. Optionally, the polyvinyl alcohol resin of the second water soluble film can have an average degree of hydrolysis in a range of about 75% to about 99%, or about 80% to about 95%, or about 85% to about 95%. A suitable test method to measure the degree of hydrolysis is as according to standard method JIS K6726.

The second water-soluble film can be characterized 100% modulus values of less than 20 N/mm² as measured by the MOD Test at 35% RH. Generally, higher MOD (e.g. 20 N/mm² or greater) values are desirable because they correspond to films having a greater stiffness and a lower likelihood of deforming and sticking to each other when loaded on top of each other during production or in final consumer packaging. Further, MOD values at 100% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. However, it was determined that the second polyvinyl alcohol film can advantageously have a lower 100% modulus as described herein. Furthermore, when used as a middle film in a superposed pouch configuration as described herein, a relatively lower MOD value and the resultant tendency of a film to droop is negated by the configuration of the pouch, wherein the second film is essentially wholly within the pouch product. In various embodiments, the second water-soluble film can have a MOD value of less than about 20 N/mm², or less than about 19 N/mm², or less than about 18 N/mm², or less than about 17 N/mm², or less than about 16 N/mm², or less than about 15 N/mm², or less than about 14 N/mm², and optionally at least about 9 N/mm², or at least about 10 N/mm², or at least about 11 N/mm², at least about 12 N/mm², or at least about 13 N/mm², for example in a range of about 10 N/mm² to about 16 N/mm², or about 11 N/mm² to about 15 N/mm², or about 12 N/mm² to about 14 N/mm². In a related aspect, the second water-soluble film can be characterized by having a 100% modulus value that is at least about 1 N/mm², or at least about 2 N/mm², or at least about 3 N/mm², or at least about 4 N/mm², or at least about 5 N/mm², or at least about 6 N/mm², or at least about 7 N/mm², or at least about 10 N/mm², or at least about 20 N/mm², or at least about 25 N/mm² different from the 100% modulus value of the first water-soluble film, and further optionally at least about 1 N/mm², or at least about 2 N/mm², or at least about 3 N/mm², or at least about 4 N/mm², or at least about 5 N/mm², or at least about 6 N/mm², or at least about 7 N/mm², or at least about 10 N/mm², or at least about 20 N/mm² different from the 100% modulus value of the optionally third water-soluble film, and still further optionally at least about 1 N/mm², or at least about 2 N/mm², or at least about 3 N/mm², or at least about 4 N/mm², or at least about 5 N/mm², or at least about 6 N/mm², or at least about 7 N/mm², or at least about 10 N/mm², or at least about 20 N/mm² different from the 100% modulus value of both the values of the first water-soluble film and the optionally third water-soluble film, if present, respectively.

The second water-soluble film optionally can comprise a surfactant content in a range of about 0.1% to about 3.5%, or about 0.1% to about 2.5%, or in a range of about 1% to about 2%, or in a range of about 0.5% to about 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

The second water-soluble film optionally can have a residual moisture content of at least about 4%, or in a range of about 4% to about 15%, or about 5% to about 10% by weight of the second water-soluble film as measured by Karl Fischer titration.

The second water-soluble film optionally can comprise one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

The second water-soluble film optionally can comprise one or more plasticizers in an amount in a range of about 5% to about 50%, or about 10% to about 40%, or about 20% to about 30% by weight of the second water-soluble film. The plasticiser in the second water-soluble film optionally can be selected from polyols, sugar alcohols, or a mixture thereof, e.g. wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof. The plasticizer can be selected from the group consisting of sorbitol, glycerol, dipropyleneglycol, polyethyleneglycol, trimethylolpropane, and mixtures thereof.

The second water-soluble film according to the invention can comprise lubricants/release agents. Suitable lubricants/release agents can include, but are not limited to, fatty acids and their salts, fatty alcohols, fatty esters, fatty amines, fatty amine acetates and fatty amides. Lubricants/release agents can be selected from fatty acids, fatty acid salts, and fatty amine acetates. The amount of lubricant/release agent in the second water-soluble film optionally can be in a range of about 0.02% to about 1.5%, or about 0.1% to about 1% by weight of the second water-soluble film.

The second water-soluble film optionally can comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Starches, modified starches, silica, and mixtures thereof are particularly contemplated. The amount of filler, extender, antiblocking agent, detackifying agent or mixture thereof in the second water-soluble film optionally can be in a range of about 0.1% to about 25%, or about 1% to about 10%, or about 2% to about 8%, or about 3% to about 5% by weight of the second water-soluble film. In the absence of starch, a suitable filler, extender, antiblocking agent, detackifying agent or mixture thereof optionally can be present in a range of about 0.1% to about 1%, or about 4%, or about 6%, or about 1% to about 4%, or about 1% to about 2.5%, by weight of the second water-soluble film.

The second water-soluble film can comprise a printed area. The area of print can be achieved using standard techniques, e.g. flexographic printing or inkjet printing.

The second water-soluble film can comprise an aversive agent, for example a bittering agent. Suitable bittering agents include, but are not limited to, naringin, sucrose octaacetate, quinine hydrochloride, denatonium benzoate, and mixtures thereof. Any suitable level of aversive agent may be used in the second water-soluble film. Suitable levels include, but are not limited to, about 1 ppm to about 5000 ppm, or about 100 ppm to about 2500 ppm, or about 250 ppm to about 2000 ppm.

The second water-soluble film, and each individual component thereof, independently can comprise 0 ppm to about 20 ppm, or 0 ppm to about 15 ppm, or 0 ppm to about 10 ppm, or 0 ppm to about 5 ppm, or 0 ppm to about 1 ppm, or 0 ppb to about 100 ppb, or 0 ppb dioxane. Those skilled in the art will be aware of known methods and techniques to determine the dioxane level within water-soluble films and ingredients thereof.

Third Water-Soluble Film

The water-soluble unit dose article can comprise a third water-soluble film. The third water-soluble film of the present invention is soluble or dispersible in water. The third water-soluble film can have an average thickness, prior to any deformation, in a range of about 20 to about 150 micron, or about 35 to about 125 micron, or about 50 to about 110 micron, or about 76 micron. The third water-soluble film has a first side and a second side.

The third water-soluble film can have a water-solubility of at least 50%, or at least 75% or at least 95%, as measured by the method described above using a glass-filter with a maximum pore size of 20 microns.

The third water-soluble film can be obtained by casting, blow-moulding, extrusion or blown extrusion of the polymeric material, as known in the art and described further below. The third water-soluble film can be a solvent casted water-soluble film.

The third water soluble film comprises a third PVOH resin wherein the third polyvinyl alcohol resin comprises a polyvinyl alcohol consisting of a polyvinyl alcohol homopolymer, an anionic polyvinyl alcohol copolymer, or a blend thereof.

In one aspect, the third water-soluble film can comprise a blend of polyvinyl alcohol homopolymers and/or anionic polyvinyl alcohol copolymers. For example, the third water-soluble film can comprise a blend of a polyvinyl alcohol homopolymer and an anionic polyvinyl alcohol copolymer, wherein the polyvinyl alcohol homopolymer and the anionic polyvinyl alcohol copolymer are present in a relative weight ratio of 90/10 to 10/90, or 80/20 to 20/80, or 70/30 to 50/50.

The third water-soluble film can comprise an anionic polyvinyl alcohol copolymer comprising an anionic monomer unit, optionally wherein the anionic monomer unit is present in the anionic polyvinyl alcohol copolymer in an average amount in a range of about 1 mol. % to about 10 mol. %, or about 2 mol. % to about 5 mol %. The anionic polyvinyl alcohol copolymer can be selected from sulphonated and carboxylated anionic polyvinyl alcohol copolymers, e.g. carboxylated anionic polyvinyl alcohol copolymers.

The third water-soluble film can comprise a blend of a polyvinyl alcohol homopolymer and a carboxylated anionic polyvinyl alcohol copolymer, optionally wherein the carboxylate is selected from an acrylate, a methacrylate, a maleate, or a mixture thereof, and a maleate is particularly contemplated. The carboxylated anionic monomer unit in the third water-soluble film can be derived from a monoalkyl maleate unit optionally selected from the group consisting of monomethyl maleate, salts, e.g. alkali metal salts, thereof, and combinations thereof. Without wishing to be bound by theory polyvinyl alcohol polymer comprising carboxylated anionic monomer units, vinyl alcohol monomer units and optionally vinyl acetate monomer units is an anionic polyvinyl alcohol copolymer. Each carboxylated anionic monomer unit can be present in the carboxylated anionic polyvinyl alcohol copolymer in an average amount in a range of about 3 mol. % to about 6 mol. %, or about 3 mol. % to about 5 mol. %, or about 3.5 mol. % to about 4.5 mol. %, or about 4 mol. % to about 4.5 mol. %.

General classes of anionic monomer units include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). Anionic monomers may include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof.

The third polyvinyl alcohol resin optionally can be present in a range of about 50% to about 95%, or in a range of about 50% to about 80%, or about 60% to about 75%, by weight of the third water-soluble film.

The third polyvinyl alcohol resin optionally can comprise:
i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
ii. a second PVOH polymer wherein the second PVOH polymer is a homopolymer wherein the homopolymer consists of vinyl alcohol monomer units and optionally vinyl acetate monomer units.

The first polyvinyl alcohol polymer in the third water-soluble film optionally can be characterized by;
a. an average 4% aqueous solution viscosity (in deionized water) at 20° C. of in a range of about 10 mPa·s to about 40 mPa·s, or in a range of about 10 mPa·s to about 30 mPa·s, or in a range of about 12 mPa·s to about 25 mPa·s, or in a range of 14 mPa·s to about 20 mPa·s, or
b. an average degree of hydrolysis of in a range of about 60% to about 99%, in a range of 80% to about 98%, or in a range of about 83% to about 95%, or in a range of about 85% to about 92%, or
c. a combination thereof.

The second polyvinyl alcohol polymer in the third water-soluble film optionally can be characterized by:
d. an average 4% aqueous solution viscosity (in deionized water) at 20° C. in a range of about 3 mPa·s to about 30 mPa·s, or in a range of about 7 mPa·s to about 30 mPa·s, or in a range of about 10 mPa·s to about 30 mPa·s, or in a range of about 12 mPa·s to about 25 mPa·s; or
e. An average degree of hydrolysis of in a range of about 60% to about 99%, or in a range of about 80% to about 98%, or in a range of about 85% to about 95%, or in a range of about 87% to about 92%; or
f. a combination thereof.

In the third water-soluble film, the relative weight ratio of the first PVOH polymer and second PVOH polymer optionally can be in a range of about 90/10 to about 10/90, or in a range of about 80/20 to about 20/80, or in a range of about 70/30 to about 50/50.

The third water-soluble film can be characterized by 100% modulus value of at least about 20 N/mm$^2$ as measured by the MOD Test at 35% RH. Generally, higher MOD values are desirable because they correspond to pouches having a greater stiffness and a lower likelihood of deforming and sticking to each other when loaded on top of each other during production or in final consumer packaging. Further, MOD values at 10% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. In various embodiments, the third water-soluble film has a MOD value of at least about 20, 21, 22, 23, 24, 25, or 27 N/mm$^2$ and/or up to about 24, 25, 27, 28, 29, or 30 N/mm$^2$ (e.g., about 20 N/mm$^2$ to about 30 N/mm$^2$, or about 20 N/mm$^2$ to about 28 N/mm$^2$, or about 22 N/mm$^2$ to about 25 N/mm$^2$).

The third water-soluble film optionally can comprise a surfactant content in a range of about 0.1% to about 3.5%, or about 0.1% to about 2.5%, or in a range of about 1% to about 2%, or in a range of about 0.5% to about 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

The third water-soluble film optionally can have a residual moisture content of at least 4%, or in a range of about 4% to about 15%, or about 5% to about 10% by weight of the third water-soluble film as measured by Karl Fischer titration.

The third water-soluble film optionally can comprise one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

The third water-soluble film optionally can comprise one or more plasticizers in an amount in a range of about 5% to about 50%, or about 10% to about 40%, or about 20% to about 30% by weight of the third water-soluble film. The plasticiser in the third water-soluble film optionally can be selected from polyols, sugar alcohols, or a mixture thereof, e.g. wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof. The plasticizer optionally can be selected from the group consisting of sorbitol, glycerol, dipropyleneglycol, polyethyleneglycol, trimethylolpropane, and mixtures thereof.

The third water-soluble film according to the invention optionally can comprise lubricants/release agents. Suitable lubricants/release agents can include, but are not limited to, fatty acids and their salts, fatty alcohols, fatty esters, fatty amines, fatty amine acetates and fatty amides. Lubricants/release agents can be selected from fatty acids, fatty acid salts, and fatty amine acetates. The amount of lubricant/release agent in the third water-soluble film optionally is in a range of about 0.02% to about 1.5%, or about 0.1% to about 1% by weight of the third water-soluble film.

The third water-soluble film optionally can comprise fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Starches, modified starches, silica, and mixtures thereof are particularly contemplated. The amount of filler, extender, antiblocking agent, detackifying agent or mixture thereof in the third water-soluble film optionally can be in a range of about 0.1% to about 25%, or about 1% to about 10%, or about 2% to about 8%, or about 3% to about 5% by weight of the third water-soluble film. In the absence of starch, a suitable filler, extender, antiblocking agent, detackifying agent or mixture thereof optionally can be present in a range of about 0.1% to about 1%, or about 4%, or about 6%, or about 1% to about 4%, or about 1% to about 2.5%, by weight of the third water-soluble film. The third water-soluble film can comprise a printed area. The area of print can be achieved using standard techniques, e.g. flexographic printing or inkjet printing.

The third water-soluble film can comprise an aversive agent, for example a bittering agent. Suitable bittering agents include, but are not limited to, naringin, sucrose octaacetate, quinine hydrochloride, denatonium benzoate, and mixtures thereof. Any suitable level of aversive agent may be used in the film. Suitable levels include, but are not limited to, about 1 ppm to about 5000 ppm, or about 100 ppm to about 2500 ppm, or about 250 ppm to about 2000 ppm.

The third water-soluble film, and each individual component thereof, independently can comprise 0 ppm to about 20 ppm, or 0 ppm to about 15 ppm, or 0 ppm to about 10 ppm, or 0 ppm to about 5 ppm, or 0 ppm to about 1 ppm, or 0 ppb to about 100 ppb, or 0 ppb dioxane. Those skilled in the art will be aware of known methods and techniques to determine the dioxane level within water-soluble films and ingredients thereof.

A subtype of the general third water-soluble film described above will now be provided. This type of third water-soluble film is specifically contemplated for use with every other water-soluble film described herein, including the second water-soluble films, and first water-soluble films, as well as with each composition described herein and each method described herein.

This third water-soluble film can have an average thickness, prior to any deformation, in a range of about 20 to about 150 micron, or about 35 to about 125 micron, or about 50 to about 110 micron, or about 76 micron. The third water-soluble film has a first side and a second side.

The third water-soluble film can have a water-solubility of at least 50%, or at least 75% or at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The third water-soluble film can be obtained by casting, blow-moulding, extrusion or blown extrusion of the polymeric material, as known in the art and described further below. The third water-soluble film can be a solvent casted water-soluble film.

The third water soluble film comprises a third PVOH resin wherein the third polyvinyl alcohol resin comprises;
   i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
   ii. a second PVOH polymer wherein the second PVOH polymer is a homopolymer wherein the homopolymer consists of vinyl alcohol monomer units and optionally vinyl acetate monomer units.

The third polyvinyl alcohol resin optionally can be present in a range of about 50% to about 95%, or in a range of about 50% to about 80%, or about 60% to about 75%, by weight of the third water-soluble film.

The carboxylated anionic monomer unit in the third water-soluble film optionally can be derived from a monoalkyl maleate unit, e.g. selected from the group consisting of monomethyl maleate, salts, e.g. alkali metal salts, thereof, and combinations thereof. Without wishing to be bound by theory a polyvinyl alcohol polymer comprising carboxylated anionic monomer units, vinyl alcohol monomer units and optionally vinyl acetate monomer units is an anionic polyvinyl alcohol copolymer. Each carboxylated anionic monomer unit optionally can be present in the first polyvinyl alcohol polymer in an average amount in a range of about 3 mol. % to about 6 mol. %, or in a range of about 3 mol. % to about 5 mol. %, or in a range of about 3.5 mol. % to about 4.5 mol. %, or in a range of about 4 mol. % to about 4.5 mol. %.

Without wishing to be bound by theory, the term "homopolymer" generally includes polymers having a single type of monomeric repeating unit (e.g., a polymeric chain comprising or consisting of a single monomeric repeating unit). For the particular case of polyvinyl alcohol polymer, the term "homopolymer" further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinyl alcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinyl alcohol polymer, the term "copolymer" (or "polyvinyl alcohol copolymer") can include copolymers having a distribution of vinyl alcohol monomer units and vinyl acetate monomer units, depending on the degree of hydrolysis, as well as at least one other type of monomeric repeating unit (e.g., a ter-(or higher) polymeric chain comprising or consisting of vinyl alcohol monomer units, vinyl acetate monomer units, and one or more other monomer units, for example anionic monomer units). In the case of 100% hydrolysis, a polyvinyl alcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). Anionic monomers may include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof.

The first polyvinyl alcohol polymer in the third water-soluble resin optionally is characterized by:
 a. an average 4% aqueous solution viscosity (in deionized water) at 20° C. in a range of about 10 mPa·s to about 40 mPa·s, or in a range of about 10 mPa·s to about 30 mPa·s, or in a range of about 12 mPa·s to about 25 mPa·s, or in a range of about 14 mPa·s to about 20 mPa·s, or
 b. an average degree of hydrolysis of about 60% to about 99%, or about 80% to about 98%, or about 83% to about 95%, or about 85% to about 92%, or
 c. a combination thereof.

The second polyvinyl alcohol polymer in the third water-soluble resin optionally is characterized by;
 g. an average 4% aqueous solution viscosity (in deionized water) at 20° C. in a range of about 3 mPa·s to about 30 mPa·s, or in a range of about 7 mPa·s to about 30 mPa·s, or in a range of about 10 mPa·s to about 30 mPa·s, or in a range of about 12 mPa·s to about 25 mPa·s; or
 h. an average degree of hydrolysis in a range of about 60% to about 99%, or about 80% to about 98%, or about 85% to about 95%, or about 87% to about 92%; or
 i. a combination thereof.

In the third water-soluble resin, the relative weight ratio of the first PVOH polymer and second PVOH polymer optionally can be in a range of about 90/10 to about 10/90, or about 80/20 to about 20/80, or about 70/30 to about 50/50.

In one type of embodiment, e.g. when used with laundry and automatic dishwashing compositions, or with fabric and homecare compositions generally, a third polyvinyl alcohol resin can have at least 65 wt. % of the first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof. Optionally, the amount of such first polyvinyl alcohol polymer can be in a range of about 65 wt. % to about 95 wt. %, or 65 wt. % to about 90 wt. %, or in a range of greater than 65 wt. % to about 95%, or greater than 65 wt. % to about 90 wt. %, or greater than 65 wt. % to about 85 wt. %, or about 70 wt. % to about 90 wt. % based on the weight of the third polyvinyl alcohol resin.

The third water-soluble film can be characterized by 100% modulus value of at least about 20 N/mm$^2$ as measured by the MOD Test at 35% RH. Generally, higher MOD values are desirable because they correspond to pouches having a greater stiffness and a lower likelihood of deforming and sticking to each other when loaded on top of each other during production or in final consumer packaging. Further, MOD values at 10% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. In various embodiments, the third water-soluble film has a MOD value of at least about 20, 21, 22, 23, 24, 25, or 27 N/mm$^2$ and/or up to about 24, 25, 27, 28, 29, or 30 N/mm$^2$ (e.g., about 20 N/mm$^2$ to about 30 N/mm$^2$, or about 20 N/mm$^2$ to about 28 N/mm$^2$, or about 22 N/mm$^2$ to about 25 N/mm$^2$).

The third water-soluble film optionally can comprise a surfactant content in a range of about 0.1% to about 3.5%, or about 0.1% to about 2.5%, or in a range of about 1% to about 2%, or in a range of about 0.5% to about 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

The third water-soluble film optionally can have a residual moisture content of at least 4%, or in a range of about 4% to about 15%, or in a range of about 5% to about 10% by weight of the third water-soluble film as measured by Karl Fischer titration.

The third water-soluble film can comprise one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

The third water-soluble film can comprise one or more plasticizers in an amount in a range of about 5% to about 50%, or about 10% to about 40%, or about 20% to about 30% by weight of the third water-soluble film. The plasticizer in the third water-soluble film optionally can be selected from polyols, sugar alcohols, or a mixture thereof, e.g. wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols can include sugar alcohols selected from the group consisting of isomalt, maltitol, sorbitol, xylitol, erythritol, adonitol, dulcitol, pentaerythritol and mannitol, or a mixture thereof. The plasticizer can be selected from the group consisting of sorbitol, glycerol, dipropyleneglycol, polyethyleneglycol, trimethylolpropane, and mixtures thereof.

The third water-soluble film according to the invention optionally can comprise lubricants/release agents. Suitable lubricants/release agents can include, but are not limited to, fatty acids and their salts, fatty alcohols, fatty esters, fatty amines, fatty amine acetates and fatty amides. Lubricants/release agents can be selected from fatty acids, fatty acid salts, and fatty amine acetates. The amount of lubricant/release agent in the third water-soluble film optionally can be in a range in a range of about 0.02% to about 1.5%, or about 0.1% to about 1% by weight of the third water-soluble film.

The third water-soluble film optionally can comprise fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Starches, modified starches, silica, and mixtures thereof are particularly contemplated. The amount of filler, extender, antiblocking agent, detackifying agent or mixture thereof in the third water-soluble film optionally can be in a range of about 0.1% to about 25%, or about 1% to about 10%, or about 2% to about 8%, or about 3% to about 5% by weight of the third water-soluble film. In the absence of starch, a suitable filler, extender, antiblocking agent, detackifying agent or mixture thereof optionally can be present in a range of about 0.1% to about 1%, or about 4%, or about 6%, or about 1% to about 4%, or about 1% to about 2.5%, by weight of the third water-soluble film.

The third water-soluble film can comprise a printed area. The area of print can be achieved using standard techniques, e.g. flexographic printing or inkjet printing.

The third water-soluble film can comprise an aversive agent, for example a bittering agent. Suitable bittering agents include, but are not limited to, naringin, sucrose octaacetate, quinine hydrochloride, denatonium benzoate, and mixtures thereof. Any suitable level of aversive agent may be used in the film. Suitable levels include, but are not limited to, about 1 ppm to about 5000 ppm, or about 100 ppm to about 2500 ppm, or about 250 ppm to about 2000 ppm.

The third water-soluble film, and each individual component thereof, independently can comprise 0 ppm to about 20 ppm, or 0 ppm to about 15 ppm, or 0 ppm to about 10 ppm, or 0 ppm to about 5 ppm, or 0 ppm to about 1 ppm, or 0 ppb to about 100 ppb, or 0 ppb dioxane. Those skilled in the art will be aware of known methods and techniques to determine the dioxane level within water-soluble films and ingredients thereof.

Method of Making Films

The water-soluble films used in the water-soluble unit-dose articles of the disclosure films can be made by any suitable method. Processes for making water-soluble films include solvent casting, blow-molding, extrusion, and blown extrusion, as generally known in the art. Processes for solvent casting are well-known in the art. For example, in the film-forming process, the resins and secondary additives are dissolved in a solvent, typically water, metered onto a surface, allowed to substantially dry (or force-dried) to form a cast film, and then the resulting cast film is removed from the casting surface. The process can be performed batchwise, and is more efficiently performed in a continuous process.

In the formation of continuous films, it is the conventional practice to meter a solution of the resin and secondary components onto a moving casting surface, for example, a continuously moving metal drum or belt, causing the solvent to be substantially removed from the liquid, whereby a self-supporting cast film is formed, and then stripping the resulting cast film from the casting surface. The solution can optionally be metered or coated onto a carrier film, release liner, or removable backing, whereby after solvent removal, the resulting cast film or coating can be separated from the carrier film, release liner, or removable backing (for example, immediately upon drying or at a later point in time, e.g., prior to use) or remain attached to the carrier film, release liner, or removable backing. A film or coating prepared on a carrier film, release liner, or removable backing can be self-supporting or non-self-supporting.

In general, the amount of water in the metered solution of polyvinyl alcohol, additional resins, and/or secondary components for film casting is selected such that when the solution is heated to the casting temperature, the solution has the highest solids level below the viscosity inflection point. Methods of determining the amount of solids at the viscosity inflection point are known in the art. In general, the water content of the metered solution can comprise between 60 to 85% water, or 60 to 75% water to provide suitable solutions for casting at typical casting solutions. The viscosity of the casting solution can be, for example, at least about 20,000 cps at 185° F. (85° C.), at least 30,000 cps at 185° F. (85° C.), for example about 40,000 cps to about 50,000 cps at 185° F. (85° C.).

The solution can be cast at any suitable temperature such that the film has a temperature, for example, in a range of about 50° C. to about 105° C., during drying. Without intending to be bound by theory, it is believed that as the casting solution and film temperature decreases below about 50° C., the amount of time required to dry the film undesirably increases, and the length of the drying chamber needed to fully dry the cast solution undesirably increases. Further, without intending to be bound by theory, it is believed that as the solution and film temperature increases above about 105° C., the solvent may rapidly boil out of the film, resulting in defects in the film surface such as holes or blisters in the finished films and/or facilitate undesirable reactions between adjacent PVOH backbone chain resulting in a film having reduced solubility.

In a continuous or semi-continuous casting process, the moving casting surface can have a line speed in a range of about 5 m/min to about 50 m/min. The line speed can affect the properties of the resulting film, for example, physical properties, thickness, residual moisture content and film quality. In general, as the line speed decreases, the thickness of the resulting film will increase and as the line speed increases, the thickness of the resulting film will decrease, assuming the delivery rate of solution remains constant. In general, as the line speed increases the residence time of the film in the dryer decreases, thereby requiring an increase in drying temperatures, which may result in drying defects or sticking at high enough temperatures. In contrast, as the line speed decreases, the residence time of the film in the dryer increases.

Any of the first, second, third, or additional films according to the disclosure herein can be produced by solvent casting, e.g. using a solvent band casting system. The system can include a tank for mixing and/or storing a polymer solution, having optional secondary additives, for use with a band casting machine having at least a first and a second rotating drums about which a continuous band (e.g. metal band) is tensioned to travel with the rotation of the drums. A sheeting die can apply the polymer solution from the tank to the metal band where a drying chamber, enclosing at least a portion of the metal band downline of the sheeting die, is used to remove solvent from the polymer solution as it travels in a thin sheet on the metal band. In addition, a release coating can be used to provide one or more advantages to the film and/or the process. For example, the release coating can substantially reduce or eliminate bubbles in the produced polymer film, or the release coating can improve the ease of release of the produced film from the casting surface. A roll coater release coating applicator in communication with a supply of a release coating and a portion of the band can transfer fluid release coating to the casting surface prior to application of the polymer solution to the band. A suitable solvent band casting system and related materials are further described in U.S. patent application publication No. 2006/0081176 A1, the disclosure of which is incorporated herein by reference in its entirety.

In general, the casting surface can be any suitable substrate for producing polymeric films to one of skill in the art. In embodiments, the substrate can be a casting roller or drum, a casting belt, or a combination thereof. As used herein, the substrate is used for producing a polymer film from a polymer resin or polymer resin solution. The substrate comprises a substrate surface and the substrate surface is coated with a release coating. The polymer resin solution can be cast onto a substrate while the substrate is moving, e.g. rotating. In embodiments, the substrate is a casting drum. In embodiments, the substrate is a casting belt. The substrate can comprise stainless steel, and optionally can have a stainless steel surface. The substrate can comprises stainless steel that is optionally plated, e.g. chrome plated, nickel plated, zinc plated or a combination thereof.

In general, the release coating can comprise one or more surfactants and an optional carrier, e.g. water. The release coating can comprise one or more surfactants, e.g. selected from a fluorosurfactant, a non-fluorinated anionic surfactant, a non-fluorinated zwitterionic surfactant, salts thereof, or any combination thereof. In embodiments, the anionic or zwitterionic surfactant(s) can be non-fluorinated and comprise a $C_6$-$C_{30}$ phosphate ester, a $C_6$-$C_{30}$ phosphate diester, a $C_6$-$C_{30}$ carboxylate, a $C_6$-$C_{30}$ dicarboxylate, a $C_6$-$C_{30}$ sulfate, a $C_6$-$C_{30}$ disulfate, or salts thereof. In embodiments, the release coating comprises a non-fluorinated zwitterionic surfactant or salts thereof. In embodiments, the release coating comprises a non-fluorinated anionic surfactant or salts thereof. In embodiments, the non-fluorinated anionic surfactant comprises a $C_6$-$C_{30}$ phosphate ester, or a $C_8$-$C_{16}$ phosphate ester, $C_6$-$C_{60}$ phosphate diester, $C_{16}$-$C_{32}$ phosphate diester, a $C_6$-$C_{30}$ carboxylate, a $C_6$-$C_{30}$ dicarboxylate, a $C_6$-$C_{30}$ sulfate, a $C_6$-$C_{30}$ disulfate, or salts thereof. In embodiments, the non-fluorinated anionic surfactant comprises a $C_6$-$C_{30}$ phosphate ester, or a $C_6$-$C_{18}$ phosphate ester, $C_6$-$C_0$ phosphate diester, $C_{18}$-$C_{32}$ phosphate diester, or salts thereof. In embodiments, the anionic surfactant can be selected from one or more of a $C_6$-based ammonium fluoroaliphatic phosphate ester; tridecyl alcohol ethoxylate phosphate ester, POE-12; tridecyl alcohol ethoxylate phosphate ester, POE-3; laureth-11 carboxylic acid; crypto-anionic surfactant-laureth-6 carboxylic acid; or sodium lauryl ether sulfate, POE-4.

As used herein, the term "non-fluorinated" refers to a surfactant that has less than 0.01 wt % fluorine based on the total molecular weight of the compound, or less than 0.001 wt % fluorine based on the total molecular weight of the compound, or less than 0.0001 wt % fluorine based on the total molecular weight of the compound.

In embodiments, the release coating can include a fluorosurfactant, e.g. a perfluoroalkyl-containing compound. In embodiments, the fluorosurfactant can include a solution of ZONYL FSP surfactant (E.I. du Pont de Nemours and Company). A range of from about 0.05% by weight to about 5.0% by weight of surfactant in the release coating is contemplated. The amount of surfactant required to provide adequate wetting can vary depending on the film being coated on the band. Other products may require higher concentrations to improve release properties. Hard surface spreading wetting will be more efficient with higher surfactant concentrations until the surfactant solution reaches the critical micelle concentration (CMC). This concentration represents a threshold beyond which additional surfactant will not produce any further efficiency in spreading wetting. However, increasing the concentration beyond the CMC may improve wetting by the polymer solution and improve the release properties of some film formulations.

The release coating can be applied to the surface of a substrate and optionally subsequently dried prior to casting a polymer resin or polymer resin solution onto the surface coated substrate. In embodiments, the release coating can have a pH of about 1 to about 5 when applied to the surface of the substrate, prior to drying the release coating on the surface of the substrate. In embodiments wherein the surfactant comprises a non-fluorinated anionic surfactant, a non-fluorinated zwitterionic surfactant, salts thereof, and a combination thereof, the release coating can have a pH of about 1 to about 8 or a pH of about 1 to about 5 when applied to the surface of the substrate, prior to drying the release coating on the surface of the substrate. For example, the release coating, when applied to the surface of the substrate, can have a pH of about 1, about 1.5, about 2, about 2.5, about 3, about 3.5, about 4, about 5, about 6, about 7, or about 8. In embodiments, the release coating can have a pH of about 1 to about 7, or about 1 to about 6, or about 1 to about 4, or about 1 to about 3, or about 2 to about 7, or about 2 to about 6, or about 2 to about 5, or about 2 to about 4, or about 2 to about 3, or about 3 to about 7, or about 3 to about 5, or about 1.5 to about 3.5, or about 4 to about 7 when applied to the surface of the substrate, prior to drying the release coating on the surface of the substrate.

In general, the release coating can have a surfactant concentration in a range of about 0.001 wt % to about 100 wt %, based on the total weight of the release coating. In embodiments, the release coating can have a surfactant concentration in a range of about 0.001 wt % to about 20 wt % prior to drying the release coating on the surface of the substrate. For example, the release coating can have a surfactant concentration in a range of about 0.001 wt % to about 10 wt %, or about 0.01 wt % to about 5 wt %, or about 0.01 wt % to about 4 wt %, or about 0.01 wt % to about 3 wt %, or about 0.01 wt % to about 2 wt %, or about 0.05 wt % to about 2 wt %, or about 0.1 wt % to about 2 wt %, or about 0.5 wt % to about 2 wt %, prior to drying the release coating on the surface of the substrate. In embodiments, the release coating can have a surfactant concentration in a range of about 0.01 wt % to about 4.00 wt %, based on the total weight of the release coating prior to drying the release coating on the surface of the substrate. In embodiments, the release coating can have a surfactant concentration in a range of about 0.05 wt % to about 2.00 wt %, based on the total weight of the release coating prior to drying the release coating on the surface of the substrate. In embodiments, the release coating can have a surfactant concentration in a range of about 2.5 wt % to about 100 wt %, based on the total weight of the release coating, after drying the release coating on the surface of the substrate. For example, after drying the release coating on the surface of the substrate, the release coating can have a surfactant concentration in a range of about 3 wt % to about 100 wt %, or about 4 wt % to about 90 wt %, or about 4 wt % to about 80 wt %, or about 4 wt % to about 70 wt %, or about 4 wt % to about 50 wt %, or about 4 wt % to about 30 wt %, or about 4 wt % to about 20 wt %, or about 4.7 wt % to about 100 wt %, or about 5 wt % to about 90 wt %, based on the total weight of the release coating. In embodiments, the release coating can have a surfactant concentration in a range of about 4.7 wt % to about 100 wt %, based on the total weight of the release coating, after drying the release coating on the surface of the substrate. For example, the release coating can include an amount of ZONYL surfactant in a range of about 0.05% by weight to about 5.0% by weight, based on the total weight of the release coating.

In general, the release coating as described herein can have a hydrophilic-lipophilic balance in a range of about 1 to about 30. In embodiments, the release coating can have a hydrophilic-lipophilic balance in a range of about 1 to about 20, or about 1 to about 18, or about 1 to about 17, or about 1 to about 16, or about 1 to about 15, or about 2 to about 17, or about 3 to about 17, or about 4 to about 15, or about 5 to about 12, or about 8 to about 12. In embodiments, the release coating can have a hydrophilic-lipophilic balance in a range of about 1 to about 20. In embodiments, the release coating can have a hydrophilic-lipophilic balance in a range of about 3 to about 17.

In general, the release coating has a thickness of about 0.1 nm to about 100 nm on the surface of the substrate. In embodiments, the release coating has a thickness of about 0.1 nm to about 80 nm, or about 0.1 nm to about 60 nm, or about 0.1 nm to about 40 nm, or about 0.1 nm to about 40 nm, or about 0.1 nm to about 20 nm, or about 0.1 nm to about 10 nm, or about 1 nm to about 10 nm, or about 1 nm to about 5 nm, on the surface of the substrate. In embodiments, the release coating has a thickness of about 0.1 nm to about 40 nm on the surface of the substrate. In embodiments, the release coating has a thickness of about 0.1 nm to about 10 nm on the surface of the substrate.

Methods of making a water-soluble unit dose article, such as a pouch or a packet will now be described in more detail. In one aspect, a method can include optionally deforming a first water-soluble film as described herein (e.g. thermoforming the film in a mould) to create an open cavity, filling the open cavity with a composition (e.g., a detergent composition), closing the open filled cavity with a second water-soluble film as described herein, and solvent sealing the second water-soluble film to the first water-soluble film to create a water-soluble unit dose article.

The unit dose articles, such as pouches and packets, may be made using any suitable equipment. For example, single compartment pouches may be made using vertical form filling, horizontal form filling, or rotary drum filling techniques commonly known in the art. Such processes may be either continuous or intermittent. Thus, the mould can be in any desired orientation with respect to the film; however, in one convenient type of embodiment the mould is below the film, to readily facilitate gravity filling of contents into a deformed film. The film may be dampened, and/or heated to increase the malleability thereof. The water-soluble films may be pre-heated ahead of deformation via a hot plate, an infra-red lamp, or a combination thereof, and use of an infra-red lamp is particularly contemplated. The method can also involve the use of a vacuum, e.g. to draw the film into a suitable mould. The vacuum, e.g. for drawing a film into a mould, can be applied for any suitable time, e.g. about 0.2 to about 5 seconds, or about 0.3 to about 3, or about 0.5 to about 1.5 seconds, e.g. once the film is on the mould surface. This vacuum can be such that it provides an under-pressure in a range of 10 mbar to 1000 mbar, or in a range of 100 mbar to 600 mbar, for example.

The process for making the water-soluble unit dose articles can include automated manufacturing process equipment and steps, e.g. a conveyer belt, a series of conveyer belts, a drum, a series of drums or a combination thereof. The process for making the water-soluble unit dose articles can include or consist of manual manufacturing steps, in which the one or more sequences or steps described herein are conducted manually. Optionally, the process can include both manual and automated steps. A fully automated process is also contemplated.

The process of making the water-soluble unit dose articles, or portions of the process, can be performed as a continuous process. Alternatively, the process of making the water-soluble unit dose articles, or portions of the process, can be an intermittent or batch process. A process of making the water-soluble unit dose articles in a continuous or substantially continuous process is contemplated.

The moulds, in which the articles may be made, can have any shape, length, width and depth, depending on the required dimensions of the pouches. The moulds may also vary in size and shape from one to another, if desirable. For example, the volume of the final unit dose articles can be about 5 ml to about 300 ml, or about 10 ml to 150 ml, or about 20 ml to about 100 ml, and that the mould sizes are adjusted accordingly.

Thermoforming

The deforming of a film can include thermoforming, e.g. thermoforming the first water-soluble film in a mould to create an open cavity. A thermoformable film is one that can be shaped through the application of heat and a force. Thermoforming a film is the process of heating the film, shaping it (e.g., in a mould), and then allowing the film to cool, whereupon the film will hold its shape, e.g. the shape of the mould. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In embodiments, the film can be heated using an infrared light. The film may be heated to a temperature in a range of about 50° C. to about 150° C., about 50° C. to about 120° C., about 60° C. to about 130° C., about 70° C. to about 120° C., or about 60° C. to about 90° C. Thermoforming can be performed by any one or more of the following steps and processes: the manual draping of a thermally softened film over a mould, or the pressure induced shaping of a softened film to a mould (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be dampened wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film surface, e.g. as described further herein. For example the film can be wetted by a contact transfer method in which a wetted absorbent member is applied to the film surface.

Once a film has been heated and/or wetted, it can be drawn into an appropriate mould, optionally using a vacuum. The filling of the moulded film can be accomplished by utilizing any suitable means. In embodiments, the choice of method can be guided by the product form and required speed of filling. In embodiments, the moulded film can be filled by in-line filling techniques. The filled, open packets are then closed, forming the pouches, using the second film, by any suitable method. This may be accomplished while in horizontal position and in continuous, constant motion, for example. A plurality of packets can be made simultaneously, e.g. using a mould that has a plurality of cavities. The closing may be accomplished by continuously feeding the second water-soluble film, over and onto the open, filled packets and then sealing the first and second film together, typically in the area between the mould cavities and thus between the packets.

Sealing the Water-Soluble Unit Dose Articles

The first water-soluble film and the second water-soluble film can be sealed via any suitable method, e.g. solvent sealing, heat sealing or a mixture thereof, for example via solvent sealing. The solvent sealing solution optionally comprises an aqueous solvent, a non-aqueous solvent or a mixture thereof. In embodiments, the solvent sealing solution can comprise water. The solvent sealing solution optionally comprises at least 95%, or even at least 98%, or even at least 99%, or even 100% by weight of the solvent sealing solution of water. The solvent sealing solution can be applied by any suitable method, including contact and/or non-contact methods. For example, the solvent solution can be applied in a contact transfer process, e.g. using a contact member comprising a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. In another type of embodiment the sealing solution can be applied using a contact member comprising an absorbent material, for example natural felt, synthetic felt, porous plastic, foam, sponge, microfiber, cotton, polyester, extruded polyester fibers, nonwoven webs and the like, e.g. in pad or roller form. Application of solvent sealing solution via a felt roll is particularly contemplated. As another option, the sealing solution can be applied via a dosing nozzle or a spraying nozzle. Combinations of any of the foregoing methods and apparatus are contemplated. In one type of embodiment, a contact transfer method using an absorbent material is contemplated. The solvent sealing solution can be applied to the second water-soluble film, for sealing it to a first water soluble film or a third water soluble film. For example, the solvent sealing solution can be applied to the second side of the second water-soluble film, the second side of the second water soluble film facing the first side of the first water-soluble film. In one type of embodiment, the solvent sealing solution is applied on the water-soluble film in an amount in a range of about 1 g to about 30 g of sealing solution per square meter of film, or in a range of about 5 g to about 20 g of sealing solution per square meter of film.

As mentioned above, one type of method include solvent sealing to form the water-soluble unit dose article. Typically, only the area which is to form the seal is treated with solvent. The solvent can be applied on either film, and in one type of embodiment is applied on the closing film, and typically only on the areas which are to form the seal. In embodiments, it may be preferred that heat is also applied. Preferred solvent sealing methods include selectively applying solvent onto the area between the mould cavities, or on the closing film, by for example, spraying, printing, or contact application onto these areas, and then applying pressure onto these areas, to form the seal. Sealing rolls and belts (optionally also providing heat) can be used, for example, to apply pressure.

In embodiments, the first water-soluble film is sealed to the second water-soluble film by solvent sealing. In embodiments, the sealing solution comprises water and further can include one or more diols and/or glycols such as 1,2-ethanediol (ethylene glycol), 1,3-propanediol, 1,2-propanediol, 1,4-butanediol (tetramethylene glycol), 1,5-pentanediol (pentamethylene glycol), 1,6-hexanediol (hexamethylene glycol), 2,3-butanediol, 1,3-butanediol, 2-methyl-1,3-propanediol, various polyethylene glycols (e.g., diethylene glycol, triethylene glycol), and combinations thereof. In embodiments, the sealing solution comprises erythritol, threitol, arabitol, xylitol, ribitol, mannitol, sorbitol, galactitol, fucitol, iditol, inositol, volemitol, isomalt, maltitol, lactitol.

The sealing solution can be applied to the interfacial areas of the first water-soluble film in any amount suitable to adhere the first and the second water-soluble films. As used herein, the term "coat weight" refers to the amount of sealing solution applied to the film in grams of solution per square meter of film. In general, when the coat weight of the sealing solvent is too low, the films do not adequately adhere and the risk of pouch failure at the seams increases. Further, when the coat weight of the sealing solvent is too high, the risk of the solvent migrating from the interfacial areas increases, increasing the likelihood that etch holes may form in the sides of the pouches. The coat weight window refers to the range of coat weights that can be applied to a given film while maintaining both good adhesion and avoiding the formation of etch holes. A broad coat weight window is desirable as a broader window provides robust sealing under a broad range of operations. Suitable coat weight windows include amounts of at least about 3 g/m$^2$, or at least about 4 g/m$^2$, or at least about 5 g/m$^2$, or at least about 6 g/m$^2$.

Cutting the Water-Soluble Unit Dose Articles

The unit dose articles, e.g., pouches, may be cut by a cutting device. Cutting can be accomplished using any known method. It may be preferred that the cutting is also done in continuous manner, and preferably with constant line speed and preferably while in horizontal position. The cutting device can, for example, be a sharp item, or a hot item, or a laser, whereby in the latter cases, the hot item or laser 'burns' through the film/sealing area. The cutting can be performed by one or more rotating knives.

Forming and Filling Multi-Compartment Pouches

The different compartments of a multi-compartment pouches may be made together in a side-by-side style or concentric style wherein the resulting, cojoined pouches may or may not be separated by cutting. Alternatively, the compartments can be made separately.

In embodiments, unit dose articles may be made according to a process comprising the steps of (a) forming a first compartment (as described above); (b) forming a recess within part or all of the closed compartment formed in step (a), to generate a second moulded compartment superposed above the first compartment; (c) filling and closing the second compartment by means of a third film; (d) sealing the first, second and third films; and (e) cutting the films to produce a multi-compartment pouch. The recess formed in step (b) may be achieved by applying a vacuum to the compartment prepared in step (a).

In embodiments, second, and/or third compartment(s) can be made in a separate step and then combined with the first compartment, for example as described in European Patent Application Number 08101442.5 or U.S. Patent Application Publication No. 2013/240388 A1 or U.S. Pat. No. 7,964,549 B2, the disclosures of which are hereby incorporated herein by reference.

Unit dose articles can be made according to a process comprising the steps of: (a) deforming a first water-soluble film as described herein in a mould to create an open cavity, the first water soluble film comprising a first polyvinyl alcohol resin; (b) filling the open cavity formed by the first water-soluble film with a composition; (c) closing the open filled cavity from step (b) with a second water-soluble film as described herein, e.g. the second water soluble film comprising a second polyvinyl alcohol resin wherein the second polyvinyl alcohol resin comprises; (1) less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof; and (2) 85% about 100% by weight of the second polyvinyl alcohol resin of a polyvinyl alcohol homopolymer or a homopolymer blend, wherein the homopolymers consist of vinyl alcohol monomer units and optionally vinyl acetate monomer units; and wherein the second polyvinyl alcohol resin has an average 4% solution viscosity in deionized water at 20° C. in a range of 8 mPa·s to less than 12 mPa·s; (d) sealing the second water-soluble film to the first water-soluble film, optionally via solvent sealing, to create the water-soluble unit dose article.

Another method of pouch production can include: (a) deforming a first water-soluble film as described herein in a mould to create an open cavity; (b) filling the open cavity formed by the first water-soluble film with a composition; (c) separately deforming a third water-soluble film as described herein in a mould to create at least one open cavity; (d) filling the at least one open cavity in the third film with a composition (e.g., that is the same or different from the composition of step (b)); (e) closing the open filled cavity or cavities of step (d) with a second water-soluble film as described herein; (f) sealing the second water-soluble film and third water-soluble film, optionally via solvent sealing, to create a closed intermediate; (g) closing the open filled cavity of step (b) with the closed intermediate of step (f); and (h) sealing the first water-soluble film and the second water-soluble film of the closed intermediate of step (g), optionally via solvent sealing, to create the water-soluble unit dose article. Use of this method can provide, for example, a unit-dose article having compartments of compositions that are superposed, e.g. one or more compartments superposed with respect to another compartment. In embodiments, any one of the sealing steps can comprise solvent sealing, and in one type of embodiment at least one of the sealing steps includes solvent sealing. In embodiments, each of the first and the second water-soluble film has a first side and a second side, and the first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment. In embodiments, the first water-soluble film and the third water-soluble film can be identical prior to thermoforming, i.e. physically and chemically identical, wherein the term 'identical' means within standard processing of making specification variations. Optionally, the sealing of the first water soluble film and the second water soluble film can include a step of wetting the second water soluble film with a sealing solution as described herein, e.g. via a contact wetting method. In addition or in the alternative, the sealing of the second water soluble film and the third water soluble film optionally can include a step of wetting the second water soluble film with a sealing solution as described herein, e.g. via a contact wetting method.

The methods can further include forming at least a third compartment, optionally at least a third and a fourth compartment, between the second water-soluble film and the third water-soluble film. The second compartment and the third compartment, e.g. the second compartment, the third compartment and the fourth compartments, optionally can be positioned side-by-side to one another and wherein the second compartment and the third compartment, e.g. the second compartment, the third compartment and the fourth compartment optionally can be positioned above the first compartment. Optionally, the sealing of the second water soluble film and the third water soluble film can include a step of wetting the second water soluble film with a sealing solution as described herein, e.g. via a contact wetting method.

Unit dose articles can be made according to a process comprising the steps of: (a) forming a first compartment, optionally using heat and/or vacuum, using a first film as described herein on a first forming machine; (b) filling the first compartment with a first composition; (c) on a second forming machine, deforming a third film as described herein, optionally using heat and vacuum, to make a second and optionally third moulded compartment; (d) filling the second and optionally third compartments; (e) sealing the second and optionally third compartment using a second film as described herein; (f) placing the sealed second and optionally third compartments onto the first compartment; (g) sealing the first, second and optionally third compartments by sealing the first film to the second film; and (h) cutting the films to produce a multi-compartment pouch. Optionally, the sealing of the first water soluble film and the second water soluble film can include a step of wetting the second water soluble film with a sealing solution as described herein, e.g. via a contact wetting method. In addition or in the alternative, the sealing of the second water soluble film and the third water soluble film optionally can include a step of wetting the second water soluble film with a sealing solution as described herein, e.g. via a contact wetting method.

The first and second forming machines may be selected based on their suitability to perform the above process. The first and second forming machines can be horizontal forming machines and/or rotary drum forming machines, for example. In embodiments, the first forming machine can be a horizontal forming machine, and the second forming machine can be a rotary drum forming machine, e.g. located above the first forming machine.

The closed intermediate can be made on a rotating drum, or on a horizontal belt, for example, and a rotating drum is particularly contemplated. The filled open cavity in steps (a) and (b) can be made on a horizontal belt or a rotating drum, and a horizontal belt is particularly contemplated. Wherein a rotating drum is used, the water-soluble film is preferably maintained in place via vacuum. Wherein a horizontal belt is used, the water-soluble film is preferably maintained in place via vacuum.

Multiple unit dose articles can be formed in such a manner that they are connected to one another by flat areas. Without wishing to be bound by theory, such a process involves making a plurality of water-soluble unit dose articles joined together by non-deformed film to create a water-soluble web of unit dose articles. The non-deformed films are the flat areas of the water-soluble web between the unit dose articles. Therefore, the flat areas may comprise two or more water-soluble films sealed together as described herein. Thus, a step of deforming a film as described herein would be understood by the skilled artisan to include a process of deforming a portion of a film article while leaving one or more other portions non-deformed.

The resultant web of water-soluble unit dose articles connected via flat areas is can be transferred to a cutting station and cut to produce individual unit dose articles. In one type of embodiment, the cutting station cuts the flat areas in the web in a machine direction and cross-machine direction. Cutting can be achieved using rotating knives.

It should be understood that by the use of appropriate feed stations, it may be possible to manufacture multi-compartment pouches incorporating a number of different or distinctive compositions and/or different or distinctive forms of compositions, e.g. solid (powder, granule, tablet, or other), liquid, gel, or paste compositions.

The film and/or the pouch can be sprayed or dusted with a suitable material, such as an active agent, a lubricant, an aversive agent, or mixtures thereof. The film and/or the pouch can be printed upon, for example, with an ink and/or an active agent.

Vertical Form, Fill and Seal

In embodiments, the sealed unit dose article can include a vertical form, filled, and sealed article. The vertical form, fill, and seal (VFFS) process is a conventional automated process. VFFS includes an apparatus such as an assembly machine that wraps a single piece of the film around a vertically oriented feed tube. The machine heat seals or otherwise secures the opposing edges of the film together to create the side seal and form a hollow tube of film. Subsequently, the machine heat seals or otherwise creates the bottom seal, thereby defining a container portion with an open top where the top seal will later be formed. The machine introduces a specified amount of flowable product into the container portion through the open top end. Once the container includes the desired amount of product, the machine advances the film to another heat sealing device, for example, to create the top seal. Finally, the machine advances the film to a cutter that cuts the film immediately above the top seal to provide a filled package.

During operation, the assembly machine advances the film from a roll to form the package. Accordingly, the film must be able to readily advance through the machine and not adhere to the machine assembly or be so brittle as to break during processing. Such a formed package can be joined with another film and/or package to make a unit dose article as described herein. For example, the VFFS-produced package can be made from a first film as described herein, and joined with one or more additional filled cavities made as described above from a second film as described herein and a third film as described herein. As another example, the VFFS-produced package can be made from a second film as described herein, and joined with one or more additional filled cavities made as described above from a first film as described herein or a third film as described herein. The other permutations of combinations of forming and filling the first, second, and third films described herein are also contemplated.

Compositions

Household Care Compositions

In embodiments, the water-soluble unit dose article can comprise a household care composition.

The household care composition is preferably selected from the group consisting of light duty liquid detergent compositions, heavy duty liquid detergent compositions, hard surface cleaning compositions, laundry detergent gels, bleaching compositions, laundry additives, fabric enhancer compositions, shampoos, body washes, other personal care compositions, and mixtures thereof, preferably a liquid laundry detergent composition.

In another aspect, the composition can be selected from the group of laundry and automatic dishwashing compositions, including liquid laundry detergent compositions.

In another aspect, the household care composition can be selected from non-laundry and non-automatic dishwashing compositions, e.g. selected from the group consisting of light duty liquid detergent compositions, heavy duty liquid detergent compositions, hard surface cleaning compositions, bleaching compositions, shampoos, body washes, other personal care compositions, and other compositions which are non-laundry and non-automatic dishwashing compositions, or mixtures of any of the foregoing.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

The liquid detergent composition can be used in a fabric hand wash operation or may be used in an automatic machine fabric wash operation.

Preferably, the liquid laundry detergent composition comprises from 15% to 55% by weight of the laundry detergent composition of a non-soap anionic surfactant. Preferably, the detergent composition comprises between 20% and 55%, more preferably between 25% and 50% of a non-soap anionic surfactant.

Preferably, the non-soap anionic surfactant comprises linear alkylbenzene sulphonate. Preferably, the linear alkylbenzene sulphonate comprises $C_{10}$-$C_{16}$ alkyl benzene sulfonate, $C_{11}$-$C_{14}$ alkyl benzene sulphonate or a mixture thereof. Preferably, the alkylbenzene sulphonate is an amine neutralized alkylbenzene sulphonate, an alkali metal neutralized alkylbenzene sulphonate or a mixture thereof. The amine is preferably selected from monoethanolamine, triethanolamine or mixtures thereof. The alkali metal is preferably selected from sodium, potassium, magnesium or a mixture thereof. Preferably, the liquid laundry detergent composition comprises between 1% and 40%, preferably between 3% and 40%, more preferably between 6% and 35% by weight of the liquid laundry detergent composition of the linear alkylbenzene sulphonate.

Preferably, the non-soap anionic surfactant comprises an alkyl sulphate anionic surfactant wherein the alkyl sulphate anionic surfactant is selected from alkyl sulphate, an alkoxylated alkyl sulphate or a mixture thereof. The alkyl sulphate anionic surfactant may be a primary or a secondary alkyl sulphate anionic surfactant, or a mixture thereof, preferably a primary alkyl sulphate anionic surfactant. Preferably, the alkoxylated alkyl sulphate comprises ethoxylated alkyl sulphate, propoxylated alkyl sulphate, a mixed ethoxylated/propoxylated alkyl sulphate, or a mixture thereof, more preferably an ethoxylated alkyl sulphate. Preferably, the ethoxylated alkyl sulphate has an average degree of ethoxylation of between 0.1 to 5, preferably between 0.5 and 3. Preferably, the ethoxylated alkyl sulphate has an average alkyl chain length of between 8 and 18, more preferably between 10 and 16, most preferably between 12 and 15. Preferably, the alkyl chain of the alkyl sulphate anionic surfactant is linear, branched or a mixture thereof. Preferably, the branched alkyl sulphate anionic surfactant is a branched primary alkyl sulphate, a branched secondary alkyl sulphate, or a mixture thereof, preferably a branched primary alkyl sulphate, wherein the branching preferably is in the 2-position, or alternatively might be present further down the alkyl chain, or could be multi-branched with branches spread over the alkyl chain. The weight average degree of branching of alkyl sulphate anionic surfactant may be from 0% to 100% preferably from 0% to 95%, more preferably from 0% to 60%, most preferably from 0% to 20%. Alternatively, the weight average degree of branching of alkyl sulphate anionic surfactant may be from 70% to 100%, preferably from 80% to 90%. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, Fischer-Tropsch-synthesized material, iso-alkyl synthesized material, or mixtures thereof, preferably oxo-synthesized material. Preferably, the liquid laundry detergent composition comprises between 1% and 35%, preferably between 3% and 30%, more preferably between 6% and 20% by weight of the liquid laundry detergent composition of the alkyl sulphate anionic surfactant.

Preferably, the non-soap anionic surfactant comprises linear alkyl benzene sulphonate and an alkoxylated alkyl sulphate, more preferably, wherein the weight ratio of linear alkylbenzene sulphonate to alkoxylated alkyl sulphate is from 1:2 to 9:1, preferably from 1:1 to 7:1, more preferably from 1:1 to 5:1, most preferably from 1:1 to 4:1.

The liquid laundry detergent composition comprises from 2.5% to 30% by weight of the liquid laundry detergent composition of a non-ionic surfactant. The non-ionic surfactant is described in more detail below.

Preferably, the weight ratio of non-soap anionic surfactant to non-ionic surfactant is from 1:1 to 13:1, preferably from 1.25:1 to 10:1, more preferably from 1.5:1 to 7.5:1.

Preferably, the liquid laundry detergent composition comprises a non-ionic surfactant. Preferably, the non-ionic surfactant comprises an alkoxylated alcohol, wherein the alkoxylated alcohol is derived from a synthetic alcohol, a natural alcohol or a mixture thereof. The alkoxylated alcohol can be a primary alkoxylated alcohol, a secondary alkoxylated alcohol, or a mixture thereof, preferably a primary alkoxylated alcohol. Preferably, the alkoxylated alcohol comprises ethoxylated alcohol, propoxylated alcohol, a mixed ethoxylated/propoxylated alcohol, or a mixture thereof, more preferably an ethoxylated alcohol. Alternatively, the alkoxylated alcohol might also include higher alkoxy groups such as butoxy groups. When mixed alkoxy groups, the alkoxy groups can be randomly ordered or present in blocks, preferably are present in blocks. For example, mixed ethoxy (EO)/propoxy (PO) groups might be ordered in EO/PO blocks, PO/EO blocks, EO/PO/EO blocks or PO/EO/PO blocks. Preferably, the ethoxylated alcohol has an average degree of ethoxylation of between 0.1 to 20, preferably between 5 and 15, most preferably between 6 and 10. If propoxylation is present, preferably the average degree of propoxylation is between 0.1 to 25, more preferably between 2 and 20, most preferably between 5 and 10. Preferably, the alkoxylated preferably ethoxylated alcohol has an average alkyl chain length of between 8 and 18, more preferably between 10 and 16, most preferably 12 and 15. Preferably, the alkyl chain of the alkoxylated alcohol is linear, branched or a mixture thereof, wherein the branched alkyoxylated alcohol is a branched primary alkoxylated alcohol, a branched secondary alkoxylated alcohol, or a mixture thereof, preferably a branched primary alkoxylated alcohol. Preferably, the weight average degree of branching of the alkoxylated alcohol is from 0% to 100% preferably from 0% to 95%, more preferably 0% to 60%, most preferably from 0% to 20%. The branching can be on the 2-alkyl position, or alternatively further down the alkyl chain, or can be multi-branched with individual branches spread over the alkyl chain. Preferably, the synthetically derived material comprises oxo-synthesized material, Ziegler-synthesized material, Guerbet-synthesized material, Fischer-Tropsch-synthesized material, iso-alkyl branched materials, or mixtures thereof, preferably oxo-synthesised material. Preferably, the liquid laundry detergent composition comprises between 0.5% and 20%, preferably between 1% and 15%, more preferably between 3% and 12% by weight of the liquid laundry detergent composition of the non-ionic surfactant, preferably wherein the nonionic surfactant consists of the alkoxylated alcohol. Without wishing to be bound by theory, non-ionic surfactants, especially alkoxylated alcohol non-ionic surfactants provide the benefit of excellent body soil cleaning and soil suspension.

Preferably, the weight ratio of non-soap anionic surfactant to nonionic is from 1:1 to 20:1, from 1.5:1 to 17.5:1, from 2:1 to 15:1, or from 2.5:1 to 13:1.

Preferably, the liquid laundry detergent composition comprises a fatty acid, preferably a neutralized fatty acid soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine. The liquid detergent composition may comprise between 1.5% and 20%, between 2% and 15%, between 3% and 12%, or between 4% and 10% by weight of the liquid detergent composition of fatty acid.

Preferably, the liquid laundry detergent composition comprises between 1% and 20%, preferably between 5% and 15% by weight of the liquid laundry detergent composition of water.

Preferably, the liquid laundry detergent composition comprises between 10% and 40%, preferably between 15% and 30% by weight of the liquid laundry detergent composition of a non-aqueous solvent, preferably wherein the non-aqueous solvent is selected from 1,2-propanediol, dipropylene glycol, tripropyleneglycol, glycerol, sorbitol, polyethylene glycol or a mixture thereof.

Preferably, the liquid laundry detergent composition comprises an adjunct ingredient selected from the group comprising builders, perfumes, enzymes, citrate, bleach, bleach catalyst, dye, hueing dye, brightener, cleaning polymers including alkoxylated polyamines and polyethyleneimines, soil release polymer, fabric care polymers including cationic hydroxyethyl celluloses and cationic polyglucans, surfactant, solvent, dye transfer inhibitors, chelant, encapsulated perfume, polycarboxylates, structurant, pH trimming agents, anti-oxidants including Ralox 35, and mixtures thereof.

Preferably, the laundry detergent composition comprises a further enzyme selected from the group comprising hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, xyloglucanases, mannanases and amylases, nuclease or mixtures thereof, preferably a further enzyme selected from the group comprising proteases, amylase, cellulase, lipases, xyloglucanases, mannanases, and mixtures thereof. Preferably the further enzyme is a lipase.

The term lipase as used herein, includes enzymes which catalyze the hydrolysis of fats (lipids). Lipases are a sub class of esterases. Lipases suitable in the present invention include phospholipases, acyltransferases or perhydrolases e.g. acyltransferases with homology to *Candida antarctica* lipase A, acyltransferase from *Mycobacterium smegmatis*, perhydrolases from the CE 7 family, and variants of the *M. smegmatis* perhydrolase in particular the S54V variant used in the commercial product Gentle Power Bleach from Huntsman Textile Effects Pte Ltd. Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*), cutinase from *Humicola*, e.g. *H. insolens*, lipase from strains of *Pseudomonas* (some of these now renamed to *Burkholderia*), e.g. *P. alcaligenes* or *P. pseudoalcaligenes*, *P. cepacia*, *P.* sp. strain SD705, *P. wisconsinensis*, GDSL-type *Streptomyces* lipases, cutinase from *Magnaporthe grisea*, cutinase from *Pseudomonas mendocina*, lipase from *Thermobifida fusca*, *Geobacillus stearothermophilus* lipase, lipase from *Bacillus subtilis*, and lipase from *Streptomyces griseus* and *S. pristinaespiralis*. Typically, the lipase enzyme is present in the composition in an amount from 0.001% to 0.03%, preferably from 0.0025% to 0.025% and more preferably from 0.005% to 0.02% by weight of the composition of enzyme active protein. Without wishing to be bound by theory, enzymes are supplied as a preparation comprising the enzyme and other ingredients. Enzymes per se are proteins that catalyse reactions. By enzyme active protein we herein mean enzyme that can actively catalyse the relevant reaction.

Preferably, the liquid laundry detergent composition has a pH between 6 and 10, more preferably between 6.5 and 8.9, most preferably between 7 and 8, wherein the pH of the laundry detergent composition is measured as a 10% product concentration in deionized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition.

Automatic Dishwashing Detergent Composition:

The treatment composition may be an automatic dishwashing detergent composition comprising an ingredient selected from surfactant, builder, sulfonated/carboxylated polymer, silicone suds suppressor, silicate, metal and/or glass care agent, enzyme, bleach, bleach activator, bleach catalyst, source of alkalinity, perfume, dye, solvent, filler and mixtures thereof.

A preferred surfactant for use in automatic dishwashing detergents is low foaming by itself or in combination with other components (e.g. suds suppressors). Preferred for use herein are low and high cloud point nonionic surfactants and mixtures thereof including nonionic alkoxylated surfactants (especially ethoxylates derived from C6-C18 primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B, ether-capped poly(oxyalkylated)

alcohol surfactants, and block polyoxyethylene-polyoxypropylene polymeric compounds such as PLURONIC®, REVERSED PLURONIC®, and TETRONIC® series by the BASF-Wyandotte Corp., Wyandotte, Mich.; amphoteric surfactants such as the C12-C20 alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants can be present at a level of from 0.2% to 30% by weight, more preferably from 0.5% to 10% by weight, most preferably from 1% to 5% by weight of a detergent composition.

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases including CAREZYME® and CELLUZYME® (Novo Nordisk A/S); peroxidases; lipases including AMANO-P® (Amano Pharmaceutical Co.), M1 LIPASE® and LIPOMAX® (Gist-Brocades) and LIPOLASE® and LIPOLASE ULTRA® (Novo); cutinases; proteases including ESPERASE®, ALCALASE®, DURAZYM® and SAVINASE® (Novo) and MAXATASE®, MAXACAL®, PROPERASE® and MAXAPEM® (Gist-Brocades); □□and □□amylases including PURAFECT® OX AM (Genencor) and TERMAMYL®, BAN®, FUNGAMYL®, DURAMYL®, and NATALASE® (Novo); pectinases; and mixtures thereof. Enzymes can be added herein as prills, granulates, or cogranulates at levels typically in the range from 0.0001% to 2% pure enzyme by weight of the cleaning composition.

Suds suppressers suitable for use in the detergent composition described herein include nonionic surfactants having a low cloud point. "Cloud point" as used herein, is a well-known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT® SLF18) and epoxy-capped poly(oxyalkylated) alcohols (e.g., BASF POLY-TERGENT® SLF18B series of nonionics.

Other suitable components for use in the detergent composition described herein include cleaning polymers having anti-redeposition, soil release or other detergency properties. Anti-redeposition polymers for use herein include acrylic acid containing polymers such as SOKALAN® PA30, PA20, PA15, PA10 and SOKALAN® CP10 (BASF GmbH), ACUSOL® 45N, 480N, 460N (Rohm and Haas), acrylic acid/maleic acid copolymers such as SOKALAN® CP5, and acrylic/methacrylic copolymers. Other suitable polymers include amine-based polymers such as alkoxylated polyalkyleneimines (e.g., PE1600 EO20 and/or ethoxysulfated hexamethylene diamine dimethyl quats), which, optionally, may be quaternized. Soil release polymers for use herein include alkyl and hydroxyalkyl celluloses, polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG® 70 sold by Wintershall, Salzbergen, Germany), nitrogen-containing corrosion inhibitor compounds (for example benzotriazole and benzimadazole and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process.

Non-Household Care Compositions

The composition for inclusion in the unit dose article can be a non-household care composition. For example, a non-household care composition can be selected from agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, including cleaning and detergent compositions applicable to any such use.

In one type of embodiment, the composition can include an agrochemical, e.g. one or more insecticides, fungicides, herbicides, pesticides, miticides, repellants, attractants, defoliaments, plant growth regulators, fertilizers, bactericides, micronutrients, and trace elements. Suitable agrochemicals and secondary agents are described in U.S. Pat. Nos. 6,204,223 and 4,681,228 and EP 0989803 A1. For example, suitable herbicides include paraquat salts (for example paraquat dichloride or paraquat bis(methylsulphate), diquat salts (for example diquat dibromide or diquat alginate), and glyphosate or a salt or ester thereof (such as glyphosate isopropylammonium, glyphosate sesquisodium or glyphosate trimesium, also known as sulfosate). Incompatible pairs of crop protection chemicals can be used in separate chambers, for example as described in U.S. Pat. No. 5,558,228. Incompatible pairs of crop protection chemicals that can be used include, for example, bensulfuron methyl and molinate; 2,4-D and thifensulfuron methyl; 2,4-D and methyl 2-[[[[N-4-methoxy-6-methyl-1,3,5-triazine-2-yl)-N-methylamino]carbonyl]amino]-sulfonyl]benzoate; 2,4-D and metsulfuron methyl; maneb or mancozeb and benomyl; glyphosate and metsulfuron methyl; tralomethrin and any organophosphate such as monocrotophos or dimethoate; bromoxynil and N-[[4,6-dimethoxypyrimidine-2-yl)-amino] carbonyl]-3-(ethylsulfonyl)-2-pyridine-sulfonamide; bromoxynil and methyl 2-[[[[(4-methyl-6-methoxy)-1,3,5-triazin-2-yl)amino]carbonyl]amino]sulfonyl]-benzoate; bromoxynil and methyl 2-[[[[N-(4-methoxy-6-methyl-1,3,5-triazin-2-yl)-N-methylamino]carbonyl]amino]-sulfonyl]benzoate. In another, related, type of embodiment, the composition can include one or more seeds, optionally together with soil, and further optionally together with one or more additional components selected from mulch, sand, peat moss, water jelly crystals, and fertilizers, e.g. including types of embodiments described in U.S. Pat. No. 8,333,033.

In another type of embodiment, the composition is a water-treatment agent. Such agents include aggressive oxidizing chemicals, e.g. as described in U.S. Patent Application Publication No. 2014/0110301 and U.S. Pat. No. 8,728, 593. For example, sanitizing agents can include hypochlorite salts such as sodium hypochlorite, calcium hypochlorite, and lithium hypochlorite; chlorinated isocyanurates such as dichloroisocyanuric acid (also referred to as "dichlor" or dichloro-s-triazinetrione, 1,3-dichloro-1,3,5-triazinane-2,4, 6-trione) and trichloroisocyanuric acid (also referred to as "trichlor" or 1,3,5-trichloro-1,3,5-triazinane-2,4,6-trione). Salts and hydrates of the sanitizing compounds are also contemplated. For example, dichloroisocyanuric acid may be provided as sodium dichloroisocyanurate, sodium dichloroisocyanurate acid dihydrate, among others. Bromine containing sanitizing agents may also be suitable for use in unit dose packaging applications, such as 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin; and 2-bromo-2-nitro-1,3-propanediol, among others. The oxidizing agent can be one described in U.S. Pat. No. 7,476,325, e.g. potassium hydrogen peroxymonosulfate. The composition can be a pH-adjusting chemical, e.g. as described in U.S. Patent Application Publication No. 2008/0185347, and can include, for example, an acidic component and an alkaline component such that the composition is effervescent when contacted with water, and adjusts the water pH. Suitable ingredients include sodium bicarbonate, sodium bisulfate, potassium hydroxide, sulfamic acid, organic carboxylic acids, sulfonic acids, and potassium dihydrogen phosphate. A buffer blend can include boric acid, sodium carbonate, glycolic acid, and oxone monopersulfate, for example.

A water-treatment agent can be or can include a flocculant, e.g. as described in U.S. Patent Application Publication No. 2014/0124454. The flocculant can include a polymer flocculant, e.g. polyacrylamide, a polyacrylamide copolymer such as an acrylamide copolymers of diallydimethylammonium chloride (DADMAC), dimethylaminoethylacrylate (DMAEA), dimethylaminoethylmethacrylate (DMA-EM), 3-methylamidepropyltrimethylammonium chloride (MAPTAC) or acrylic acid; a cationic polyacrylamide; an anionic polyacrylamide; a neutral polyacrylamide; a polyamine; polyvinylamine; polyethylene imine; polydimethyldiallylammonium chloride; poly oxyethylene; polyvinyl alcohol; polyvinyl pyrrolidone; polyacrylic acid; polyphosphoric acid; polystyrene sulfonic acid; or any combination thereof. A flocculant can be selected from chitosan acetate, chitosan lactate, chitosan adipate, chitosan glutamate, chitosan succinate, chitosan malate, chitosan citrate, chitosan fumarate, chitosan hydrochloride, and combinations thereof. The water-treating composition can include a phosphate removing substance, e.g. one or more selected from a zirconium compound, a rare earth lanthanide salt, an aluminum compound, an iron compound, or any combination thereof.

The composition can be a limescale removing composition, e.g. citric or maleic acid or a sulphate salt thereof, or any mixture thereof, e.g. as described in U.S. Patent Application No. 2006/0172910.

Various other types of compositions are contemplated for use in the unit dose articles described herein, including particulates, for example down feathers, e.g. as described in U.S. RE29059 E; super absorbent polymers, e.g. as described in U.S. Patent Application Publication Nos. 2004/0144682 and 2006/0173430; pigments and tinters, e.g. as described in U.S. Pat. No. 3,580,390 and U.S. Patent Application Publication No. 2011/0054111; brazing flux (e.g. alkali metal fluoroaluminates, alkali metal fluorosilicates and alkali metal fluorozincates), e.g. as described in U.S. Pat. No. 8,163,104; ingestible and food items (e.g., coffee powder or dried soup) as described in U.S. Patent Application Publication No. 2007/0003719; and wound dressings, e.g. as described in U.S. Pat. No. 4,466,431.

Active Agents

In another aspect, the composition for use in the unit dose article can be characterized by an active agent therein, e.g. a personal care active agent, a beauty benefit active agent, a skin care active agent, a hair care active agent, a fabric care active agent, a dishwashing active agent, a hard surface active agent, an agricultural active agent, an ingestible active agent, a liquid treatment active agent, an industrial active agent, or a combination of any of the foregoing.

"Personal care active agent," as used herein, means an active agent that may be applied to mammalian keratinous tissue without undue undesirable effects.

"Keratinous tissue," as used herein, means keratin-containing layers disposed as the outermost protective covering of mammals and includes, but is not limited to, skin, hair, scalp and nails.

"Beauty benefit," as used herein in reference to mammalian keratinous tissue includes, but is not limited to cleansing, sebum inhibition, reducing the oily and/or shiny appearance of skin and/or hair, reducing dryness, itchiness and/or flakiness, reducing skin pore size, exfoliation, desquamation, improving the appearance of the keratinous tissue, conditioning, smoothening, deodorizing skin and/or providing antiperspirant benefits, etc.

"Beauty benefit active agent," as used herein, refers to an active agent that can deliver one or more beauty benefits.

"Skin care active agent" as used herein, means an active agent that when applied to the skin provides a benefit or improvement to the skin. It is to be understood that skin care active agents are useful not only for application to skin, but also to hair, scalp, nails and other mammalian keratinous tissue.

"Hair care active agent" as used herein, means an active agent that when applied to mammalian hair provides a benefit and/or improvement to the hair. Non-limiting examples of benefits and/or improvements to hair include softness, static control, hair repair, dandruff removal, dandruff resistance, hair coloring, shape retention, hair retention, and hair growth.

"Fabric care active agent" as used herein means an active agent that when applied to fabric provides a benefit and/or improvement to the fabric. Non-limiting examples of benefits and/or improvements to fabric include cleaning (for example by surfactants), stain removal, stain reduction, wrinkle removal, color restoration, static control, wrinkle resistance, permanent press, wear reduction, wear resistance, pill removal, pill resistance, soil removal, soil resistance (including soil release), shape retention, shrinkage reduction, softness, fragrance, anti-bacterial, anti-viral, odor resistance, and odor removal.

"Dishwashing active agent" as used herein means an active agent that when applied to dishware, glassware, pots, pans, utensils, and/or cooking sheets provides a benefit and/or improvement to the dishware, glassware, pots, pans and/or cooking sheets. Non-limiting example of benefits and/or improvements to the dishware, glassware, pots, pans, utensils, and/or cooking sheets include food and/or soil removal, cleaning (for example by surfactants) stain removal, stain reduction, grease removal, water spot removal and/or water spot prevention, shining, and polishing.

"Hard surface active agent" as used herein means an active agent when applied to floors, countertops, sinks, windows, mirrors, showers, baths, and/or toilets provides a benefit and/or improvement to the floors, countertops, sinks, windows, mirrors, showers, baths, and/or toilets. Non-limiting example of benefits and/or improvements to the floors, countertops, sinks, windows, mirrors, showers, baths, and/or toilets include food and/or soil removal, grease removal, water spot removal and/or water spot prevention, shining, and polishing.

"Agricultural active agent" as used herein means an active agent that when applied to crops and/or plants provides a benefit and/or improvement to the crops and/or plants. For example, insecticides, herbicides, fertilizers, drought resistant agents, are non-limiting examples of suitable agricultural active agents that may be present in the compositions of the present invention contained in a unit dose article.

"Ingestible active agent" as used herein means an active agent that is suitable for ingestion and/or consuming by an animal, for example a mammal, such as a human, by way of mouth, nose, eyes, ears, skin pores, rectum, vagina, or other orifice or wound (such as delivering an active agent by wound dressing) in the animal. Non-limiting examples of ingestible active agents include feminine hygiene active agents, baby care active agents, oral care active agents, medicinal active agents, vitamins, dietary active agents (for example delivered in a new food form), pet care active agents, and mixtures thereof.

"Liquid treatment active agent" as used herein means an active agent that when applied to a liquid such as water and/or alcohol, provides a benefit and/or improvement to the liquid. For example, chlorine and/or other swimming pool chemicals are non-limiting examples of suitable liquid treatment active agents. In another example, water clarifying and/or water disinfecting active agents, such as are used in commercial water filtering and/or water treatment technologies such as PUR® are non-limiting examples of suitable liquid treatment active agents that may be present in the compositions of the present invention contained in a unit dose article. Further, oil dispersants and/or oil scavenging agents are non-limiting examples of other suitable liquid treatment active agents.

"Industrial active agent" as used herein means an active agent that provides a benefit within an article of manufacture. For example, glue and/or adhesive to provide bonding between two object, insecticides incorporated into insulation, such as housing insulation, oxygen scavenging active agents incorporated into packaging for food and/or perishable goods, insect repellants incorporated into articles used by humans to repel insects, and moisture scavengers incorporated into desiccants are non-limiting examples of industrial active agents that may be present in the compositions of the present invention contained in a unit dose article.

Various aspects of the films, unit dose articles, and methods are described below using numbered paragraphs.

Aspect A

A1. A water-soluble film comprising a water-soluble mixture of:
a polyvinyl alcohol resin present in an amount of about 50 wt % to about 95 wt %, based on the total weight of the film, the polyvinyl alcohol resin comprising:
less than about 15 wt %, based on the total weight of the polyvinyl alcohol resin, of a polyvinyl alcohol copolymer comprising a carboxylated anionic monomer unit, and
about 85 wt % to about 100 wt %, based on the total weight of the polyvinyl alcohol resin, of a polyvinyl alcohol homopolymer or a polyvinyl alcohol homopolymer blend,
wherein the polyvinyl alcohol homopolymer has an 4% aqueous solution viscosity in deionized water at 20° C. of at least 8 mPa·s and less than 12 mPa·s, or about 9 mPa·s to less than 12 mPa·s, or about 10 mPa·s to less than 12 mPa·s, or the polyvinyl alcohol homopolymer blend has a weighted average 4% aqueous solution viscosity in deionized water at 20° C. of at least 8 mPa·s and less than 12 mPa·s, or about 9 mPa·s to less than 12 mPa·s, or about 10 mPa·s to less than 12 mPa·s.

A2. The water-soluble film of A1, wherein the polyvinyl alcohol resin comprises about 85 wt % to about 100 wt %, based on the total weight of the polyvinyl alcohol resin of a polyvinyl alcohol homopolymer blend.

A3. The water-soluble film of A1, wherein the polyvinyl alcohol resin comprises the polyvinyl alcohol homopolymer component, comprising a polyvinyl alcohol homopolymer or polyvinyl alcohol homopolymer blend, at a concentration in a range of about 90 wt % to about 99 wt %, or about 90 wt % to about 100 wt %, or 100 wt %, based on the polyvinyl alcohol resin, and the polyvinyl alcohol copolymer component at a concentration in a range of about 0 wt % to about 10 wt %, 1 wt % to about 10 wt %, or 0 wt %, of the polyvinyl alcohol resin.

A4. The water-soluble film of any one of A1-A3, wherein the polyvinyl alcohol homopolymer or the polyvinyl alcohol homopolymer blend has an average 4% aqueous solution viscosity in deionized water at 20° C. of at least 8 mPa·s to about 11.5 mPa·s, or at least 8.5 mPa·s to about 11.5 mPa·s, or at least 9 mPa·s to about 11.5 mPa·s, or about 10 mPa·s to about 11.5 mPa·s.

A5. The water-soluble film of any one of A1-A4, wherein the polyvinyl alcohol homopolymer blend comprises a first polyvinyl alcohol homopolymer and a second polyvinyl alcohol homopolymer, wherein the first polyvinyl alcohol homopolymer and second polyvinyl alcohol homopolymer are present in a relative weight ratio in a range of about 90/10 to about 10/90, or about 80/20 to about 20/80, or about 70/30 to about 50/50.

A6. The water-soluble film of A5, wherein:
the first polyvinyl alcohol homopolymer has an average viscosity in a range of about 11 mPa·s to about 20 mPa·s, or about 11 mPa·s to about 15 mPa·s, measured as a 4% polyvinyl alcohol polymer solution in deionized water at 20° C.; and,
the second polyvinyl alcohol homopolymer has an average viscosity in a range of about 1 mPa·s to about 10 mPa·s, or about 5 mPa·s to about 10 mPa·s, measured as a 4% polyvinyl alcohol polymer solution in deionized water at 20° C.

A7. The water-soluble film of A5 or A6, wherein the difference in average viscosities between the first polyvinyl alcohol homopolymer and the second polyvinyl alcohol homopolymer is at least about 1 mPa·s, or in a range of about 2 mPa·s to about 10 mPa·s, or in a range of about 3 mPa·s to about 8 mPa·s, measured as a 4% polyvinyl alcohol polymer solution in deionized water at 20° C.

A8. The water-soluble film of any one of A5-A7, wherein each of the first polyvinyl alcohol homopolymer and the second polyvinyl alcohol homopolymer has an average degree of hydrolysis in a range of about 75% to about 99%, or about 80% to about 95%, or about 85% to about 95%.

A9. The water-soluble film of any one of A5-A8, wherein the film is characterized 100% modulus values of less than 20 N/mm$^2$ as measured by the MOD Test at 35% RH, optionally less than about 19 N/mm$^2$, or less than about 18 N/mm$^2$, or less than about 17 N/mm$^2$, or less than about 16 N/mm$^2$, or less than about 15 N/mm$^2$, or less than about 14 N/mm$^2$, and optionally at least about 9 N/mm$^2$, or at least about 10 N/mm$^2$, or at least about 11 N/mm$^2$, at least about 12 N/mm$^2$, or at least about 13 N/mm$^2$, for example in a range of about 10 N/mm$^2$ to about 16 N/mm$^2$, or about 11 N/mm$^2$ to about 15 N/mm$^2$, or about 12 N/mm$^2$ to about 14 N/mm$^2$.

A10. The water-soluble film of any one of A1-A9, wherein the carboxylated anionic monomer unit is derived from maleic acid, monoalkyl maleate, dialkyl maleate, maleic anhydride, or any combination thereof.

A11. The water-soluble film of A10, wherein the carboxylated anionic monomer unit is derived from maleic acid.

A12. The water-soluble film of A10, wherein the carboxylated anionic monomer unit is derived from a monoalkyl maleate unit optionally selected from the group consisting of monomethyl maleate, salts, e.g. alkali metal salts, thereof, and combinations thereof.

A13. The water-soluble film of any one of A1-A12, wherein the carboxylated anionic monomer unit is present in the polyvinyl alcohol copolymer in an average amount of at least 3 mol %, or in a range of about 3 mol % to about 6 mol %, or about 3 mol % to about 5 mol %, or about 3.5 mol % to about 4.5 mol %, or about 4 mol % to about 4.5 mol %.

A14. The water-soluble film of any one A1-A13, wherein the polyvinyl alcohol resin is present in the water soluble film an amount in a range of about 50 wt % to about 80 wt %, or about 60 wt % to about 75 wt %, based on the total weight of the film.

A15. The water-soluble film of any one A1-A14, further comprising a surfactant in an amount of in a range of about 0.1 wt % to about 3.5 wt %, or about 0.5 wt % to about 2 wt %, based on the total weight of the film.

A16. The water-soluble film of any one of A1-A15, wherein the film has a residual moisture content of at least 4 wt %, or in a range of about 4 wt % to about 15 wt %, or about 5 wt % to about 10 wt %, based on the total weight of the film, as measured by Karl Fischer titration.

A17. The water-soluble film of any one of A1-A16, further comprising one or more components selected from plasticizers, plasticizer compatibilizers, lubricants, release agents, fillers, extenders, cross-linking agents, antiblocking agents, antioxidants, detackifying agents, antifoams, nanoparticles, bleaching agents, and aversive agents.

A18. The water-soluble film of A17, comprising a plasticizer in a total amount in a range of about 5 wt % to about 50 wt %, or about 10 wt % to about 40 wt %, or about 20 wt % to about 30 wt %, based on the total weight of the film.

A19. The water-soluble film of A17 or A18, wherein the plasticizer comprises glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane, polyether polyols, isomalt, maltitol, sorbitol, xylitol, erythritol, adonitol, dulcitol, pentaerythritol, mannitol, or a mixture of any of the foregoing.

A20. The water-soluble film of A19, wherein the plasticizer comprises sorbitol, glycerol, dipropyleneglycol, polyethyleneglycol, trimethylolpropane, or a mixture of any of the foregoing.

A21. The water-soluble film of any one of A1-A20, wherein the film has an average thickness, prior to any deformation, in a range of about 20 to about 150 micron, or about 35 to about 125 micron, or about 50 to about 110 micron, or about 76 micron.

A22. The water soluble film of any one of A1-A21, wherein the film is a solvent-cast film.

A23. A water-soluble unit dose article comprising the water-soluble film of any one of A1-A22.

A24. The water-soluble unit dose article of A23, comprising a compartment and a composition housed within the compartment.

Aspect B

B1. A water-soluble unit dose article comprising at least two compartments and optionally containing a composition housed in at least one of the compartments, wherein the unit dose article comprises;
  a. a first water-soluble film, wherein the first water-soluble film has a first side and a second side, and wherein the first water soluble film comprises a first PVOH resin wherein the first polyvinyl alcohol resin comprises;
    i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
    ii. a second PVOH polymer wherein the second PVOH polymer is a homopolymer wherein the homopolymer consists of vinyl alcohol monomer units and optionally vinyl acetate monomer units;
  b. A second water-soluble film, wherein the second water-soluble film has a first side and a second side, and wherein the second water-soluble film comprises a second polyvinyl alcohol resin wherein the second polyvinyl alcohol resin comprises;
    i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
    ii. about 85% to about 100% by weight of the second polyvinyl alcohol resin of a polyvinyl alcohol homopolymer or a homopolymer blend, wherein the homopolymers consist of vinyl alcohol monomer units and optionally vinyl acetate monomer units;
    wherein the second polyvinyl alcohol resin has an average viscosity in a range of about 8 mPa·s to less than 12 mPa·s, or about 9 mPa·s to less than 12 mPa·s, or about 10 mPa·s to less than 12 mPa·s, measured as a 4% polyvinyl alcohol polymer solution in deionized water at 20° C.;

c. a third water-soluble film wherein the third water-soluble film has a first side and a second side, and wherein the third water soluble film comprises a third polyvinyl alcohol resin, wherein the third polyvinyl alcohol resin optionally comprises:

i. a first PVOH polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. a second PVOH polymer wherein the second PVOH polymer is a homopolymer wherein the homopolymer consists of vinyl alcohol monomer units and optionally vinyl acetate monomer units;

wherein the first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment;

provided that when the a composition is housed in at least one of the compartments then the composition is not a household care composition.

B2. The water-soluble unit dose article according to B1 wherein the second polyvinyl alcohol resin comprises about 90% to about 100%, optionally about 100% by weight of the second polyvinyl alcohol resin of the polyvinyl alcohol homopolymer or polyvinyl alcohol homopolymer blend, and about 0% to about 10%, optionally about 0% by weight of the second polyvinyl alcohol resin of the polyvinyl alcohol polymer comprising carboxylated anionic monomer units, vinyl alcohol monomer units and optionally vinyl acetate monomer units, wherein the carboxylated anionic monomer unit is derived from a member selected from the group consisting of maleic acid, monoalkyl maleate, dialkyl maleate, maleic anhydride, and combinations thereof.

B3. The water-soluble unit dose article according to any one of B1-B3, wherein the second polyvinyl alcohol resin comprises a blend of a first polyvinyl alcohol homopolymer and a second polyvinyl alcohol homopolymer, optionally wherein the first polyvinyl alcohol homopolymer and second polyvinyl alcohol homopolymer are present in a relative weight ratio of in a range of about 90/10 to about 10/90, or about 80/20 to about 20/80, or about 70/30 to about 50/50.

B4. The water-soluble unit dose article according to B3, wherein in the second polyvinyl alcohol resin;

a. the first polyvinyl alcohol homopolymer has an average viscosity in a range of about 11 mPa·s to about 20 mPa·s, or about 11 mPa·s to about 15 mPa·s, measured as a 4% polyvinyl alcohol polymer solution in deionized water at 20° C.;

b. the second polyvinyl alcohol homopolymer has an average viscosity in a range of about 1 mPa·s to about 10 mPa·s, or about 5 mPa·s to about 10 mPa·s, measured as a 4% polyvinyl alcohol polymer solution in deionized water at 20° C.;

optionally, wherein the difference in average viscosity of the first polyvinyl alcohol polymer and the second polyvinyl alcohol homopolymer is at least 1 mPa·s, or about 2 to about 10 mPa·s, or about 3 to about 8 mPa·s, measured as a 4% polyvinyl alcohol polymer solution in deionized water at 20° C.

B5. The water-soluble unit dose article according to any one of B3-B5, wherein the individual polyvinyl alcohol homopolymers independently have an average degree of hydrolysis in a range of about 75% to about 99%, or about 80% to about 95%, or about 85% to about 95%.

B6. The water-soluble unit dose article according to any one of B1-B5, wherein a. the first polyvinyl alcohol resin is present in an amount a range of about 50% to about 95%, or about 50% to about 80%, or about 60% to about 75%, by weight of the first water-soluble film, or b. the second polyvinyl alcohol resin is present in an amount in a range of about 50% to about 95%, or about 50% to about 80%, or about 60% to about 75%, by weight of the second water-soluble film, or c. the third polyvinyl alcohol resin is present in an amount in a range of about 50% to about 95%, or about 50% to about 80%, or about 60% to about 75%, by weight of the third water-soluble film; or d. any combination of features (a) to (c).

B7. The water-soluble unit dose article according to any one of B1-B6, wherein each carboxylated anionic monomer unit in the first water-soluble resin and in the third water-soluble resin is independently derived from a monoalkyl maleate unit optionally selected from the group consisting of monomethyl maleate, salts, e.g. alkali metal salts, thereof, and combinations thereof, and optionally wherein each carboxylated anionic monomer unit is independently present in each of the first PVOH polymers in an average amount of in a range of about 3 mol. % to about 6 mol. %, or about 3 mol. % to about 5 mol. %, or about 3.5 mol. % to about 4.5 mol. %, or about 4 mol. % to about 4.5 mol. %.

B8. The water-soluble unit dose article according to any one of B1-B7, wherein the second polyvinyl alcohol resin comprises a polyvinyl alcohol polymer comprising a carboxylated anionic monomer unit derived from a monoalkyl maleate unit optionally selected from the group consisting of monomethyl maleate and salts thereof, optionally alkali metal salts thereof, and combinations thereof, wherein the carboxylated anionic monomer unit is present in the polyvinyl alcohol polymer comprising a carboxylated anionic monomer unit in an average amount of at least 3 mol. %, or about 3 mol. % to about 6 mol. %, or about 3 mol. % to about 5 mol. %, or about 3.5 mol. % to about 4.5 mol. %, or about 4 mol. % to about 4.5 mol. %.

B9. The water-soluble unit dose article according to any one of B1-B8 wherein each first PVOH polymer in the first water-soluble resin and third water-soluble resin is independently characterized by a. an average viscosity of in a range of about 10 mPa·s to about 40 mPa·s, or about 10 mPa·s to about 30 mPa·s, or about 12 mPa·s to about 25 mPa·s, or about 14 mPa·s to about 20 mPa·s, measured as a 4% polyvinyl alcohol polymer solution in deionized water at 20° C., or b. an average degree of hydrolysis in a range of about 60% to about 99%, or about 80% to about 98%, or about 83% to about 95%, or about 85% to about 92%, or c. a combination of any of the foregoing.

and, wherein each second PVOH polymer in the first water-soluble resin and third water-soluble resin is independently characterized by d. an average viscosity of in a range of about 3 mPa·s to about 30 mPa·s, or about 7 mPa·s to about 30 mPa·s, or about 10 mPa·s to about 30 mPa·s, or about 12 mPa·s to about 25 mPa·s, measured as a 4% polyvinyl alcohol polymer solution in deionized water at 20° C.; or
e. an average degree of hydrolysis in a range of about 60% to about 99%, or about 80% to about 98%, or about 85% to about 95%, or about 87% to about 92%; or
f. a combination of any of the foregoing.

B10. The water-soluble unit dose article according to any one of B1-B9, wherein the polyvinyl alcohol polymer comprising carboxylated anionic monomer units, vinyl alcohol monomer units and optionally vinyl acetate monomer units in the second polyvinyl alcohol resin is characterized by;
a. an average viscosity in a range of about 10 mPa·s to about 40 mPa·s, or about 10 mPA·s to about 30 mPa·s, or about 12 mPa·s to about 25 mPa·s, or about 14 mPa·s to about 20 mPa·s, measured as a 4% polyvinyl alcohol polymer solution in deionized water at 20° C., or
b. an average degree of hydrolysis in a range of about 60% to about 99%, or about 80% to about 98%, or about 83% to about 95%, or about 85% to about 92%, or
c. a combination of any of the foregoing.

B111. The water-soluble unit dose article according to any one of B1-B110, wherein independently in the first water-soluble film and in the third water-soluble film, the relative weight ratio of the first PVOH polymer and second PVOH polymer is in a range of about 90/10 to about 10/90, or about 80/20 to about 20/80, or about 70/30 to about 50/50.

B12. The water-soluble unit dose article according to any one of B1-B111, wherein the first water-soluble film, the second water-soluble film and the third water-soluble film each independently have a surfactant content in a range of about 0.1% to about 3.5%, or about 0.5% to about 2% by weight of the respective film.

B13. The water-soluble unit dose article according to any one of B1-B112, wherein the first water-soluble film, the second water-soluble film, and the third water-soluble film each individually have a residual moisture content of at least 4%, or in a range of about 4% to about 15%, or about 5% to about 10% by weight of the water-soluble film as measured by Karl Fischer titration.

B14. The water-soluble unit dose article according to any one of B1-B13, wherein each film independently comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

B15. The water-soluble unit dose article according to B14, wherein each film independently comprises one or more plasticizers in an amount in a range of between 5% to about 50%, or about 10% to about 40%, or about 20% to about 30% by weight of the individual film, optionally wherein the plasticiser is selected from polyols, sugar alcohols, or a mixture thereof, optionally wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof, optionally wherein the plasticizer is selected from the group consisting of sorbitol, glycerol, dipropyleneglycol, polyethyleneglycol, trimethylolpropane, or a mixture thereof.

B16. The water-soluble unit dose article according to any one of B1-B15, wherein the first water-soluble film and the second water-soluble film are sealed via solvent sealing, heat sealing or a combination thereof, optionally via solvent sealing, further optionally wherein the solvent sealing solution comprises an aqueous solvent, a non-aqueous solvent or a combination thereof, still further optionally wherein the solvent sealing solution comprises water; and/or
wherein the second water-soluble film and the third water-soluble film are sealed via solvent sealing, heat sealing or a combination thereof, optionally via solvent sealing, further optionally wherein the solvent sealing solution comprises an aqueous solvent, a non-aqueous solvent or a combination thereof, still further optionally wherein the solvent sealing solution comprises water.

B17. The water-soluble unit dose article according to any one of B1-B16, wherein the unit dose article comprises at least a third compartment, optionally at least a third and a fourth compartment between the second water-soluble film and the third water-soluble film, optionally wherein the second compartment and the third compartment, e.g. the second compartment, the third compartment and the fourth compartments are positioned side-by-side to one another and wherein the second compartment and the third compartment, optionally the second compartment, the third compartment and the fourth compartment are positioned above the first compartment.

B18. The water-soluble unit dose article according to any one of B1-B17, wherein the package comprises a non-household care composition housed in at least one of the compartments.

B19. The water-soluble unit dose article according to B118, wherein the package comprises a non-household care composition housed in each compartment.

B20. The water-soluble unit dose article according to B118 or B119, wherein the non-household care composition is selected from the group consisting of agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, compositions containing one or more active agents selected from agriculture active agents, ingestible active agents, liquid treatment active agents, industrial active agents, and combinations of any of the foregoing.

B21. A process of making a water-soluble unit dose article according to any one of B1-B20, comprising the steps of;
a. deforming the first water-soluble film in a mould to create an open cavity, optionally via thermoforming, vacuum forming, or a combination thereof;
b. filling the open cavity with a composition;
c. separately deforming the third water-soluble film in a mould to create at least one open cavity, optionally via thermoforming, vacuum forming, or a combination thereof;
d. filling the at least one open cavity from step (c) with a composition;
e. closing the open filled cavity from step (d) with the second water-soluble film;
f. sealing the second water-soluble film to the third water-soluble film to create a closed intermediate, optionally wherein the second water-soluble film and the third water soluble films are sealed via solvent sealing, further optionally wherein a solvent sealing solution is applied to the first side of the second water-soluble film prior to sealing the films together, the first side being the side facing the third water-soluble film;

g. closing the open filled cavity from step (b) with the closed intermediate from step (f);

h. sealing the first water-soluble film to the second water-soluble film create the water-soluble unit dose article, optionally wherein the first water-soluble film and the second water soluble films are sealed via solvent sealing, further optionally wherein a solvent sealing solution is applied to the second side of the second water-soluble film prior to sealing the films together, the second side being the side facing the first water-soluble film.

B22. The process according to B21, wherein the first water-soluble film in step (a) and the third water-soluble film in step (c) are the same prior to deforming.

Aspect C

C1. A water-soluble unit dose article comprising at least a first compartment and optionally a composition housed in the at least first compartment, wherein the unit dose article comprises;

a. A first water-soluble film, wherein the first water-soluble film has a first side and a second side, and wherein the first water soluble film comprises a first PVOH resin wherein the first polyvinyl alcohol resin comprises:

i. a first polyvinyl alcohol polymer comprising carboxylated anionic monomer units, vinyl alcohol monomer units and optionally vinyl acetate monomer units; and wherein the carboxylated anionic monomer unit is derived from a member selected from the group consisting of maleic acid, monoalkyl maleate, dialkyl maleate, maleic anhydride, and combinations thereof;

ii. a second PVOH polymer wherein the second PVOH polymer is a homopolymer wherein the homopolymer consists of vinyl alcohol monomer units and optionally vinyl acetate monomer units;

b. A second water-soluble film, wherein the second water-soluble film has a first side and a second side, and wherein the second water-soluble film comprises a second polyvinyl alcohol resin wherein the second polyvinyl alcohol resin comprises;

i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. about 85% to about 100% by weight of the second polyvinyl alcohol resin of a polyvinyl alcohol homopolymer or a homopolymer blend, wherein the homopolymers consist of vinyl alcohol monomer units and optionally vinyl acetate monomer units; wherein the second polyvinyl alcohol resin has an viscosity in a range of about 8 mPa·s to less than 12 mPa·s, or about 9 mPa·s to less than 12 mPa·s, or about 10 mPa·s to less than 12 mPa·s, measured as a 4% polyvinyl alcohol polymer solution in deionized water at 20° C.; and wherein the first side of the first water-soluble film is sealed to the second side of the second water-soluble film to create the at least first compartment between the first water-soluble film and the second water-soluble film;

provided that when the article comprises a household care composition housed in the at least first compartment then the first polyvinyl alcohol resin comprises the first polyvinyl alcohol polymer in an amount of at least 65%, or in a range of about 65 wt. % to about 95 wt. %, or 65 wt. % to about 90 wt. %, or in a range of greater than 65 wt. % to about 95%, or greater than 65 wt. % to about 90 wt. %, or greater than 65 wt. % to about 85 wt. %, or about 70 wt. % to about 90 wt. % based on the weight of the first polyvinyl alcohol resin.

C2. The water-soluble unit dose article according to C1, wherein the second polyvinyl alcohol resin comprises about 90% to 100%, optionally about 100% by weight of the second polyvinyl alcohol resin of the polyvinyl alcohol homopolymer or polyvinyl alcohol homopolymer blend and about 0% to about 10%, optionally about 0% by weight of the second polyvinyl alcohol resin of the polyvinyl alcohol polymer comprising carboxylated anionic monomer units, vinyl alcohol monomer units and optionally vinyl acetate monomer units, wherein the carboxylated anionic monomer unit is derived from a member selected from the group consisting of maleic acid, monoalkyl maleate, dialkyl maleate, maleic anhydride, and combinations thereof.

C3. The water-soluble unit dose article according to any one of C1-C2, wherein the second polyvinyl alcohol resin comprises a blend of a first polyvinyl alcohol homopolymer and a second polyvinyl alcohol homopolymer, optionally wherein the first polyvinyl alcohol homopolymer and second polyvinyl alcohol homopolymer are present in a relative weight ratio of 90/10 to 10/90, or 80/20 to 20/80, or 70/30 to 50/50.

C4. The water-soluble unit dose article according to C3, wherein in the second polyvinyl alcohol resin;

a. the first polyvinyl alcohol homopolymer has an average viscosity in a range of about 11 mPa·s to about 20 mPa·s, or about 11 mPa·s to about 15 mPa·s, measured as a 4% polyvinyl alcohol polymer solution in deionized water at 20° C.;

b. the second polyvinyl alcohol homopolymer has an average viscosity in a range of about 1 mPa·s to about 10 mPa·s, or about 5 mPa·s to about 10 mPa·s, measured as a 4% polyvinyl alcohol polymer solution in deionized water at 20° C.;

optionally, wherein the difference in average viscosity of the first polyvinyl alcohol polymer and the second polyvinyl alcohol homopolymer is at least 1 mPa·s, or about 2 to about 10 mPa·s, or about 3 to about 8 mPa·s, measured as a 4% polyvinyl alcohol polymer solution in deionized water at 20° C.

C5. The water-soluble unit dose article according to any one of C3-C4, wherein the individual polyvinyl alcohol homopolymers independently have an average degree of hydrolysis in a range of about 75% to about 99%, or about 80% to about 95%, or about 85% to about 95%.

C6. The water-soluble unit dose article according to any one of C1-C5, wherein a. the first polyvinyl alcohol resin is present in an amount a range of about 50% to about 95%, or about 50% to about 80%, or about 60% to about 75%, by weight of the first water-soluble film, or b. the second polyvinyl alcohol resin is present in an amount in a range of about 50% to about 95%, or about 50% to about 80%, or about 60% to about 75%, by weight of the second water-soluble film, or
c. any combination thereof.

C7. The water-soluble unit dose article according to any one of C1-C6, wherein the carboxylated anionic monomer unit in the first water-soluble film is derived from a monoalkyl maleate unit optionally selected from the group consisting of monomethyl maleate, salts, e.g. alkali metal salts, thereof, and combinations thereof, and optionally wherein the carboxylated anionic monomer unit is present in the first PVOH polymer in an average amount of in a range of about 3 mol. % to about 6 mol. %, or about 3 mol. % to about 5 mol. %, or about 3.5 mol. % to about 4.5 mol. %, or about 4 mol. % to about 4.5 mol. %.

C8. The water-soluble unit dose article according to any one of C1-C7, wherein the second polyvinyl alcohol resin comprises a polyvinyl alcohol polymer comprising a carboxylated anionic monomer unit derived from a monoalkyl maleate unit optionally selected from the group consisting of monomethyl maleate, salts, e.g. alkali metal salts, thereof, and combinations thereof, wherein the carboxylated anionic monomer unit is present in the polyvinyl alcohol polymer comprising a carboxylated anionic monomer unit in an average amount of in a range of about 3 mol. % to about 6 mol. %, or about 3 mol. % to about 5 mol. %, or about 3.5 mol. % to about 4.5 mol. %, or about 4 mol. % to about 4.5 mol. %.

C9. The water-soluble unit dose article according to any one of C1-C8, wherein the first PVOH polymer in the first water soluble resin is characterized by
  a. an average viscosity of in a range of about 10 mPa·s to about 40 mPa·s, or about 10 mPa·s to about 30 mPa·s, or about 12 mPa·s to about 25 mPa·s, or about 14 mPa·s to about 20 mPa·s, measured as a 4% polyvinyl alcohol polymer solution in deionized water at 20° C., or
  b. an average degree of hydrolysis in a range of about 60% to about 99%, or about 80% to about 98%, or about 83% to about 95%, or about 85% to about 92%, or
  c. a combination of any of the foregoing,
and wherein the second PVOH polymer in the first water soluble resin is characterized by
  a. an average viscosity of in a range of about 3 mPa·s to about 30 mPa·s, or about 7 mPa·s to about 30 mPa·s, or about 10 mPa·s to about 30 mPa·s, or about 12 mPa·s to about 25 mPa·s, measured as a 4% polyvinyl alcohol polymer solution in deionized water at 20° C.; or
  b. an average degree of hydrolysis in a range of about 60% to about 99%, or about 80% to about 98%, or about 85% to about 95%, or about 87% to about 92%; or
  c. a combination of any of the foregoing.

C10. The water-soluble unit dose article according to any one of C1-C9, wherein the polyvinyl alcohol polymer comprising carboxylated anionic monomer units, vinyl alcohol monomer units and optionally vinyl acetate monomer units in the second polyvinyl alcohol resin is characterized by;
  a. an average viscosity in a range of about 10 mPa·s to about 40 mPa·s, or about 10 mPA·s to about 30 mPa·s, or about 12 mPa·s to about 25 mPa·s, or about 14 mPa·s to about 20 mPa·s, measured as a 4% polyvinyl alcohol polymer solution in deionized water at 20° C., or
  b. an average degree of hydrolysis in a range of about 60% to about 99%, or about 80% to about 98%, or about 83% to about 95%, or about 85% to about 92%, or
  c. a combination of any of the foregoing.

C11. The water-soluble unit dose article according to any one of C1-C10, wherein in the first water-soluble film, the relative weight ratio of the first PVOH polymer and second PVOH polymer is in a range of about 90/10 to about 10/90, or about 80/20 to about 20/80, or about 70/30 to about 50/50.

C12. The water-soluble unit dose article according to any one of C1-C11, wherein the first water-soluble film and the second water-soluble film each independently have a surfactant content in a range of about 0.1% to about 3.5%, or about 0.5% to about 2% by weight of the respective film.

C13. The water-soluble unit dose article according to any one of C1-C12, wherein the first water-soluble film and the second water-soluble film each individually have a residual moisture content of at least 4%, or in a range of about 4% to about 15%, or about 5% to about 10% by weight of the water-soluble film as measured by Karl Fischer titration.

C14. The water-soluble unit dose article according to any one of C1-C13, wherein each film independently comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

C15. The water-soluble unit dose article according to C14, wherein each film independently comprises one or more plasticizers in an amount in a range of between 5% to about 50%, or about 10% to about 40%, or about 20% to about 30% by weight of the individual film, optionally wherein the plasticiser is selected from polyols, sugar alcohols, or a mixture thereof, optionally wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof, optionally wherein the plasticizer is selected from the group consisting of sorbitol, glycerol, dipropyleneglycol, polyethyleneglycol, trimethylolpropane, or a mixture thereof.

C16. The water-soluble unit dose article according to any one of C1-C15, wherein the first water-soluble film and the second water-soluble film are sealed via solvent sealing, heat sealing or a combination thereof, optionally via solvent sealing, further optionally wherein the solvent sealing solution comprises an aqueous solvent, a non-aqueous solvent or a combination thereof, still further optionally wherein the solvent sealing solution comprises water.

C17. The water-soluble unit dose article according to any one of C1-C16, wherein the unit dose article comprises at least a second compartment, optionally at least a third compartment between the first water-soluble film and the second water-soluble film, optionally wherein the first compartment and the second compartment, optionally the first compartment, the second compartment and the third compartments are positioned side-by-side to one another, optionally wherein the water-soluble unit dose article comprises, three, or even four, or even five side-by-side compartments.

C18. The water-soluble unit dose article according to any one of C1-C17, wherein the article comprises a household care composition housed in the at least first compartment.

C19. The water-soluble unit dose article according to any one of C1-C18, wherein the household care composition is selected from the group consisting of light duty liquid detergents compositions, heavy duty liquid detergent compositions, hard surface cleaning compositions, laundry detergent gels, bleaching compositions, laundry additives, fabric enhancer compositions, shampoos, body washes, other personal care compositions, and mixtures thereof, e.g. a liquid laundry detergent composition.

C20. The water-soluble unit dose article according to any one of C1-C19, wherein the article comprises a non-household care composition housed in the at least first compartment and the non-household care composition optionally is selected from the group consisting of agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, compositions containing one or more active agents selected from agriculture active agents, ingestible active agents, liquid treatment active agents, industrial active agents, and combinations of any of the foregoing.

C21. A process of making a water-soluble unit dose article according to any one of C1-C20, comprising the steps of:
 a. deforming the first water-soluble film in a mould to create an open cavity, optionally via thermoforming, vacuum forming, or a combination thereof;
 b. filling the open cavity formed by the first water-soluble film with a composition;
 c. closing the open filled cavity with the second water-soluble film;
 d. sealing the first water-soluble film to the second water-soluble film to create the water-soluble unit dose article, optionally wherein the first water-soluble film and the second water-soluble film are sealed via solvent sealing, further optionally wherein a solvent sealing solution is applied to the second water-soluble film prior to sealing the films together.

C22. A process of making a water-soluble unit dose article according to any one of C1-C20, comprising the steps of:
 a. sealing portions of the first water-soluble film to portions of the second water soluble film to form an open cavity;
 b. filling the open cavity with a composition;
 c. sealing an additional portion of the first water-soluble film to an additional portion the a second water soluble film to close the open cavity and create the water-soluble unit dose article;
  optionally wherein the first water-soluble film and the second water-soluble film are sealed in step (a) via solvent sealing, further optionally wherein a solvent sealing solution is applied to the second water-soluble film prior to sealing the portions of the films together, and
  optionally wherein the first water-soluble film and the second water-soluble film are sealed in step (c) via solvent sealing, further optionally wherein a solvent sealing solution is applied to the second water-soluble film prior to sealing the additional portions of the films together.

Aspect D

D1. A water-soluble unit dose article comprising at least a first compartment and optionally a composition housed in the at least first compartment, wherein the unit dose article comprises;
 a. A first water-soluble film, wherein the first water-soluble film has a first side and a second side, and wherein the first water soluble film comprises a first PVOH resin wherein the first polyvinyl alcohol resin comprises a polyvinyl alcohol consisting of a polyvinyl alcohol homopolymer, an anionic polyvinyl alcohol copolymer, or a blend thereof;
 b. A second water-soluble film, wherein the second water-soluble film has a first side and a second side, and wherein the second water-soluble film comprises a second polyvinyl alcohol resin wherein the second polyvinyl alcohol resin comprises;
  i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
  ii. about 85% to about 100% by weight of the second polyvinyl alcohol resin of a polyvinyl alcohol homopolymer or a homopolymer blend, wherein the homopolymers consist of vinyl alcohol monomer units and optionally vinyl acetate monomer units;
   wherein the second polyvinyl alcohol resin has an average viscosity in a range of about 8 mPa·s to less than 12 mPa·s, or about 9 mPa·s to less than 12 mPa·s, or about 10 mPa·s to less than 12 mPa·s, measured as a 4% polyvinyl alcohol polymer solution in deionized water at 20° C.; and
  wherein the first side of the first water-soluble film is sealed to the second side of the second water-soluble film to create the at least first compartment between the first water-soluble film and the second water-soluble film.

D2. The water-soluble unit dose article according to D1, wherein the second polyvinyl alcohol resin comprises about 90% to 100%, optionally about 100% by weight of the second polyvinyl alcohol resin of the polyvinyl alcohol homopolymer or polyvinyl alcohol homopolymer blend and about 0% to about 10%, optionally about 0% by weight of the second polyvinyl alcohol resin of the polyvinyl alcohol polymer comprising carboxylated anionic monomer units, vinyl alcohol monomer units and optionally vinyl acetate monomer units, wherein the carboxylated anionic monomer unit is derived from a member selected from the group consisting of maleic acid, monoalkyl maleate, dialkyl maleate, maleic anhydride, and combinations thereof.

D3. The water-soluble unit dose article according to any one of D1-D2, wherein the second polyvinyl alcohol resin comprises a blend of a first polyvinyl alcohol homopolymer and a second polyvinyl alcohol homopolymer, optionally wherein the first polyvinyl alcohol homopolymer and second polyvinyl alcohol homopolymer are present in a relative weight ratio in a range of about 90/10 to about 10/90, or about 80/20 to about 20/80, or about 70/30 to about 50/50.

D4. The water-soluble unit dose article according to D3, wherein in the second polyvinyl alcohol resin;
 a. the first polyvinyl alcohol homopolymer has an average viscosity in a range of about 11 mPa·s to about 20 mPa·s, or about 11 mPa·s to about 15 mPa·s, measured as a 4% polyvinyl alcohol polymer solution in deionized water at 20° C.;
 b. the second polyvinyl alcohol homopolymer has an average viscosity in a range of about 1 mPa·s to about 10 mPa·s, or about 5 mPa·s to about 10 mPa·s, measured as a 4% polyvinyl alcohol polymer solution in deionized water at 20° C.;

optionally wherein the difference in average viscosity of the first polyvinyl alcohol polymer and the second polyvinyl alcohol homopolymer is at least 1 mPa·s, or about 2 to about 10 mPa·s, or about 3 to about 8 mPa·s, measured as a 4% polyvinyl alcohol polymer solution in deionized water at 20° C.

D5. The water-soluble unit dose article according to any one of D3-D4, wherein the individual polyvinyl alcohol homopolymers independently have an average degree of hydrolysis in a range of about 75% to about 99%, or about 80% to about 95%, or about 85% to about 95%.

D6. The water-soluble unit dose article according to any one of D1-D5, wherein
   a. the first polyvinyl alcohol resin is present in an amount a range of about 50% to about 95%, or about 50% to about 80%, or about 60% to about 75%, by weight of the first water-soluble film, or
   b. the second polyvinyl alcohol resin is present in an amount in a range of about 50% to about 95%, or about 50% to about 80%, or about 60% to about 75%, by weight of the second water-soluble film, or
   c. any combination thereof.

D7. The water-soluble unit dose article according to any one of D1-D6, wherein the carboxylated anionic monomer unit in the first water-soluble film is derived from a monoalkyl maleate unit optionally selected from the group consisting of monomethyl maleate, salts, e.g. alkali metal salts, thereof, and combinations thereof, and optionally wherein the carboxylated anionic monomer unit is present in the first PVOH polymer in an average amount of in a range of about 3 mol. % to about 6 mol. %, or about 3 mol. % to about 5 mol. %, or about 3.5 mol. % to about 4.5 mol. %, or about 4 mol. % to about 4.5 mol. %.

D8. The water-soluble unit dose article according to any one of D1-D7, wherein the second polyvinyl alcohol resin comprises a polyvinyl alcohol polymer comprising a carboxylated anionic monomer unit derived from a monoalkyl maleate unit optionally selected from the group consisting of monomethyl maleate, salts, e.g. alkali metal salts, thereof, and combinations thereof, wherein the carboxylated anionic monomer unit is present in the polyvinyl alcohol polymer comprising a carboxylated anionic monomer unit in an average amount of in a range of about 3 mol. % to about 6 mol. %, or about 3 mol. % to about 5 mol. %, or about 3.5 mol. % to about 4.5 mol. %, or about 4 mol. % to about 4.5 mol. %.

D9. The water-soluble unit dose article according to any one of D1-D8, wherein the first PVOH polymer in the first water soluble film is characterized by
   a. an average viscosity of in a range of about 10 mPa·s to about 40 mPa·s, or about 10 mPa·s to about 30 mPa·s, or about 12 mPa·s to about 25 mPa·s, or about 14 mPa·s to about 20 mPa·s, measured as a 4% polyvinyl alcohol polymer solution in deionized water at 20° C., or
   b. an average degree of hydrolysis in a range of about 60% to about 99%, or about 80% to about 98%, or about 83% to about 95%, or about 85% to about 92%, or
   c. a combination of any of the foregoing,
and wherein the second PVOH polymer in the first water soluble film is characterized by
   a. an average viscosity of in a range of about 3 mPa·s to about 30 mPa·s, or about 7 mPa·s to about 30 mPa·s, or about 10 mPa·s to about 30 mPa·s, or about 12 mPa·s to about 25 mPa·s, measured as a 4% polyvinyl alcohol polymer solution in deionized water at 20° C.; or
   b. an average degree of hydrolysis in a range of about 60% to about 99%, or about 80% to about 98%, or about 85% to about 95%, or about 87% to about 92%; or
   c. a combination of any of the foregoing.

D10. The water-soluble unit dose article according to any one of D1-D9, wherein the polyvinyl alcohol polymer comprising carboxylated anionic monomer units, vinyl alcohol monomer units and optionally vinyl acetate monomer units in the second polyvinyl alcohol resin is characterized by;
   a. an average viscosity in a range of about 10 mPa·s to about 40 mPa·s, or about 10 mPA·s to about 30 mPa·s, or about 12 mPa·s to about 25 mPa·s, or about 14 mPa·s to about 20 mPa·s, measured as a 4% polyvinyl alcohol polymer solution in deionized water at 20° C., or
   b. an average degree of hydrolysis in a range of about 60% to about 99%, or about 80% to about 98%, or about 83% to about 95%, or about 85% to about 92%, or
   c. a combination of any of the foregoing.

D11. The water-soluble unit dose article according to any one of D1-D10, wherein in the first water-soluble film, the relative weight ratio of the first PVOH polymer and second PVOH polymer is in a range of about 90/10 to about 10/90, or about 80/20 to about 20/80, or about 70/30 to about 50/50.

D12. The water-soluble unit dose article according to any one of D1-D11, wherein the first water-soluble film and the second water-soluble film each independently have a surfactant content in a range of about 0.1% to about 3.5%, or about 0.5% to about 2% by weight of the respective film.

D13. The water-soluble unit dose article according to any one of D1-D12, wherein the first water-soluble film and the second water-soluble film each individually have a residual moisture content of at least 4%, or in a range of about 4% to about 15%, or about 5% to about 10% by weight of the water-soluble film as measured by Karl Fischer titration.

D14. The water-soluble unit dose article according to any one of D1-D13, wherein each film independently comprises one or more components selected from the group consisting of plasticizers, plasticizer compatibilizers, lubricants, release agents, fillers, extenders, cross-linking agents, anti-blocking agents, antioxidants, detackifying agents, anti-foams, nanoparticles, bleaching agents, aversive agents, surfactants, and combinations thereof.

D15. The water-soluble unit dose article according to D14, wherein each film independently comprises one or more plasticizers in an amount in a range of between 5% to about 50%, or about 10% to about 40%, or about 20% to about 30% by weight of the individual film, optionally wherein the plasticiser is selected from polyols, sugar alcohols, or a mixture thereof, optionally wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof, optionally wherein the plasticizer is selected from the group consisting of sorbitol, glycerol, dipropyleneglycol, polyethyleneglycol, trimethylolpropane, or a mixture thereof.

D16. The water-soluble unit dose article according to any one of D1-D5, wherein the first water-soluble film and the second water-soluble film are sealed via solvent sealing, heat sealing or a combination thereof, optionally via solvent sealing, further optionally wherein the solvent sealing solution comprises an aqueous solvent, a non-aqueous solvent or a combination thereof, still further optionally wherein the solvent sealing solution comprises water.

D17. The water-soluble unit dose article according to any one of D1-D16, wherein the unit dose article comprises at least a second compartment, optionally at least a third compartment between the first water-soluble film and the second water-soluble film, optionally wherein the first compartment and the second compartment, optionally the first compartment, the second compartment and the third compartments are positioned side-by-side to one another, optionally wherein the water-soluble unit dose article comprises, three, or even four, or even five side-by-side compartments.

D18. The water-soluble unit dose article according to any one of D1-D17, wherein the article comprises a household care composition housed in the at least first compartment.

D19. The water-soluble unit dose article according to any one of D1-D18, wherein the household care composition is selected from the group consisting of light duty liquid detergents compositions, heavy duty liquid detergent compositions, hard surface cleaning compositions, laundry detergent gels, bleaching compositions, laundry additives, fabric enhancer compositions, shampoos, body washes, other personal care compositions, and mixtures thereof, e.g. a liquid laundry detergent composition.

D20. The water-soluble unit dose article according to any one of D1-D19, wherein the article comprises a non-household care composition housed in the at least first compartment and the non-household care composition optionally is selected from the group consisting of agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, compositions containing one or more active agents selected from agriculture active agents, ingestible active agents, liquid treatment active agents, industrial active agents, and combinations of any of the foregoing.

D21. A process of making a water-soluble unit dose article according to any one of D1-D20, comprising the steps of:
   a. deforming the first water-soluble film in a mould to create an open cavity, optionally via thermoforming, vacuum forming, or a combination thereof;
   b. filling the open cavity formed by the first water-soluble film with a composition;
   c. closing the open filled cavity with the second water-soluble film;
   d. sealing the first water-soluble film to the second water-soluble film to create the water-soluble unit dose article, optionally wherein the first water-soluble film and the second water-soluble film are sealed via solvent sealing, further optionally wherein a solvent sealing solution is applied to the second water-soluble film prior to sealing the films together.

D22. A process of making a water-soluble unit dose article according to any one of D1-D20, comprising the steps of:
   a. sealing portions of the first water-soluble film to portions of the second water soluble film to form an open cavity;
   b. filling the open cavity with a composition;
   c. sealing an additional portion of the first water-soluble film to an additional portion the a second water soluble film to close the open cavity and create the water-soluble unit dose article;
      optionally wherein the first water-soluble film and the second water-soluble film are sealed in step (a) via solvent sealing, further optionally wherein a solvent sealing solution is applied to the second water-soluble film prior to sealing the portions of the films together, and
      optionally wherein the first water-soluble film and the second water-soluble film are sealed in step (c) via solvent sealing, further optionally wherein a solvent sealing solution is applied to the second water-soluble film prior to sealing the additional portions of the films together.

Aspect E

E1. A water-soluble unit dose article comprising at least two compartments and optionally a composition housed in at least one of the compartments, wherein the unit dose article comprises;
   a. a first water-soluble film, wherein the first water-soluble film has a first side and a second side, and wherein the first water soluble film comprises a first PVOH resin wherein the first polyvinyl alcohol resin comprises a polyvinyl alcohol consisting of a polyvinyl alcohol homopolymer, an anionic polyvinyl alcohol copolymer, or a blend thereof;
   b. A second water-soluble film, wherein the second water-soluble film has a first side and a second side, and wherein the second water-soluble film comprises a second polyvinyl alcohol resin wherein the second polyvinyl alcohol resin comprises;
      i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
      ii. about 85% to 100% by weight of the second polyvinyl alcohol resin of a polyvinyl alcohol homopolymer or a homopolymer blend, wherein the homopolymers consist of vinyl alcohol monomer units and optionally vinyl acetate monomer units;
      wherein the second polyvinyl alcohol resin has an average viscosity in a range of about 8 mPa·s and less than 12 mPa·s, or about 9 mPa·s to less than 12 mPa·s, or about 10 mPa·s to less than 12 mPa·s measured as a 4% polyvinyl alcohol polymer solution in deionized water at 20° C.;
   c. a third water-soluble film wherein the third water-soluble film has a first side and a second side, and wherein the third water soluble film comprises a third PVOH resin, wherein the third polyvinyl alcohol resin optionally comprises a polyvinyl alcohol consisting of a polyvinyl alcohol homopolymer, an anionic polyvinyl alcohol copolymer, or a blend thereof;
   wherein the first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment;

provided that when the article contains a composition housed within a compartment, then the composition is not a laundry composition and is not an automatic dish washing composition.

E2. The water-soluble unit dose article according to E1, wherein the second polyvinyl alcohol resin comprises about 90% to 100%, optionally about 100% by weight of the second polyvinyl alcohol resin of the polyvinyl alcohol homopolymer or polyvinyl alcohol homopolymer blend and about 0% to about 10%, optionally about 0% by weight of the second polyvinyl alcohol resin of the polyvinyl alcohol polymer comprising carboxylated anionic monomer units, vinyl alcohol monomer units and optionally vinyl acetate monomer units, wherein the carboxylated anionic monomer unit is derived from a member selected from the group consisting of maleic acid, monoalkyl maleate, dialkyl maleate, maleic anhydride, and combinations thereof.

E3. The water-soluble unit dose article according to any one of E1-E2, wherein the second polyvinyl alcohol resin comprises a blend of a first polyvinyl alcohol homopolymer and a second polyvinyl alcohol homopolymer, optionally wherein the first polyvinyl alcohol homopolymer and second polyvinyl alcohol homopolymer are present in a relative weight ratio in a range of about 90/10 to about 10/90, or about 80/20 to about 20/80, or about 70/30 to about 50/50.

E4. The water-soluble unit dose article according to E3, wherein in the second polyvinyl alcohol resin;
  a. the first polyvinyl alcohol homopolymer has an average viscosity in a range of about 11 mPa·s to about 20 mPa·s, or about 11 mPa·s to about 15 mPa·s, measured as a 4% polyvinyl alcohol polymer solution in deionized water at 20° C.;
  b. the second polyvinyl alcohol homopolymer has an average viscosity in a range of about 1 mPa·s to about 10 mPa·s, or about 5 mPa·s to about 10 mPa·s, measured as a 4% polyvinyl alcohol polymer solution in deionized water at 20° C.;
  optionally wherein the difference in average viscosity of the first polyvinyl alcohol polymer and the second polyvinyl alcohol homopolymer is at least 1 mPa·s, or about 2 to about 10 mPa·s, or about 3 to about 8 mPa·s, measured as a 4% polyvinyl alcohol polymer solution in deionized water at 20° C.

E5. The water-soluble unit dose article according to any one of E3-E4, wherein the individual polyvinyl alcohol homopolymers independently have an average degree of hydrolysis in a range of about 75% to about 99%, or about 80% to about 95%, or about 85% to about 95%.

E6. The water-soluble unit dose article according to any one of E1-E5, wherein
  a. the first polyvinyl alcohol resin is present in an amount a range of about 50% to about 95%, or about 50% to about 80%, or about 60% to about 75%, by weight of the first water-soluble film, or
  b. the second polyvinyl alcohol resin is present in an amount in a range of about 50% to about 95%, or about 50% to about 80%, or about 60% to about 75%, by weight of the second water-soluble film, or, or
  c. the third polyvinyl alcohol resin is present in an amount a range of about 50% to about 95%, or about 50% to about 80%, or about 60% to about 75%, by weight of the third water-soluble film; or
  d. any combination of the foregoing.

E7. The water-soluble unit dose article according to any one of E1-E6, wherein the first water-soluble film, the third water-soluble film, or both independently comprise a blend of polyvinyl alcohol homopolymers and/or anionic polyvinyl alcohol copolymers, optionally wherein the first water-soluble film, the third water-soluble film, or both independently comprise a blend of a polyvinyl alcohol homopolymer and an anionic polyvinyl alcohol copolymer, wherein the polyvinyl alcohol homopolymer and the anionic polyvinyl alcohol copolymer are present in a relative weight ratio in a range of about 90/10 to about 10/90, or about 80/20 to about 20/80, or about 70/30 to about 50/50.

E8. The water-soluble unit dose article according to E7, wherein the anionic polyvinyl alcohol copolymer comprises an anionic monomer unit, optionally wherein the anionic monomer unit is present in the anionic polyvinyl alcohol copolymer in an average amount in a range of about 1 mol. % to about 10 mol. %, or about 2 mol. % to about 5 mol %.

E9. The water-soluble unit dose article according to any one of E7-E8, wherein the anionic polyvinyl alcohol copolymer is selected from sulphonated and carboxylated anionic polyvinyl alcohol copolymers, e.g. carboxylated anionic polyvinyl alcohol copolymers, optionally wherein the first water-soluble film and the third water-soluble film independently comprise a blend of a polyvinyl alcohol homopolymer and a carboxylated anionic polyvinyl alcohol copolymer, optionally wherein the carboxylate is selected from an acrylate, a methacrylate, a maleate, or a mixture thereof, e.g. a maleate.

E10. The water-soluble unit dose article according to any one of E1-E9, wherein the second polyvinyl alcohol resin comprises a polyvinyl alcohol polymer comprising a carboxylated anionic monomer unit derived from a monoalkyl maleate unit optionally selected from the group consisting of monomethyl maleate, salts, e.g. alkali metal salts, thereof, and combinations thereof, wherein the carboxylated anionic monomer unit is present in the polyvinyl alcohol polymer comprising a carboxylated anionic monomer unit in an average amount of at least 3 mol. %, or in a range of about 3 mol. % to about 6 mol. %, or about 3 mol. % to about 5 mol. %, or about 3.5 mol. % to about 4.5 mol. %, or about 4 mol. % to about 4.5 mol. %.

E11. The water-soluble unit dose article according to any one of E1-E10, wherein the first water-soluble film, the second water-soluble film and the third water-soluble film each independently comprise a surfactant content in a range of about 0.1% to about 3.5%, or about 0.5% to about 2% by weight of the water-soluble film.

E12. The water-soluble unit dose article according to any one of E1-E11, wherein the first water-soluble film, the second water-soluble film, and the third water-soluble film each individually have a residual moisture content of at least 4%, or in a range of about 4% to about 15%, or about 5% to about 10% by weight of the water-soluble film as measured by Karl Fischer titration.

E13. The water-soluble unit dose article according to any one of E1-E12, wherein each film independently comprises one or more components selected from the group consisting of plasticizers, plasticizer compatibilizers, lubricants, release agents, fillers, extenders, cross-linking agents, anti-blocking agents, antioxidants, detackifying agents, antifoams, nanoparticles, bleaching agents, aversive agents, surfactants, and combinations thereof.

E14. The water-soluble unit dose article according to E13, wherein each film independently comprises one or more plasticizers in an amount in a range of between 5% to about 50%, or about 10% to about 40%, or about 20% to about 30% by weight of the individual film, optionally wherein the plasticiser is selected from polyols, sugar alcohols, or a mixture thereof, optionally wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof, optionally wherein the plasticizer is selected from the group consisting of sorbitol, glycerol, dipropyleneglycol, polyethyleneglycol, trimethylolpropane, or a mixture thereof.

E15. The water-soluble unit dose article according to any one of E1-E14, wherein the first water-soluble film and the second water-soluble film are sealed via solvent sealing, heat sealing or a combination thereof, optionally via solvent sealing, optionally wherein the solvent sealing solution comprises an aqueous solvent, a non-aqueous solvent or a mixture thereof, e.g. wherein the solvent sealing solution comprises water; and wherein the second water-soluble film and the third water-soluble film are sealed via solvent sealing, heat sealing or a mixture thereof, optionally via solvent sealing, optionally wherein the solvent sealing solution comprises an aqueous solvent, a non-aqueous solvent or a mixture thereof, e.g. wherein the solvent sealing solution comprises water.

E16. The water-soluble unit dose article according to any one of E1-E15, wherein the unit dose article comprises at least a third compartment, optionally at least a third and a fourth compartment between the second water-soluble film and the third water-soluble film, optionally wherein the second compartment and the third compartment, e.g. the second compartment, the third compartment and the fourth compartments are positioned side-by-side to one another and wherein the second compartment and the third compartment, optionally the second compartment, the third compartment and the fourth compartment are positioned above the first compartment.

E17. The water-soluble unit dose article according to any one of E1-E15, wherein the composition is selected from the group consisting of light duty liquid detergent compositions, heavy duty liquid detergent compositions, hard surface cleaning compositions, bleaching compositions, shampoos, body washes, other personal care compositions, and mixtures thereof.

E18. The water-soluble unit dose article according to any one of E1-E17, wherein the article comprises a non-household care composition housed in the at least first compartment and the non-household care composition optionally is selected from the group consisting of agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, compositions containing one or more active agents selected from agriculture active agents, ingestible active agents, liquid treatment active agents, industrial active agents, and combinations of any of the foregoing.

E19. A process of making a water-soluble unit dose article according to any one of E1-E18, comprising the steps of;

a. deforming the first water-soluble film in a mould to create an open cavity via thermoforming, vacuum forming, or a combination thereof;
b. filling the open cavity with the composition;
c. separately deforming the third water-soluble film in a mould to create at least one open cavity via thermoforming, vacuum forming, or a combination thereof
d. filling the at least one open cavity from step (c) with a composition;
e. closing the open filled cavity from step (c) with the second water-soluble film;
f. sealing the second water-soluble film and the third water-soluble film to create a closed intermediate, optionally wherein the second water-soluble film and the third water-soluble films are sealed via solvent sealing, optionally wherein a solvent sealing solution is applied to the first side of the second water-soluble film ahead of sealing the films together, the first side being the side facing the third water-soluble film;
g. closing the open filled cavity from step (b) with the closed intermediate from step (f);
h. sealing the first water-soluble film and the second water-soluble film to create the water-soluble unit dose article, optionally wherein the first water-soluble film and the second water-soluble film are sealed via solvent sealing, further optionally wherein a solvent sealing solution is applied to the second side of the second water-soluble film ahead of sealing the films together, the second side being the side facing the first water-soluble film.

E20. The process according to E19, wherein the first water-soluble film in step (a) and the third water-soluble film in step (c) are the same prior to deforming.

Aspect F

F1. A method of making a water-soluble unit dose article, comprising:
  a. deforming a first water-soluble film in a mould to create an open cavity, the first water soluble film comprising a first PVOH resin;
  b. filling the open cavity formed by the first water-soluble film with a composition;
  c. closing the open filled cavity from step (b) with a second water-soluble film, the second water soluble film comprising a second polyvinyl alcohol resin wherein the second polyvinyl alcohol resin comprises;
    i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
    ii. 85% about 100% by weight of the second polyvinyl alcohol resin of a polyvinyl alcohol homopolymer or a homopolymer blend, wherein the homopolymers consist of vinyl alcohol monomer units and optionally vinyl acetate monomer units;
    and wherein the second polyvinyl alcohol resin has an average 4% solution viscosity in deionized water at 20° C. in a range of 8 mPa·s to less than 12 mPa·s, or about 9 mPa·s to less than 12 mPa·s, or about 10 mPa·s to less than 12 mPa·s;
  d. sealing the second water-soluble film to the first water-soluble film to create the water-soluble unit dose article, optionally via solvent sealing.

F2. The method of F1, wherein the first water-soluble film has a first side and a second side, and the second water-soluble film has a first side and a second side, and further comprising prior to step (c),
- e. separately deforming a third water-soluble film in a mould to create at least one open cavity, the third water soluble film comprising a third PVOH resin same or different from the first and second PVOH resins;
- f. filling the at least one open cavity from step (e) with a composition;
- g. closing the open filled cavity from step (f) with the second water-soluble film;
- h. sealing the second water-soluble film to the third water-soluble film to create a closed intermediate, optionally via solvent sealing;
- i. wherein the closing the open filled cavity from step (b) with the second water-soluble film according to step (c) comprises closing the open filled cavity from step (b) with the closed intermediate from step (h); and
- j. wherein the sealing of the second water-soluble film and the first water-soluble film to create the water-soluble unit dose article of step (d) comprises sealing the first water-soluble film and the second water-soluble film of the closed intermediate of step (h) to create the water-soluble unit dose article.

F3. The method according to F2, wherein the first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment.

F4. The method according to any one of F1-F3, wherein the sealing of the first film to the second film, or the sealing of the third film to the second film, or both the sealing of the first film to the second film and the sealing of the third film to the second film comprises solvent sealing.

F5. The method according to F4, comprising applying the sealing solution to the film via a contact method.

F6. The method according to any one of F4-F5, comprising applying the sealing solution using an absorbent member.

F7. The method according to any one of F4-F6, comprising applying the sealing solution in a continuous process.

F8. The method according to any one of F1-F7, wherein the first polyvinyl alcohol resin comprises a first polyvinyl alcohol polymer comprising carboxylated anionic monomer units, vinyl alcohol monomer units and optionally vinyl acetate monomer units, and wherein the carboxylated anionic monomer units are derived from a member selected from the group consisting of maleic acid, monoalkyl maleate, dialkyl maleate, maleic anhydride, and combinations thereof.

F9. The method according to F8, wherein the first polyvinyl alcohol resin further comprises a second PVOH polymer wherein the second PVOH polymer is a homopolymer wherein the homopolymer consists of vinyl alcohol monomer units and optionally vinyl acetate monomer units.

F10. The method according to any one of F2-F9, wherein the third polyvinyl alcohol resin comprises a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof.

F11. The method according to F10, wherein the third polyvinyl alcohol resin further comprises a second PVOH polymer wherein the second PVOH polymer is a homopolymer wherein the homopolymer consists of vinyl alcohol monomer units and optionally vinyl acetate monomer units.

F12. The method according to any one of F2-F11, wherein the first water-soluble film in step (a) and the third water-soluble film in step (e) are identical prior to deforming.

F13. The method according to any one of F1-F12, wherein the second polyvinyl alcohol resin comprises the polyvinyl alcohol homopolymer or polyvinyl alcohol homopolymer blend in an amount in a range of about 90% to about 100%, or about 100% by weight of the second polyvinyl alcohol resin.

F14. The method according to any one of F1-F13, wherein the second polyvinyl alcohol resin comprises a blend of a first polyvinyl alcohol homopolymer and a second polyvinyl alcohol homopolymer, optionally wherein the first polyvinyl alcohol homopolymer and second polyvinyl alcohol homopolymer are present in a relative weight ratio of in a range of 90/10 to about 10/90, or about 80/20 to about 20/80, or about 70/30 to about 50/50.

F15. The method according to F14, wherein in the second polyvinyl alcohol resin;
- a. the first polyvinyl alcohol homopolymer has an average viscosity in a range of about 11 mPa·s to about 20 mPa·s, or about 11 mPa·s to about 15 mPa·s, measured as a 4% polyvinyl alcohol polymer solution in deionized water at 20° C.;
- b. the second polyvinyl alcohol homopolymer has an average viscosity in a range of in a range of about 1 mPa·s to about 10 mPa·s, or about 5 mPa·s to about 10 mPa·s, measured as a 4% polyvinyl alcohol polymer solution in deionized water at 20° C.;
- optionally wherein the difference in average viscosity between the first polyvinyl alcohol homopolymer and the second polyvinyl alcohol homopolymer is at least about 1 mPa·s, or in a range of about 2 to about 10 mPa·s, or about 3 mPa·s to about 8 mPa·s, measured as a 4% polyvinyl alcohol polymer solution in deionized water at 20° C.

F16. The method according to any one of F14-F15, wherein the individual polyvinyl alcohol homopolymers in the second polyvinyl alcohol resin independently have an average degree of hydrolysis in a range of about 75% to about 99%, or about 80% to about 95%, or about 85% to about 95%.

F17. The method according to any one of F2-F16, wherein
- a. the first polyvinyl alcohol resin is present in a range of about 50% to about 95%, or about 50% to about 80%, or about 60% to about 75%, by weight of the first water-soluble film, or
- b. the second polyvinyl alcohol resin is present in a range of about 50% to about 95%, or about 50% to about 80%, or about 60% to about 75%, by weight of the second water-soluble film, or
- c. the third polyvinyl alcohol resin is present in a range of about 50% to about 95%, or about 50% to about 80%, or about 60% to about 75%, by weight of the third water-soluble film; or
- d. any combination of the foregoing.

F18. The method according to any one of F4-F17, wherein each carboxylated anionic monomer unit in the first water-soluble resin and in the third water-soluble resin is independently derived from a monoalkyl maleate unit selected from the group consisting of monomethyl maleate, salts, optionally alkali metal salts, thereof, and combinations thereof, and optionally wherein each carboxylated anionic monomer unit is independently present in each of the first PVOH polymers in an average amount in a range of about 3 mol. % to about 6 mol. %, or about 3 mol. % to about 5 mol. %, or about 3.5 mol. % to about 4.5 mol. %, or about 4 mol. % to about 4.5 mol. %.

F19. The method according to any one of F1-F18, wherein the second polyvinyl alcohol resin comprises polyvinyl alcohol comprising a carboxylated anionic monomer unit derived from a member selected from the group consisting of maleic acid, monoalkyl maleate, dialkyl maleate, maleic anhydride, and combinations thereof and the carboxylated anionic monomer unit is present in the polyvinyl alcohol polymer in an average amount of at least 3 mol. %, or in a range of about 3 mol. % to about 6 mol. %, or about 3 mol. % to about 5 mol. %, or about 3.5 mol. % to about 4.5 mol. %, or about 4 mol. % to about 4.5 mol. %, F20. The method according to F19, wherein the carboxylated anionic monomer unit is derived from a monoalkyl maleate selected from the group consisting of monomethyl maleate, salts thereof, optionally alkali metal salts thereof, and combinations of any of the foregoing.

F21. The method according to any one of F4-F20, wherein each first PVOH polymer in the first water-soluble resin and third water-soluble resin is independently characterized by
   a. an average viscosity in a range of about 10 mPa·s to about 40 mPa·s, or about 10 mPa·s to about 30 mPa·s, or about 12 mPa·s to about 25 mPa·s, or about 14 mPa·s to about 20 mPa·s, measured as a 4% polyvinyl alcohol polymer solution in deionized water at 20° C., or
   b. an average degree of hydrolysis in a range of about 60% to about 99%, or about 80% to about 98%, or about 83% to about 95%, or about 85% to about 92%, or
   c. a combination thereof.
      and, wherein each second PVOH polymer in the first water-soluble resin and third water-soluble resin is independently characterized by
   c. an average viscosity in a range of about 3 mPa·s to about 30 mPa·s, or in a range of about 7 mPa·s to about 30 mPa·s, or in a range of about 10 mPa·s to about 30 mPa·s, or in a range of about 12 mPa·s to about 25 mPa·s, measured as a 4% polyvinyl alcohol polymer solution in deionized water at 20° C., or
   d. an average degree of hydrolysis in a range of about 60% to about 99%, or about 80% to about 98%, or about 85% to about 95%, or about 87% to about 92%, or
   e. a combination of any of the foregoing.

F22. The method according to any one of F4-F21, wherein the polyvinyl alcohol comprising a carboxylated anionic monomer unit in the second polyvinyl alcohol resin is characterized by;
   a. an average 4% solution viscosity at 20° C. in a range of about 10 mPa·s to less than 12 mPa·s, or
   b. an average degree of hydrolysis of in a range of about 60% to about 99%, or about 80% to about 98%, or about 83% to about 95%, or about 85% to about 92%, or
   c. a combination of any of the foregoing thereof.

F23. The method according to any one of F4-F22, wherein independently in the first water-soluble resin and in the third water-soluble resin, the relative weight ratio of the first PVOH polymer and second PVOH polymer is in a range of about 90/10 to about 10/90, or about 80/20 to about 20/80, or about 70/30 to about 50/50.

F24. The method according to any one of F4-F23, wherein the first water-soluble film, the second water-soluble film and third water-soluble film each independently have a surfactant content in a range of about 0.1% to about 3.5%, or about 0.5% to about 2% by weight of the respective film.

F25. The method according to any one of F4-F24, wherein the first water-soluble film, the second water-soluble film, and the third water-soluble film each individually have a residual moisture content of at least 4%, or in a range of about 4% to about 15%, or about 5% to about 10% by weight of the water-soluble film as measured by Karl Fischer titration.

F26. The method according to any one of F1-F25, wherein each film independently comprises one or more components in the group of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

F27. The method according to F26, wherein each film independently comprises one or more plasticizers in an amount in a range of about 5% to about 50%, or about 10% to about 40%, or about 20% to about 30% by weight of the individual film, optionally wherein the plasticizer is selected from polyols, sugar alcohols, or a mixture thereof, optionally wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof.

F28. The method according to any one of F4-F27, further comprising forming at least a third compartment, optionally at least a third and a fourth compartment between the second water-soluble film and the third water-soluble film, optionally;
   wherein the second compartment and the third compartment, optionally the second compartment, the third compartment and the fourth compartments are positioned side-by-side to one another and wherein the second compartment and the third compartment, optionally the second compartment, the third compartment and the fourth compartment are positioned above the first compartment.

F29. The method according to any one of F1-F28, wherein the composition comprises a household care composition which is not a laundry or automatic dishwashing composition, provided that the first-water soluble film and the third water-soluble film do not comprise a polyvinyl alcohol resin comprising;
   i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
   ii. a second PVOH polymer wherein the second PVOH polymer is a homopolymer wherein the homopolymer consists of vinyl alcohol monomer units and optionally vinyl acetate monomer units.

F30. The method according to F29, wherein the composition is selected from the group consisting of light duty liquid detergent compositions, heavy duty liquid detergent compositions, hard surface cleaning compositions, bleaching compositions, shampoos, body washes, other personal care compositions, and mixtures thereof.

F31. The method according to any one F1-F28, wherein the composition comprises a non-household care composition.

F32. The method according to F31, wherein the non-household care composition is selected from the group consisting of agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, compositions containing one or more active agents selected from agriculture active agents, ingestible active agents, liquid treatment active agents, industrial active agents, and combinations of any of the foregoing.

The dimensions and values disclosed herein are not to be understood as being strictly limited to the exact numerical values recited. Instead, unless otherwise specified, each such dimension is intended to describe in the alternative the recited value, and a functionally equivalent range surrounding that value. For example, a dimension disclosed as "about 40 mm" is an implicit disclosure of "40 mm" which is hereby made explicit.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

All patents, publications and references cited herein are hereby fully incorporated by reference. In case of conflict between the present disclosure and incorporated patents, publications and references, the present disclosure should control.

EXAMPLES

The effect of presence versus absence of an anionic polyvinyl alcohol copolymer, as well as the effect of varying average molecular weight, expressed as a 4% viscosity of an aqueous polymer solution (deionized water), of a polyvinyl alcohol homopolymer blend within a polyvinyl alcohol blend comprising polymer resin, has been studied on 1) the sensitivity of the corresponding water-soluble film to create a foam layer at the film surface upon sealing solvent application, 2) the resulting seal and unit dose article strength, as well as 3) the film/unit dose article dissolution profile.

Test Materials:
Water-Soluble Films:

Solvent-casted water-soluble test films single variably differing on polyvinyl alcohol type selection were provided by MonoSol LLC. The test films comprised 65% of a water-soluble polyvinyl alcohol resin, the remainder being water, plasticizer, surfactant, and other materials typically present inside water-soluble films. The test films were sealed in a manner contemplated for the "second water soluble film" described as part of the invention above, creating structures in a manner contemplated for the "second water soluble film" described as part of the invention above. Accordingly, the test films falling outside the scope of the "second water soluble film" described above are characterized as comparative examples.

Comparative examples 1 to 4 comprised 15% to 30% by weight of the polyvinyl alcohol polymer resin of an anionic copolymer in the middle film (Film 2). Comparative examples 5 to 7 comprised a polyvinyl alcohol homopolymer blend with different average viscosities.

Example 1 comprises a polyvinyl alcohol homopolymer blend with an average viscosity according to the invention. Additional resins are described below:

anionic polyvinyl alcohol copolymer comprising resins (%'s by weight of polyvinyl alcohol polymeric resin):
Comparative Example 1: polyvinyl alcohol blend comprising 70% polyvinyl alcohol homopolymer (13 mPa·s, dH 86%)-30% methyl maleate based anionic polyvinyl alcohol copolymer (4% anionic substitution, 18 mPa·s, 90% dH)
Comparative Example 2: polyvinyl alcohol blend comprising 85% polyvinyl alcohol homopolymer (13 mPa·s, dH 86%)-15% methyl maleate based anionic polyvinyl alcohol copolymer (4% anionic substitution, 18 mPa·s, 90% dH)
Comparative Example 3: polyvinyl alcohol blend comprising 85% polyvinyl alcohol homopolymer (8 mPa·s, dH 88%)-15% methyl maleate based anionic polyvinyl alcohol copolymer (4% anionic substitution, 18 mPa·s, 90% dH)
Comparative Example 4: polyvinyl alcohol blend comprising 85% polyvinyl alcohol homopolymer (18 mPa·s, dH 88%)-15% methyl maleate based anionic polyvinyl alcohol copolymer (4% anionic substitution, 18 mPa·s, 90% dH)
Resins consisting of polyvinyl alcohol homopolymer (%'s by weight of polyvinyl alcohol polymeric resin):
Comparative Example 5: 100% polyvinyl alcohol homopolymer (13 mPa·s, dH 86%)
Comparative Example 6: polyvinyl alcohol homopolymer blend comprising 80% polyvinyl alcohol homopolymer (13 mPa·s, dH 86%)-20% polyvinyl alcohol homopolymer (8 mPa·s, dH 88%)—average viscosity: 12 mPa·s
Comparative Example 7: polyvinyl alcohol homopolymer blend comprising 80% polyvinyl alcohol homopolymer (13 mPa·s, dH 86%)-20% polyvinyl alcohol homopolymer (18 mPa·s, dH 88%)—average viscosity: 14 mPa·s Inventive Example 1: polyvinyl alcohol homopolymer blend comprising 60% polyvinyl alcohol homopolymer (13 mPa·s, dH 86%)-40% polyvinyl alcohol homopolymer (8 mPa·s, dH 88%)—average viscosity: 11 mPa·s Water-Soluble Unit Dose Articles:

These water-soluble test films were used to create water soluble unit dose articles. A first water-soluble film comprising a polyvinyl alcohol blend comprising 60% polyvinyl alcohol homopolymer (23 mPa·s, dH 87%) and 40% methyl maleate based anionic polyvinyl alcohol copolymer (4% anionic substitution, 18 mPa·s, 90% dH), as provided by the MonoSol company, was drawn into a mould comprising 2 side-by-side cavities under influence of vacuum to create open compartments. A detergent composition was dosed inside of these open compartments, followed by closing the open filled compartments with each of above test films, individually. The side-by-side configuration represents the top compartment configuration, as displayed in FIG. 1. The two films were sealed together with water, the sealing water being pre-applied on the test films through a pre-wetted felt roll on the surface of the test film facing the first water-soluble film. Target sealing water coat weight was 9 gram of water per square meter of water-soluble film. A third water-soluble film of the same composition as the first water-soluble film was drawn into a separate mold comprising a single cavity under influence of vacuum in order to create an open compartment. A detergent composition was dosed inside the open compartment prior to closing the open compartment with the side-by-side compartment unit dose article created as described above, in order to create a water-soluble unit dose article having the appearance as displayed in FIG. 1 and as sold under the Fairy NonBio brand by the Procter and Gamble company in the UK in July 2020, yet with different films. Sealing water was pre-applied on the test films through a pre-wetted felt roll on the surface of the test films facing the third water-soluble film. Target sealing water coat weight was 13 gram of water per square meter of water-soluble film. All water soluble films used had a starting thickness prior to article creation, e.g. prior to deformation, of 76 micron.

Liquid Laundry Detergent Compositions:

The respective liquid laundry detergent compositions, as added into the individual compartments described in the water-soluble unit dose article section above, are summarized in Table 1. Liquid laundry detergent compositions were prepared through mixing of the individual components in a batch process.

TABLE 1

Liquid laundry detergent formulations

| 100% active | Bottom compartment | Top compartment 1 | Top compartment 2 |
|---|---|---|---|
| Neodol 24/7 ethoxylated alcohol nonionic surfactant | 3.2 | 1.8 | 1.5 |

TABLE 1-continued

Liquid laundry detergent formulations

| 100% active | Bottom compartment | Top compartment 1 | Top compartment 2 |
|---|---|---|---|
| Linear alkylbenzene sulphonic acid | 27.6 | 21.8 | 17.7 |
| MEA-A24E3S | 7.9 | 11.5 | 8.9 |
| Citric acid | 0.7 | 0.6 | 0.5 |
| Fatty acid | 11.4 | 4.7 | 3.7 |
| Ethoxylated polyethyleneimine* | 1.6 | 1.4 | 1.1 |
| Zwitterionic polyamine ** | 1.6 | 1.6 | 1.3 |
| HEDP | 0.7 | 2.0 | 1.6 |
| Texcare SRA300 | — | 4.4 | — |
| Polyquaternium 10*** | — | — | 7.8 |
| FWA 49 | 0.3 | 0.1 | 0.1 |
| Antifoam (AF8017) | 0.3 | — | — |
| 1,2-propanediol | 15.6 | 24.1 | 23.2 |
| Glycerol | 5.3 | 7.6 | 3.3 |
| PPG (MW 400) | — | — | 12.7 |
| Monoethanolamine (pH trimming agent) | 9.6 | 9.5 | 7.3 |
| K2SO3 | 0.5 | 0.4 | 0.4 |
| MgCl2 | 0.1 | 0.3 | 0.2 |
| Water | 1.9 | 8.6 | 8.7 |
| Acusol 880 | — | — | 0.6 |
| Hydrogenated castor oil | 0.1 | 0.8 | 0.2 |
| Minors (perfume, dyes, antioxidant, ...) | Balance to 100% | Balance to 100% | Balance to 100% |
| pH (as 10% aqueous solution) | 7.4 | 7.4 | 7.4 |

*ethoxylated polyethyleneimine having an average degree of ethoxylation of 20 per EO chain and a polyethyleneimine backbone with MW of about 600

**Lutensit Z96: partially sulfate polyethoxylated hexamethylenediamine, as available from the BASF company

***premix composition: 37 wt % cationic hydroxyethyl cellulose, 60 wt % PPG400, 3 wt % Acusol 880 - premix components reflected in above formula composition Test Results Presence Versus Absence of Foam Layer:

Water-soluble test films have been visually assessed for the presence versus absence of a foam layer created at the water-soluble film surface after the sealing water application step on the test film prior to contacting the third water-soluble film as described above. The results summarized in Table 2 below clearly show that water-soluble films comprising a water-soluble resin comprising 15 to 30% of an anionic copolymer (comparative examples 1 to 4) are sensitive to creating a foaming layer at the surface of the water-soluble film upon sealing water application, contrary to water-soluble films comprising a polymeric resin consisting of a polyvinyl alcohol homopolymer (blend) (inventive example 1 and comparative examples 5 to 7). This foam layer is believed to drive an inhomogeneous spreading of the sealing water, leading to an inferior seal quality and the presence of weakly sealed spots accordingly.

TABLE 2

Presence versus absence of foam layer

| | Comparative Example 1 | Comparative Example 2 | Comparative Example 3 | Comparative Example 4 | Comparative Example 5 | Comparative Example 6 | Comparative Example 7 | Inventive Example 1 |
|---|---|---|---|---|---|---|---|---|
| Foam layer | present | present | present | present | absent | absent | absent | absent |

% Pouch strength pass rate and % seal failure:

% Pouch Strength Pass Rate and % Seal Failure:
Test Method:

This test method describes the practice for determining the % pouch strength pass rate and % seal failure using a Mark-10 testing instrument ESM750SLCE (j.j. bos b.v., Marconistraat 1, NL-2809 PH Gouda, The Netherlands) with a load cell of maximum 100 kN (kilo Newton). Under the effect of external compression force, a pouch deforms, building stress on both the film and the seal area. The internal pressure in the pouch depends on the outside applied force on the overall pouch surface area. Pouch strength (in Newtons) is defined as the maximum compression force required by two parallel plates to increase the internal pressure of the pouch up to the point of burst. Pouches bursting at the seal area are reported as "seal failures" used in the calculation of the % Seal Failure rate (Seal Failure=1, No Seal Failure=0) across 18 replicates. Pouches bursting at a pressure equivalent to the one generated by compression with less than 300N are reported as "failures" used in the calculation of the % Pouch Strength Pass rate (Failure=0, Pass=1) across 18 replicates.

The % pouch strength pass rate and % seal failure were measured after having stored the water-soluble pouches for 7 days at ambient conditions, and pre-conditioned for 16-24 h at 23° C./50% RH. The method is performed in a room environment between 40-50% relative humidity (RH) and at a temperature between 22-24° C. Water-soluble pouches are tested within one hour of taking them out of the pre-conditioning.

Figure 2:
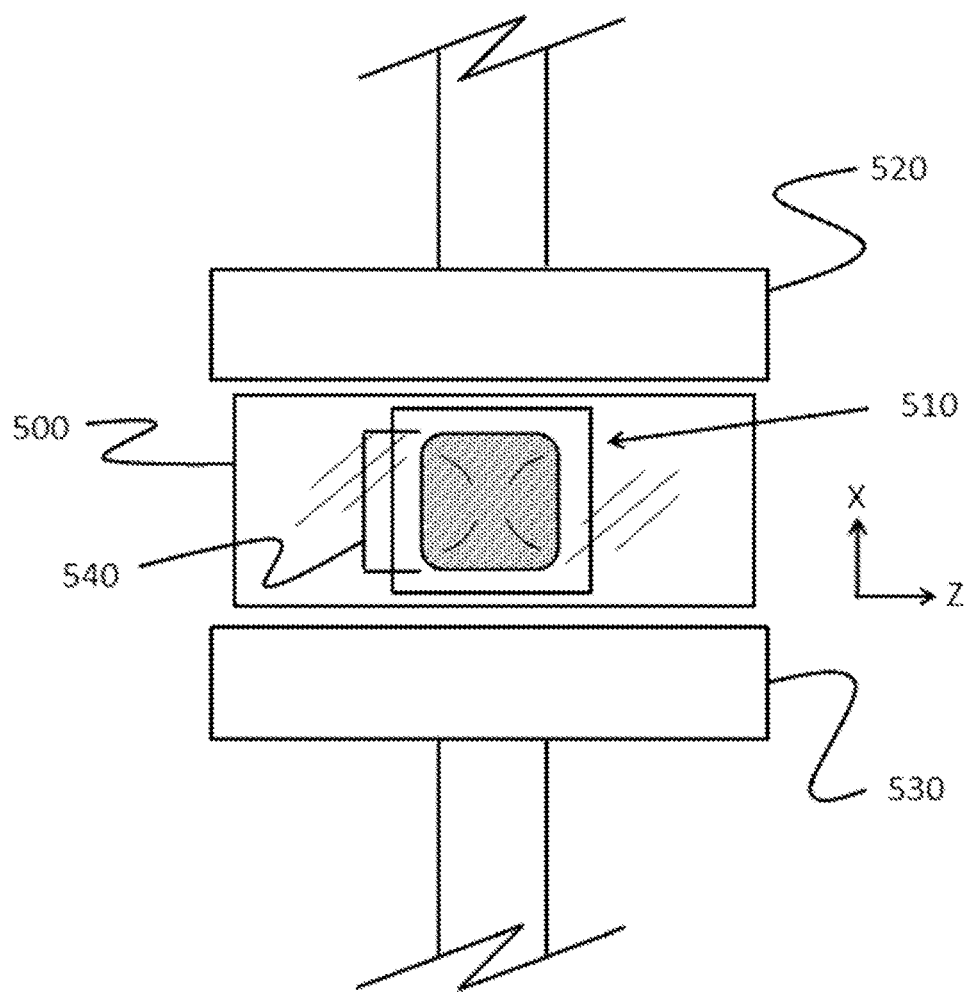
FIG. 2 shows a schematic illustration of the basic configuration of the % pouch strength pass rate and % seal failure test.

FIG. 2 shows a schematic illustration of the basic configuration of the % pouch strength pass rate and % seal failure test. To measure % pouch strength pass rate and % seal failure, a pouch 510 is enclosed in a plastic bag 500 and subsequently sealed (150 mm by 124 mm with closure, 60 micron thick—e.g. Raja grip RGP6B) to prevent contamination of the working environment upon pouch rupture. The pouch 510 is centered in the bag 500, and placed between two compression plates 520, 530 of the instrument. The pouch 510 is placed in an upright position, so that the width seal dimension 540 (e.g. smallest dimension within a defined rectangular plane just encompassing the seal area, 41 mm in actual pouches tested) is between the compression plates (x-direction) such that the stress will be applied on the width seal. Herefore the diameter of the compression plates needs to be big enough in order not to pinch the pouch as it deforms (here D=116 mm). For the compression, the speed of decreasing the distance between the plates 520 and 530 is set at 200 mm/min. 18 replicates are conducted per test leg, and % pouch strength pass rate and % seal failure data across those 18 replicates are reported.

Test Results:

The results summarized in Table 3 clearly show that water-soluble unit-dose articles comprising a water-soluble test film comprising a polyvinyl alcohol based polymer resin consisting of a homopolymer blend with an average viscosity profile according to the invention (Inventive Example 1) have a superior pouch strength and seal failure profile compared to water-soluble unit-dose articles comprising a water-soluble test film comprising a polyvinyl alcohol based polymer resin consisting of a homopolymer blend with an average viscosity profiles according to comparative examples 5 to 7, as well as when compared to water-soluble unit-dose articles comprising a water-soluble test film comprising a polyvinyl alcohol based polymer resin comprising from 15% to 30% of an anionic polyvinyl alcohol copolymer (comparative examples 1 to 4).

TABLE 3

Pouch strength and seal failure

| | Comparative Example 1 | Comparative Example 2 | Comparative Example 3 | Comparative Example 4 | Comparative Example 5 | Comparative Example 6 | Comparative Example 7 | Inventive Example 1 |
|---|---|---|---|---|---|---|---|---|
| % Pouch Strength Pass rate* | 0 | 13 | 100 | 42 | 46 | 54 | 63 | 100 |
| % seal failure** | 100 | 96 | 4 | 75 | 67 | 63 | 63 | 0 |

*The higher the better
**The lower the better

Water-Soluble Unit Dose Article Dissolution—Film Residue

Test Method:

This test method describes a water-soluble unit dose article dissolution test, in which the amount of undissolved water-soluble film residues is assessed. More particularly, this method is designed to assess the relative dissolution properties of laundry water-soluble unit dose articles under stressed washing machine conditions. For this method, Electrolux Programmable Washing machines type W565H comprising a ballast load with a mix of Cotton and Polycotton pieces (from Calderon Textiles, LLC 6131 W 80th Street Indianapolis, Ind. 46278) were used. Ballast loads are comprised of cotton and polycotton knit, double-ply swatches approximately 50×50 cm in size.

Orange pouches: Brand new Cotton white ballast load from Calderon 50×50 cm was divided into portions of max 3.0 kg (~25 items of ballast cotton) and prepared to be colored into orange through a washing-machine dying process, using commercially available dying solutions. To color the load, any standard household washing machine can be used, employing a standard cotton cycle at 40° C. 350 g of the Dylon fresh orange machine dye all-in-one are added to the drum of the washing machine. Salt may be added, depending on the dye package instructions.

The drum was consequently manually moved to the left and the right until the dye was not visible anymore. 25 items of cotton ballast (size of 50 cm×50 cm), were consequently evenly distributed over the drum without folding of the items. A standard cotton cycle at 40° C. was run at a water hardness of 15 gpg. After completion of the cycle 75 g of Ariel Professional powder was added into the dispenser and a normal cotton cycle at 40° C. was run at a water hardness of 15 gpg (grains per gallon). After completion of this cycle, 2 additional normal cotton cycles at 40° C. without any detergent were run at a water hardness of 15 gpg, followed by line-drying the items.

To note: Brand new Calderon load must be desized before coloring them by adding 25 items into a front loading Miele washing machine and running 2 short cotton cycles at 60° C. (approximate duration of 1 hour 30 minutes) with 50 g of Ariel sensitive powder and a water hardness of 15 gpg, followed by running 2 more short cotton cycles at 60° C. (approximate duration of 1 hour 30 minutes) with no detergent and a water hardness of 15 gpg, followed by tumble drying.

The orange fabrics are then cut into 48×48 cm pieces, folded in half, cut in half and sewn at the sides into 4 equivalent pouches of 22×22 cm with the top side open. One test product of a pre-conditioned water-soluble unit dose article is placed at the bottom right corner of the orange pouch, and the pouch is stitched closed. The water-soluble unit dose article must be pre-conditioned for a minimum of 2 weeks at 23° C., 50% rH before testing.

Load: 4 loads of 3 kg of mixed cotton (13 pieces) and polycotton (10 pieces) were desized before use by washing in a short cotton cycle at 60° C. with 79 g of Ariel Professional detergent at a water hardness of 15 gpg, followed by another short cotton cycle at 60° C. without any detergent at a water hardness of 15 gpg, and finally tumble-dried. Each load of 3.1 kg is pre-treated 2 times by washing with 4 Ariel pods in the "prewet" cycle, followed by a wash without detergent in the "dissolution program" described below, and finally tumble-dried.

The Electrolux W565 programmable washing machines were programmed with 2 programs. The first program was designed to equally wet the load (pre-wet program). The second program (dissolution program) was utilized to simulate 125 min of a Western Europe stressed cycle setting, followed by pumping out the water and starting a spin of 3 min at 1100 rpm.

|  |  | Pre-wet program | Dissolution program |
|---|---|---|---|
| Wash | Time | 5 min | 15 min |
|  | Motor rotation | 49 rpm | 59 rpm |
|  | Water intake | 12 L | 13.4 L |
|  | Heating | 20° C. | 20° C. |
|  | Water Hardness | 15 gpg | 15 gpg |
|  | Motor action time clockwise | 28 s | 20 s |
|  | Motor resting time | 12 s | 20 s |
|  | Motor action time Counterclockwise | 28 s | 28 s |

-continued

|  |  | Pre-wet program | Dissolution program |
|---|---|---|---|
| Drain | Draining time | 1 min | 20 s |
|  | Motor rotation | 20 rpm | 49 rpm |
| Extraction | Time | 30 s | 3 min |
|  | Motor rotation | 900 rpm | 1100 rpm |

A load consisting of 13 pieces of 50×50 cm of cotton and 10 pieces of 27×27 cm of polycotton (weighed at 3.0+/−0.15 kg) was evenly introduced in the Electrolux W565 washing machine and the pre-wet program was run 2 times.

After the pre-wet program, the wet ballast was taken out of the drum and 4 orange pouches containing each a different test leg water soluble unit dose article were aligned at the bottom of the drum, hence 4 different test products are tested at once in the same washing machine in order to render the testing environment as reproducible as possible across the test legs. 10 g of suds suppressor (Dowsil GP-4314 silicone suds suppressor, commercially available from the Dow Corning company) was added in the dispenser, and the wet load was placed on top of the orange pouches, without allowing the drum to move. The dissolution program was initiated. At the end of the full program, the orange pouches were transferred to a grading room (equipped with D65 lighting conditions) to be assessed for residues by expert graders.

The orange pouches are cut and graded visually, within 30 min after the end of each run, according a scale of 0 to 7 (0=No film residue, 7=Full pouch residue). The final score is calculated as the average of 4 external replicates, i.e. 4 different washing machine runs, and repeated 2 times (average of 8 scores).

Test Results:

The results summarized in Table 4 clearly show that water-soluble unit-dose articles comprising a water-soluble test film comprising a polyvinyl alcohol based polymer resin consisting of a homopolymer blend with an average viscosity profile according to the invention (Inventive Example 1), despite having a superior pouch strength, do not demonstrate a dissolution compromise compared to tested water-soluble unit-dose articles comprising a water-soluble test film comprising a polyvinyl alcohol based polymer resin consisting of a polyvinyl alcohol homopolymer blend with an average viscosity profile according to comparative examples 5 to 6, as well as compared to tested water-soluble unit-dose articles comprising a water-soluble test film comprising a polyvinyl alcohol based polymer resin comprising 15% of an anionic polyvinyl alcohol copolymer comparative examples 2 to 3.

TABLE 4

Film residue grading

|  | Comparative Example 2 | Comparative Example 3 | Comparative Example 5 | Comparative Example 6 | Inventive Example 1 |
|---|---|---|---|---|---|
| Average film residue grading* | 1.44 | 1.50 | 1.91 | 1.72 | 1.38 |

*The lower the better

Test Method:

This methodology is used to determine the tensile force required to peel solution-sealed water-soluble films (seal peel strength). An INSTRON tensile testing apparatus or equivalent is used for the collection of film data. An ESI-PROOF proofing apparatus or equivalent with an anilox roller 140/10 is used to secure two sheets of film with deionized water. A minimum of three test specimens, each cut with reliable cutting tools to ensure dimensional stability and reproducibility, are tested in the machine direction (MD) for each measurement. Tests are conducted in the standard laboratory atmosphere of 23±2.0° C. and 35±5% relative humidity.

For seal peel strength determination, test specimens are prepared by cutting two 4"×12" (10.2 cm×30.5 cm) film sheets with the 12" (30.5 cm) dimension in the machine direction (MD) (where applicable). For one sheet, the four corners are taped to a surface with the film matte surface facing upward. The other sheet is overlaid on top of one of the taped sheet so that the matte surfaces are in contact. A 4-inch (10.2 cm) end of the top sheet is taped to secure it to the bottom sheet. The loose end of the top sheet is threaded through the ESIPROOF proofing roller using the 140/10 anilox roller. An amount of 0.5 mL of the test sealing solution (water) is applied to the doctor blade. The roller is pulled at a constant speed (3", 7.6 cm per second) to coat the upper film and to secure it to the lower sheet. The film is allowed to weld for a period of about 10 minutes to 15 minutes, thereby forming a seal but leaving two unsealed (free) film flaps on one end of the test specimen for subsequent peel testing. The sealed sample is then transferred to the INSTRON tensile testing machine to proceed with testing while minimizing exposure in the 35% relative humidity environment. The tensile testing machine is prepared according to the manufacturer instructions, equipped with a 500 N load cell, and calibrated. The correct grips and faces are fitted.

For the peel test, there is a 0.50" (1.27 cm) separation between the rubber grips, all four of which are flat and square. Three (or more) 1"-wide (2.54 cm) samples are cut in the machine direction (MD). The unsealed flaps of each sample are placed in the grips of the testing machine, taking care to ensure that the specimen is aligned with the grips and parallel to them, and that the specimen is not pulled too tightly in the tester's jaws. The load is balanced and the test is initiated according to the instructions of the equipment manufacturer. At the end of the test, the Absolute Positive Force (APF in Newtons) required to tear or separate the layers is recorded as the seal peel strength.

Additional Test Materials:

Solvent-casted water-soluble test films were prepared with various levels of copolymer content. The test films comprised about 65%-77% of one or more water-soluble polyvinyl alcohol resins in the ratios described below, the remainder being water, plasticizer, surfactant, and other materials typically present inside water-soluble films. The test films of Comparative Examples 8-9 were sealed in a manner contemplated for the "first water soluble film" or "third water soluble films" described as part of the invention above, with either the film of Comparative Example 1, or Inventive Example 1 as the "second water soluble film".

Comparative Example 8: polyvinyl alcohol blend comprising 60% polyvinyl alcohol homopolymer (23 mPa·s, dH 87%)-40% methyl maleate based anionic polyvinyl alcohol copolymer (4% anionic substitution, 18 mPa·s, dH 90%).

Comparative Example 9: polyvinyl alcohol blend comprising 32% polyvinyl alcohol homopolymer (23 mPa·s, dH 88%)-68% methyl maleate based anionic polyvinyl alcohol copolymer (4% anionic substitution, 18 mPa·s, dH 90%).

Comparative Example 10: polyvinyl alcohol homopolymer blend comprising 75% polyvinyl alcohol homopolymer (23 mPa·s, dH 88%)-25% polyvinyl alcohol homopolymer (6 mPa·s, dH 88%)

Comparative Example 11: 100% methyl maleate based anionic polyvinyl alcohol copolymer (4% anionic substitution, 18 mPa·s, dH 90%).

Test Results:

Results for the peel strengths of each of Comparative Examples 8-11 sealed to Comparative Example 1, and for each of Comparative Examples 8-11 sealed to Inventive Example Film 1, are shown in the table below. In each case, the film of Inventive Example 1 demonstrated higher mean seal peel strength, i.e. regardless of whether the first water soluble film contained no anionic polyvinyl alcohol copolymer content, 100% anionic polyvinyl alcohol copolymer content, or an intermediate amount of anionic polyvinyl alcohol copolymer content.

| | Film 1: | | | | | | | |
|---|---|---|---|---|---|---|---|---|
| | C. Ex. 8 | | C. Ex. 9 | | C. Ex. 10 | | C. Ex. 11 | |
| Film 2: | C. Ex. 1 | I. Ex. 1 | C. Ex. 1 | I. Ex. 1 | C. Ex. 1 | I. Ex. 1 | C. Ex. 1 | I. Ex. 1 |
| Mean APF in Newtons (Std. Dev) | 10.261 (0.813) | 11.931 (1.185) | 10.853 (0.611) | 13.033 (1.184) | 5.108 (0.956) | 5.799 (0.788) | 9.418 (0.404) | 10.880 (0.224) |

OVERALL CONCLUSION

From the data summarized across the different examples it is clear that water-soluble films comprising a polyvinyl alcohol based resin consisting of a polyvinyl alcohol homopolymer blend according to the invention, comprising a viscosity profile according to the invention do not form a foam layer upon sealing solvent application, leading into a superior seal and pouch strength profile while not leading to a dissolution compromise, compared to comparative water-soluble film compositions outside the scope of the invention.

What is claimed is:

1. A water-soluble unit dose article comprising at least two compartments and optionally containing a composition housed in at least one of the compartments, wherein the unit dose article comprises:
   a. A first water-soluble film, wherein the first water-soluble film has a first side and a second side, and wherein the first water soluble film comprises a first PVOH resin wherein the first polyvinyl alcohol resin comprises;
      i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. a second PVOH polymer wherein the second PVOH polymer is a homopolymer wherein the homopolymer consists of vinyl alcohol monomer units and optionally vinyl acetate monomer units;

b. A second water-soluble film, wherein the second water-soluble film has a first side and a second side, and wherein the second water-soluble film comprises a second polyvinyl alcohol resin wherein the second polyvinyl alcohol resin comprises;

i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. about 85% to about 100% by weight of the second polyvinyl alcohol resin of a polyvinyl alcohol homopolymer or a homopolymer blend, wherein the homopolymers consist of vinyl alcohol monomer units and optionally vinyl acetate monomer units; wherein the second polyvinyl alcohol resin has an average viscosity in a range of about 8 mPa·s to less than 12 mPa·s, measured as a 4% polyvinyl alcohol polymer solution in deionized water at 20° C.; and c. A third water-soluble film wherein the third water-soluble film has a first side and a second side, and wherein the third water soluble film comprises a third polyvinyl alcohol resin, wherein the third polyvinyl alcohol resin optionally comprises:

i. a first PVOH polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. a second PVOH polymer wherein the second PVOH polymer is a homopolymer wherein the homopolymer consists of vinyl alcohol monomer units and optionally vinyl acetate monomer units;

wherein the first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment;

provided that when a composition is housed in at least one of the compartments then the composition is not a household care composition.

2. The water-soluble unit dose article according to claim 1, wherein the second polyvinyl alcohol resin comprises about 90% to about 100% by weight of the second polyvinyl alcohol resin of the polyvinyl alcohol homopolymer or polyvinyl alcohol homopolymer blend, and about 0% to about 10% by weight of the second polyvinyl alcohol resin of the polyvinyl alcohol polymer comprising carboxylated anionic monomer units, vinyl alcohol monomer units and optionally vinyl acetate monomer units, wherein the carboxylated anionic monomer unit is derived from a member selected from the group consisting of maleic acid, monoalkyl maleate, dialkyl maleate, maleic anhydride, and combinations thereof.

3. The water-soluble unit dose article according to claim 1, wherein the second polyvinyl alcohol resin comprises a blend of a first polyvinyl alcohol homopolymer and a second polyvinyl alcohol homopolymer.

4. The water-soluble unit dose article according to claim 3, wherein in the second polyvinyl alcohol resin the first polyvinyl alcohol homopolymer and second polyvinyl alcohol homopolymer are present in a relative weight ratio in a range of about 90/10 to about 10/90.

5. The water-soluble unit dose article according to claim 3, wherein in the second polyvinyl alcohol resin;

a. the first polyvinyl alcohol homopolymer has an average viscosity in a range of about 11 mPa·s to about 20 mPa·s, measured as a 4% polyvinyl alcohol polymer solution in deionized water at 20° C.; and b. the second polyvinyl alcohol homopolymer has an average viscosity in a range of about 1 mPa·s to about 10 mPa·s, measured as a 4% polyvinyl alcohol polymer solution in deionized water at 20° C.

6. The water-soluble unit dose article according to claim 5, wherein in the second polyvinyl alcohol resin the difference in average viscosity of the first polyvinyl alcohol homopolymer and the second polyvinyl alcohol homopolymer is at least 1mPa·s.

7. The water-soluble unit dose article according to claim 3, wherein the individual polyvinyl alcohol homopolymers independently have an average degree of hydrolysis in a range of about 75% to about 99%.

8. The water-soluble unit dose article according to claim 1, wherein a. the first polyvinyl alcohol resin is present in an amount a range of about 50% to about 95% by weight of the first water-soluble film, or b. the second polyvinyl alcohol resin is present in an amount in a range of about 50% to about 95% by weight of the second water-soluble film, or c. the third polyvinyl alcohol resin is present in an amount in a range of about 50% to about 95% by weight of the third water-soluble film; or d. any combination of features (a) to (c).

9. The water-soluble unit dose article according to claim 1, wherein each carboxylated anionic monomer unit in the first water-soluble resin and in the third water-soluble resin is independently derived from a monoalkyl maleate unit.

10. The water-soluble unit dose article according to claim 1, wherein the second polyvinyl alcohol resin comprises a polyvinyl alcohol polymer comprising a carboxylated anionic monomer unit derived from a monoalkyl maleate unit, wherein the carboxylated anionic monomer unit is present in the polyvinyl alcohol polymer comprising a carboxylated anionic monomer unit in an average amount of at least 3 mol. %.

11. The water-soluble unit dose article according to claim 1, wherein each first PVOH polymer in the first water-soluble resin and third water-soluble resin is independently characterized by:

a. an average viscosity of in a range of about 10 mPa·s to about 40 mPa·s, measured as a 4% polyvinyl alcohol polymer solution in deionized water at 20° C.; or b. an average degree of hydrolysis in a range of about 60% to about 99%; or
c. a combination of any of the foregoing
and, wherein each second PVOH polymer in the first water-soluble resin and third water-soluble resin is independently characterized by:
d. an average viscosity of in a range of about 3 mPa·s to about 30 mPa·s, measured as a 4% polyvinyl alcohol polymer solution in deionized water at 20° C.; or
e. an average degree of hydrolysis in a range of about 60% to about 99%; or
f. a combination of any of the foregoing.

12. The water-soluble unit dose article according to claim 1, wherein the polyvinyl alcohol polymer comprising carboxylated anionic monomer units, vinyl alcohol monomer units and optionally vinyl acetate monomer units in the second polyvinyl alcohol resin is characterized by;
a. an average viscosity in a range of about 10 mPa·s to about 40 mPa·s, measured as a 4% polyvinyl alcohol polymer solution in deionized water at 20° C., or
b. an average degree of hydrolysis in a range of about 60% to about 99%, or
c. a combination of any of the foregoing.

13. The water-soluble unit dose article according to claim 1, wherein independently in the first water-soluble film and in the third water-soluble film, the relative weight ratio of the first PVOH polymer and second PVOH polymer is in a range of about 90/10 to about 10/90.

14. The water-soluble unit dose article according to claim 1, wherein the first water-soluble film, the second water-soluble film and the third water-soluble film each independently has a surfactant content in a range of about 0.1% to about 3.5% by weight of the respective film.

15. The water-soluble unit dose article according to claim 1, wherein the first water-soluble film, the second water-soluble film, and the third water-soluble film each individually has a residual moisture content of at least 4% by weight of the water-soluble film as measured by Karl Fischer titration.

16. The water-soluble unit dose article according to claim 1, wherein each film independently comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

17. The water-soluble unit dose article according to claim 16, wherein each film independently comprises one or more plasticizers in an amount in a range of 5% to about 50% by weight of the individual film.

18. The water-soluble unit dose article according to claim 1, wherein the first water-soluble film and the second water-soluble film are sealed via solvent sealing, heat sealing or a combination thereof; and/or
wherein the second water-soluble film and the third water-soluble film are sealed via solvent sealing, heat sealing or a combination thereof.

19. The water-soluble unit dose article according to claim 18, wherein the first water-soluble film and the second water-soluble film are sealed via solvent sealing, and the solvent sealing solution comprises an aqueous solvent.

20. The water-soluble unit dose article according to claim 1, wherein the unit dose article comprises at least a third compartment between the second water-soluble film and the third water-soluble film.

21. The water-soluble unit dose article according to claim 1, wherein the package comprises a non-household care composition housed in at least one of the compartments.

22. The water-soluble unit dose article according to claim 21, wherein the package comprises a non-household care composition housed in each compartment.

23. The water-soluble unit dose article according to claim 21, wherein the non-household care composition is selected from the group consisting of agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, compositions containing one or more active agents selected from agriculture active agents, ingestible active agents, liquid treatment active agents, industrial active agents, and combinations of any of the foregoing.

24. A process of making a water-soluble unit dose article according to claim 1, comprising the steps of;
a. deforming the first water-soluble film in a mould to create an open cavity, optionally via thermoforming, vacuum forming, or a combination thereof;
b. filling the open cavity with a composition;
c. separately deforming the third water-soluble film in a mould to create at least one open cavity, optionally via thermoforming, vacuum forming, or a combination thereof;
d. filling the at least one open cavity from step (c) with a composition;
e. closing the open filled cavity from step (d) with the second water-soluble film;
f. sealing the second water-soluble film to the third water-soluble film to create a closed intermediate;
g. closing the open filled cavity from step (b) with the closed intermediate from step (f); and
h. sealing the first water-soluble film to the second water-soluble film to create the water-soluble unit dose article.

25. The process according to claim 24, wherein the second water-soluble film and the third water-soluble films are sealed via solvent sealing.

26. The process according to claim 24, wherein the first water-soluble film in step (a) and the third water-soluble film in step (c) are the same prior to deforming.

27. A water-soluble unit dose article comprising at least two compartments and containing a composition housed in at least one of the compartments, wherein the unit dose article comprises:
a. A first water-soluble film, wherein the first water-soluble film has a first side and a second side, and wherein the first water soluble film comprises a first PVOH resin wherein the first polyvinyl alcohol resin is present in an amount in a range of about 50% to about 95% by weight of the first water-soluble film and comprises;
i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
ii. a second PVOH polymer wherein the second PVOH polymer is a homopolymer wherein the homopolymer consists of vinyl alcohol monomer units and optionally vinyl acetate monomer units;

b. A second water-soluble film, wherein the second water-soluble film has a first side and a second side, and wherein the second water-soluble film comprises a second polyvinyl alcohol resin wherein the second polyvinyl alcohol resin is present in an amount in a range of about 50% to about 95% by weight of the second water-soluble film and comprises;
　i. less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
　ii. about 85% to about 100% by weight of the second polyvinyl alcohol resin of a polyvinyl alcohol homopolymer blend, wherein the homopolymers consist of vinyl alcohol monomer units and optionally vinyl acetate monomer units;
　wherein the second polyvinyl alcohol resin has an average viscosity in a range of about 8 mPa·s to less than 12 mPa·s, and comprises a first polyvinyl alcohol homopolymer having an average viscosity in a range of about 11 mPa·s to about 20 mPa·s and a second polyvinyl alcohol homopolymer having an average viscosity in a range of about 1 mPa·s to about 10 mPa·s, the viscosities measured as a 4% polyvinyl alcohol polymer solution in deionized water at 20° C., and the individual polyvinyl alcohol homopolymers independently have an average degree of hydrolysis in a range of about 75% to about 99%; and c. A third water-soluble film wherein the third water-soluble film has a first side and a second side, and wherein the third water soluble film comprises a third polyvinyl alcohol resin, wherein the third polyvinyl alcohol resin is present in an amount in a range of about 50% to about 95% by weight of the third water-soluble film and comprises:
　i. a first PVOH polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
　ii. a second PVOH polymer wherein the second PVOH polymer is a homopolymer wherein the homopolymer consists of vinyl alcohol monomer units and optionally vinyl acetate monomer units;

wherein the first water-soluble film, the second water-soluble film and the third water-soluble film each independently have a surfactant content in a range of about 0.1% to about 3.5% by weight of the respective film;

wherein the first water-soluble film, the second water-soluble film, and the third water-soluble film each individually have a residual moisture content in a range of about 4% to about 15% by weight of the water-soluble film as measured by Karl Fischer titration;

wherein each film independently comprises one or more plasticizers in an amount in a range of about 5% to about 50 by weight of the individual film; and wherein the first side of the first water-soluble film is sealed to the second side of the second water-soluble film to create a first compartment between the first water-soluble film and the second water-soluble film, and the first side of the second water-soluble film is sealed to the second side of the third water-soluble film to create at least a second compartment between the second water-soluble film and the third water-soluble film, and wherein the second compartment is positioned above the first compartment;

provided that when a composition is housed in at least one of the compartments then the composition is not a household care composition.

28. The water-soluble unit dose article of claim 1, wherein the second polyvinyl alcohol resin has an average viscosity in a range of about 9 mPa·s to less than 12 mPa·s, measured as a 4% polyvinyl alcohol polymer solution in deionized water at 20° C.

29. The water-soluble unit dose article of claim 28, wherein the second polyvinyl alcohol resin has an average viscosity in a range of about 10 mPa·s to less than 12 mPa·s, measured as a 4% polyvinyl alcohol polymer solution in deionized water at 20° C.

* * * * *

UNITED STATES PATENT AND TRADEMARK OFFICE
CERTIFICATE OF CORRECTION

PATENT NO. : 11,473,040 B2
APPLICATION NO. : 17/552315
DATED : October 18, 2022
INVENTOR(S) : Florence Catherine Courchay et al.

It is certified that error appears in the above-identified patent and that said Letters Patent is hereby corrected as shown below:

In the Claims

Column 86, Line 40, Claim 8, "a" should be -- in a --.

Column 86, Line 65, Claim 11, "of in" should be -- in --.

Column 87, Line 7, Claim 11, "of in" should be -- in --.

Column 90, Line 20, Claim 27, "50" should be -- 50% --.

Signed and Sealed this
Sixteenth Day of May, 2023

Katherine Kelly Vidal
*Director of the United States Patent and Trademark Office*